US012483422B2

(12) United States Patent
Thomson

(10) Patent No.: US 12,483,422 B2
(45) Date of Patent: Nov. 25, 2025

(54) SYSTEMS AND METHODS FOR CREDENTIAL-BASED TRANSACTIONS OVER A NETWORK

(71) Applicant: Avast Software s.r.o., Prague (CZ)

(72) Inventor: Allan Thomson, Pleasanton, CA (US)

(73) Assignee: Avast Software s.r.o., Prague (CZ)

( * ) Notice: Subject to any disclaimer, the term of this patent is extended or adjusted under 35 U.S.C. 154(b) by 146 days.

(21) Appl. No.: 18/066,213

(22) Filed: Dec. 14, 2022

(65) Prior Publication Data

US 2024/0205017 A1    Jun. 20, 2024

(51) Int. Cl.
*H04L 9/32* (2006.01)
*G06Q 20/02* (2012.01)
*G06Q 20/38* (2012.01)

(52) U.S. Cl.
CPC .......... *H04L 9/3247* (2013.01); *G06Q 20/02* (2013.01); *G06Q 20/38215* (2013.01)

(58) Field of Classification Search
CPC . H04L 9/3247; G06Q 20/02; G06Q 20/38215
See application file for complete search history.

(56) References Cited

U.S. PATENT DOCUMENTS

| 5,825,880 | A | 10/1998 | Sudia et al. |
| 6,327,578 | B1 | 12/2001 | Linehan |
| 8,316,237 | B1 | 11/2012 | Felsher et al. |
| 10,373,158 | B1 | 8/2019 | James et al. |
| 11,139,955 | B1 | 10/2021 | So et al. |
| 11,184,395 | B1 * | 11/2021 | Novotny ................ H04L 63/10 |
| 2002/0188490 | A1 | 12/2002 | Kruse |

(Continued)

FOREIGN PATENT DOCUMENTS

| CN | 109716373 A | 5/2019 |
| EP | 4254234 A1 | 10/2023 |

(Continued)

OTHER PUBLICATIONS

Alex Preukschat; Drummond Reed, Self-Sovereign Identity: Decentralized digital identity and verifiable credentials, Manning, 2021. (Year: 2021).*

(Continued)

*Primary Examiner* — John W Hayes
*Assistant Examiner* — Taylor S Rak
(74) *Attorney, Agent, or Firm* — Dovas Law, P.C.

(57) ABSTRACT

Systems and methods for transacting over a network enable transacting on behalf of a first entity at a plurality of first network locations based on one or more first cryptographically verifiable credentials for a plurality of first network-enabled services. One or more assessments of the first entity are determined based on the transacting on behalf of the first entity at the plurality of first network locations based on the one or more first cryptographically verifiable credentials. One or more second cryptographically verifiable credentials are generated as one or more digitally signed credentials based on the one or more assessments of the first entity. The systems and methods further enable transacting on behalf of the first entity at one or more second network locations based on the one or more second cryptographically verifiable credentials for a second network-enabled service.

42 Claims, 18 Drawing Sheets

(56) References Cited

U.S. PATENT DOCUMENTS

| | | | |
|---|---|---|---|
| 2003/0158820 | A1 | 8/2003 | Mathur et al. |
| 2009/0300747 | A1 | 12/2009 | Ahn |
| 2014/0281491 | A1 | 9/2014 | Zaverucha et al. |
| 2015/0095999 | A1 | 4/2015 | Toth |
| 2019/0097812 | A1* | 3/2019 | Toth ............... H04L 9/0841 |
| 2020/0127845 | A1* | 4/2020 | Yang ............... H04L 9/0897 |
| 2020/0136921 | A1 | 4/2020 | Doshi et al. |
| 2020/0302441 | A1 | 9/2020 | Collinge et al. |
| 2021/0014060 | A1 | 1/2021 | Giorgiadis et al. |
| 2021/0287770 | A1 | 9/2021 | Anderson et al. |
| 2022/0272085 | A1 | 8/2022 | Novotny et al. |
| 2022/0329653 | A1* | 10/2022 | Govindarajan ......... H04L 67/51 |
| 2023/0259922 | A1 | 8/2023 | Rao et al. |
| 2024/0187238 | A1 | 6/2024 | Pourtabatabaie et al. |

FOREIGN PATENT DOCUMENTS

| | | |
|---|---|---|
| JP | 2019-525645 | 9/2019 |
| JP | 2021111412 | 8/2021 |
| WO | 2018031856 | 2/2018 |
| WO | WO2019191213 | 10/2019 |
| WO | WO2020233236 | 11/2020 |
| WO | WO2022096126 | 5/2022 |
| WO | WO2022102930 | 5/2022 |

OTHER PUBLICATIONS

Aries RFC 0046: Mediators and Relays, Daniel Hardman, Dec. 1, 2018 through Feb. 1, 2019, GitHub, https://github.com/hyperledger/aries-rfcs/blob/main/concepts/0046-mediators-and-relays/README.md, accessed Sep. 14, 2023.

Aries RFC 0478: Coprotocols, Daniel Hardman, Feb. 3, 2020 through May 19, 2020, GitHub, https://github.com/hyperledger/aries-rfcs/blob/main/concepts/0478-coprotocols/README.md, accessed Sep. 14, 2023.

Aries RFC 0075: Payment Decorators, Sam Curren et al., Apr. 22, 2019 through Jun. 11, 2019, GitHub, https://github.com/hyperledger/aries-rfcs/tree/main/features/0075-payment-decorators, accessed Sep. 14, 2023.

Aries RFC 0453: Issue Credential Protocol 2.0, Nikita Khateev et al., Mar. 23, 2020 through Apr. 15, 2021, GitHub, https://github.com/hyperledger/aries-rfcs/tree/main/features/0453-issue-credential-v2, accessed Sep. 28, 2023.

Aries RFC 0454: Present Proof Protocol 2.0, Nikita Khateev et al., May 27, 2020 through Apr. 15, 2021, GitHub, https://github.com/hyperledger/aries-rfcs/tree/main/features/0454-present-proof-v2, accessed Sep. 14, 2023.

Aries RFC 0004: Agents, Daniel Hardman, Nov. 1, 2017 "(approx, backdated)" through Jan. 15, 2019, GitHub, https://github.com/hyperledger/aries-rfcs/tree/main/concepts/0004-agents, accessed Sep. 14, 2023.

DIDComm Messaging v2.x Editor's Draft, Sam Curren et al., The Decentralized Identity Foundation, https://identity.foundation/didcomm-messaging/spec/, accessed Sep. 14, 2023.

Credential.md, Dmitry Khovratoavich et al., GitHub, https://github.com/sovrin-foundation/protocol/blob/master/themis/credential.md, accessed Sep. 14, 2023.

International Search Report dated Oct. 24, 2023 for International Patent Application No. PCTUS2370319.

U.S. Appl. No. 17/872,250, filed Jul. 25, 2022.

International Patent Application No. PCTUS2370319 filed Jul. 17, 2023.

U.S. Appl. No. 18/052,752, filed Nov. 4, 2022.

U.S. Appl. No. 18/063,284, filed Dec. 8, 2022.

"Decentralized Identity and Verifiable Credentials", Microsoft Security, Sep. 28, 2022 pp. 1-11.

Phillip J. Windley, How Sovrin Works, Oct. 3, 2016, Sovrin.org.

Dmitry Khovratovich; Jason Law, Sovrin: Digital Identities in the Blockchain Era, Dec. 2016, Sovrin.org.

Daniel Hardman, How DIDs, Keys, Credentials, and Agents Work in Sovrin, Apr. 2018, Sovrin.org.

Machine Translation of WO 2020233236 A1 (Year: 2020).

Machine Translation of EP 4254234 A1 (Year: 2023).

Office Action dated Nov. 14, 2024 for U.S. Appl. No. 18/052,752.

Updated Office Action dated Dec. 3, 2024 for U.S. Appl. No. 18/052,752.

Reply dated Jan. 22, 2025 for U.S. Appl. No. 18/052,752.

Notice of Allowance dated May 14, 2025 for U.S. Appl. No. 18/052,752.

Office Action dated Mar. 21, 2025 for U.S. Appl. No. 18/063,284.

Reply dated May 23, 2025 for U.S. Appl. No. 18/063,284.

Notice of Allowance dated Jun. 20, 2025 for U.S. Appl. No. 18/063,284.

Office Action dated Nov. 27, 2024 for U.S. Appl. No. 17/872,250.

Reply dated Jan. 22, 2025 for U.S. Appl. No. 17/872,250.

Office Action dated May 16, 2025 for U.S. Appl. No. 17/872,250.

Reply dated Aug. 4, 2025 for U.S. Appl. No. 17/872,250.

Notice of Allowance dated Mar. 6, 2025 for U.S. Appl. No. 18/446,068.

Notice of Allowance dated Jun. 25, 2025 for U.S. Appl. No. 18/446,068.

Japanese Office Action dated Jul. 8, 2025 for Japanese Patent Application No. 2025-504595 including English translation of Office Action.

Machine translation of JP2019525645.

Machine translation of WO2022102930.

Machine translation of JP2021111412.

Machine translation of CN109716373A.

* cited by examiner

SYSTEMS AND METHODS FOR CREDENTIAL-BASED TRANSACTIONS OVER A NETWORK

FIELD OF INVENTION

The disclosure relates generally to digital communications, and more particularly to transacting over a network.

BACKGROUND

Self-sovereign identity ("SSI") is a concept or model for allowing individuals to maintain control of their digital identities. An SSI system is typically decentralized and allows a holder (e.g., an individual or an organization) to generate and maintain unique identifiers known as decentralized identifiers ("DIDs"). A credential issued by an entity, typically an organization, acting in the role of an issuer is provided by a particular party (a "holder") to another party (a "verifier") for verifying identity information included within the credential of the particular party. SSI infrastructure used by issuers, verifiers, and holders is typically open source, while leveraging many individual standards for elements of the technology stack, where providers of the SSI infrastructure provide proprietary software including applications for performing transaction processing. A holder typically stores credentials in a digital wallet on a computing system for presentation to a verifier.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A system is provided for transacting over a computer network, which system includes a first agent operating on a first computing system and a second agent operating on a second computing system. The first agent is operable to transact on behalf of a first entity, transact with the second agent for one or more first cryptographically verifiable credentials, transmit the one or more first cryptographically verifiable credentials to a third agent, and transact with the third agent based on the one or more first cryptographically verifiable credentials for one or more second cryptographically verifiable credentials to facilitate transacting by the first agent with a fourth agent for a first service. The second agent is operable to receive telemetry data of the first computing system from the first computing system, the first computing system configured to monitor the telemetry data. The second agent is further operable to determine one or more assessments of the first entity based on the telemetry data, generate the one or more first cryptographically verifiable credentials as one or more digitally signed credentials based on the one or more assessments of the first entity by the second agent, and transmit the one or more first cryptographically verifiable credentials to the first agent.

Another system is provided for transacting over a computer network, which system includes a first agent operating on a first computing system and a second agent operating on a second computing system. The first agent is operable to transact on behalf of a first entity, transact with a fourth agent for use of a first service, receive one or more first cryptographically verifiable credentials from a third agent transacting on behalf of a third entity, and transact with the third agent based on the one or more first cryptographically verifiable credentials for a second cryptographically verifiable credential to facilitate the transacting by the first agent with the fourth agent. The second agent is operable to receive identifying information of the third entity, determine one or more assessments of the third entity based on the identifying information, receive a request from the third agent for the one or more first cryptographically verifiable credentials, generate the one or more first cryptographically verifiable credentials as one or more digitally signed credentials based on the one or more assessments of the third entity, and transmit the one or more first cryptographically verifiable credentials to the third agent.

Yet another system is provided for transacting over a computer network, which system includes a first agent operating on a first computing system and a second agent operating on a second computing system. The first agent is operable to transact on behalf of a first entity, receive one or more first cryptographically verifiable credentials from a fourth agent transacting on behalf of a fourth entity, transact with the fourth agent based on the one or more first cryptographically verifiable credentials for use of a first service, and transact with a third agent for a second cryptographically verifiable credential to facilitate the transacting by the first agent with the fourth agent. The second agent is operable to receive identifying information of the fourth entity and determine one or more assessments of the fourth entity based on the identifying information. The second agent is further operable to receive a request from the fourth agent for the one or more first cryptographically verifiable credentials, generate the one or more first cryptographically verifiable credentials as one or more digitally signed credentials based on the one or more assessments of the fourth entity, and transmit the one or more first cryptographically verifiable credentials to the fourth agent.

Yet another system for transacting over a computer network is provided, the system including a first agent operating on a first computing system and a second agent operating on a second computing system. The first agent is operable to transact on behalf of a first entity and transact with a plurality of third agents at a plurality of first network locations based on one or more first cryptographically verifiable credentials for a plurality of first network-enabled services. The first agent is also operable to transmit to the second agent one or more first indications indicating the transacting by the first agent at the plurality of first network locations based on the one or more first cryptographically verifiable credentials and transact with the second agent for one or more second cryptographically verifiable credentials based on the one or more first indications indicating the transacting at the plurality of first network locations based on the one or more first cryptographically verifiable credentials. The first agent is further operable to receive the one or more second cryptographically verifiable credentials from the second agent and transact based on the one or more second cryptographically verifiable credentials at one or more second network locations. The second agent is operable to receive the one or more first indications indicating the transacting by the first agent at the plurality of first network locations based on the one or more first cryptographically verifiable credentials and determine one or more assessments of the first entity based on the one or more first indications indicating the transacting at the plurality of first network locations based on the one or more first cryptographically verifiable credentials. The second agent is further operable to generate the one or more second cryptographically verifiable credentials as one or more digitally signed credentials based on the one or more assessments of the first entity and transmit the one or more second cryptographically verifiable credentials to the first agent.

A method is provided for transacting over a computer network, the method including receiving from a first computing system by a second agent operating on a second computing system telemetry data of the first computing system and determining by the second agent one or more assessments of a first entity based on the telemetry data. The method further includes generating by the second agent one or more first cryptographically verifiable credentials as one or more digitally signed credentials based on the one or more assessments of the first entity by the second agent and transmitting by the second agent the one or more first cryptographically verifiable credentials to a first agent operating on the first computing system on behalf of the first entity.

Another method is provided for transacting over a computer network, the method including receiving by a second agent from a third agent identifying information of a third entity, determining by the second agent one or more assessments of the third entity based on the identifying information, and generating by the second agent one or more first cryptographically verifiable credentials as one or more digitally signed credentials based on the one or more assessments of the third entity by the second agent, the one or more first cryptographically verifiable credentials comprising the one or more assessments. The method also includes transmitting by the second agent the one or more first cryptographically verifiable credentials to the third agent, transmitting by a first agent to the third agent one or more credential requests, receiving by the first agent from the third agent the one or more first cryptographically verifiable credentials, and cryptographically verifying by the first agent the one or more first cryptographically verifiable credentials. The method further includes determining by the first agent that the one or more assessments of the third entity meets a requirement, receiving by the first agent from the third agent a second cryptographically verifiable credential, and transmitting by the first agent the second cryptographically verifiable credential to a fourth agent to transact for a service.

Yet another method is provided for transacting over a computer network, the method including receiving by a second agent from a fourth agent identifying information of a fourth entity, determining by the second agent one or more assessments of the fourth entity based on the identifying information, and generating by the second agent one or more first cryptographically verifiable credentials as one or more digitally signed credentials based on the one or more assessments of the fourth entity by the second agent, the one or more first cryptographically verifiable credentials comprising the one or more assessments. The method also includes transmitting by the second agent the one or more first cryptographically verifiable credentials to the fourth agent, transmitting by a first agent to the fourth agent one or more credential requests, transmitting by the first agent to the fourth agent a request for a service, and receiving by the first agent from the fourth agent the one or more first cryptographically verifiable credentials. The method further includes receiving by the first agent from the fourth agent a request for a second cryptographically verifiable credential, cryptographically verifying by the first agent the one or more first cryptographically verifiable credentials, determining by the first agent that the one or more assessments meets a requirement, and transmitting by the first agent the second cryptographically verifiable credential to the fourth agent to transact for the service.

Still another method is provided for transacting over a computer network, the method including monitoring by a first computing system telemetry data of the first computing system, transmitting by the first computing system the telemetry data of the first computing system to a second agent operating on a second computing system, receiving by the second agent the telemetry data of the first computing system, and determining by the second agent one or more assessments of a first entity based on the telemetry data. The method also includes generating by the second agent one or more first cryptographically verifiable credentials as one or more digitally signed credentials based on the one or more assessments of the first entity by the second agent, transmitting by the second agent the one or more first cryptographically verifiable credentials to a first agent operating on behalf of the first entity on the first computing system, and receiving by the first agent the one or more first cryptographically verifiable credentials from the second agent. The method further includes transmitting by the first agent to a fourth agent a request for a service, receiving by the first agent from the fourth agent a request for a second cryptographically verifiable credential, and transmitting by the first agent the one or more first cryptographically verifiable credentials and the second cryptographically verifiable credential to the fourth agent to transact for the service.

Still another method is provided for transacting over a computer network, the method including receiving from a first agent operating on a first computing system on behalf of a first entity by a second agent operating on a second computing system one or more first indications indicating transacting by the first agent at a plurality of first network locations based on one or more first cryptographically verifiable credentials. The method also includes determining by the second agent one or more assessments of the first entity based on the one or more first indications indicating the transacting by the first agent at the plurality of first network locations based on the one or more first cryptographically verifiable credentials. The method further includes generating by the second agent one or more second cryptographically verifiable credentials as one or more digitally signed credentials based on the one or more assessments of the first entity and transmitting by the second agent the one or more second cryptographically verifiable credentials to the first agent.

Still another method is provided for transacting over a computer network, the method including transacting on behalf of a first entity at a plurality of first network locations based on one or more first cryptographically verifiable credentials for a plurality of first network-enabled services. The method also includes determining one or more assessments of the first entity based on the transacting on behalf of the first entity at the plurality of first network locations based on the one or more first cryptographically verifiable credentials. The method further includes generating one or more second cryptographically verifiable credentials as one or more digitally signed credentials based on the one or more assessments of the first entity and includes transacting on behalf of the first entity at one or more second network locations based on the one or more second cryptographically verifiable credentials for a second network-enabled service.

Still another method is provided for transacting over a computer network, the method including collecting from a plurality of clients operating on behalf of a plurality of users a plurality of credential type sets and indications of where in a network the plurality of credential type sets were used and determining a prevalence of use of the plurality of credential type sets at a plurality of network-accessible sites. The method also includes monitoring the plurality of network-accessible sites to determine a plurality of risk assessments of the plurality of network-accessible sites and determining scores of the plurality of credential type sets based on the prevalence of use of the plurality of credential type sets at the plurality of network-accessible sites and the risk assessments of the plurality of network-accessible sites. The method further includes comparing the scores of particular credential type sets of the plurality of credential type sets from a particular client operating on behalf of a particular user to the scores of the plurality of credential type sets to determine a credential use assessment for the particular user and providing the credential use assessment to the particular user.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

FIGS. 5A, 5B, 6A, 6B, and 7 show process flows and systems enabling transacting over a network via agents in a self-sovereign identity ("SSI") system environment.

Figure 8:
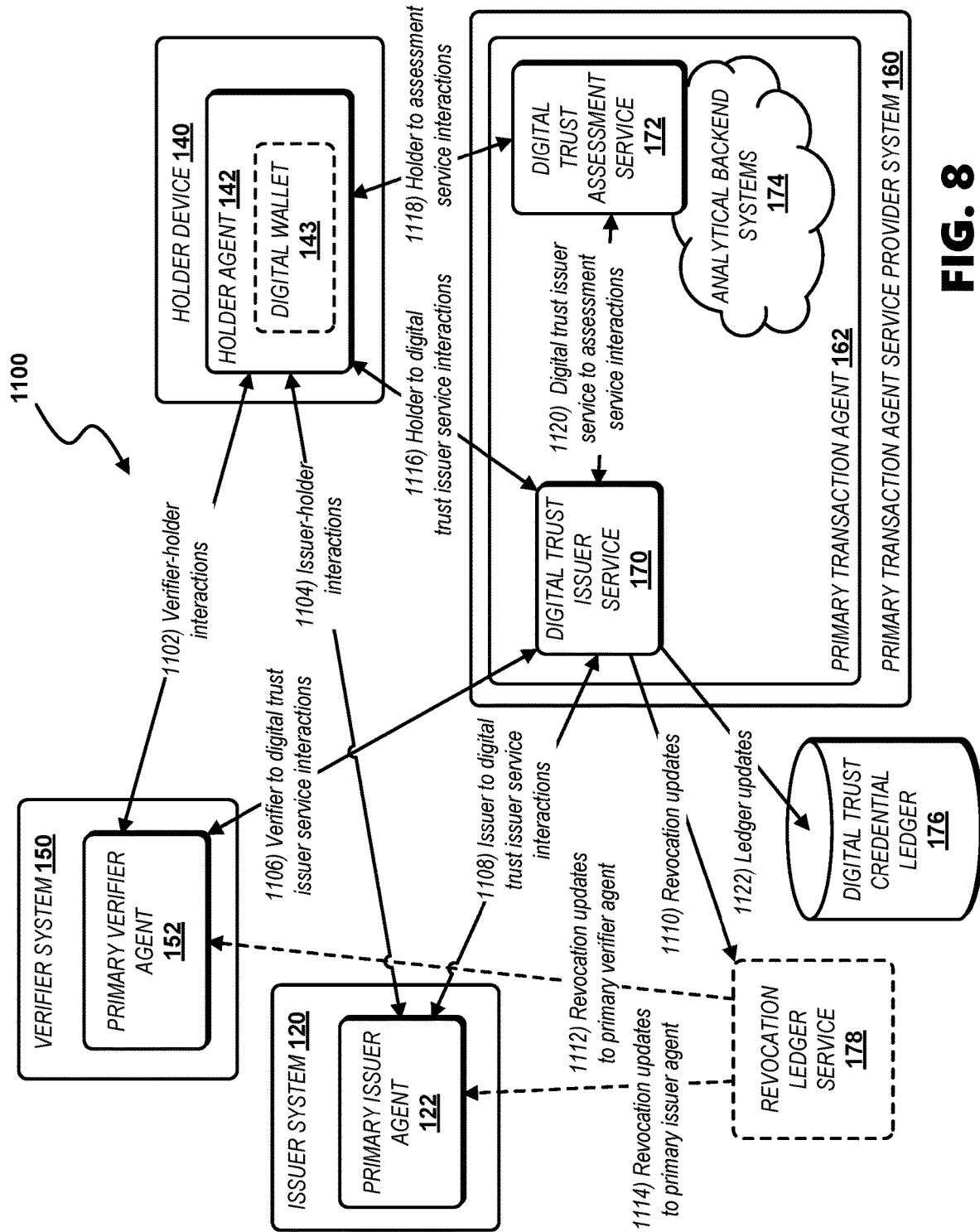

FIG. 8 shows an enhanced self-sovereign identity ("SSI") system enabling an additional layer of trust based on monitored data from which a level of trust or quality of reputation of an entity can be assessed.

FIGS. 9-13 show further process flows and systems enabling transacting over a network to enable an additional layer of trust in a self-sovereign identity ("SSI") system environment based on monitored data from which a level of trust or quality of reputation of an entity can be assessed.

Figure 13:
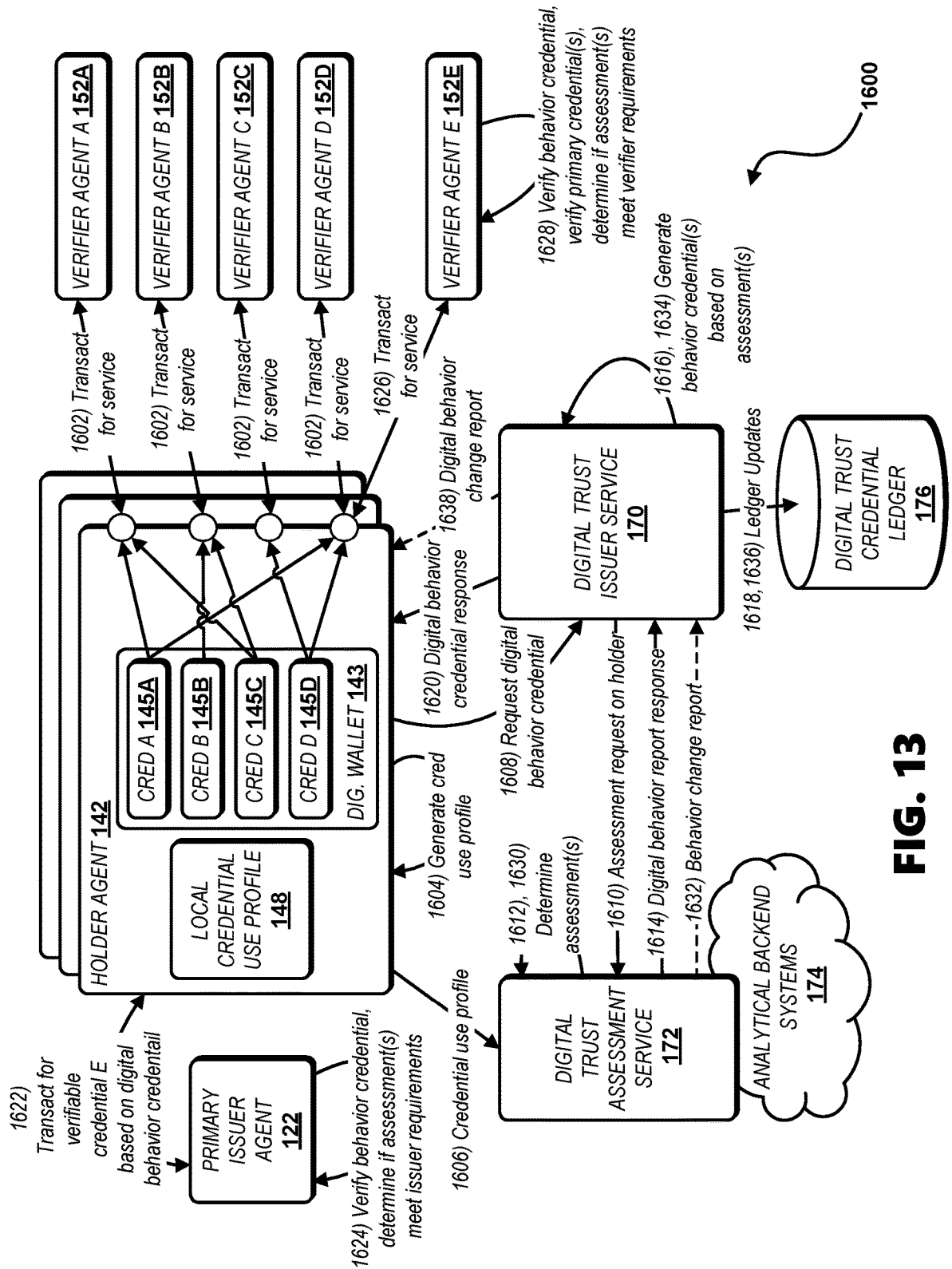
Figure 14:
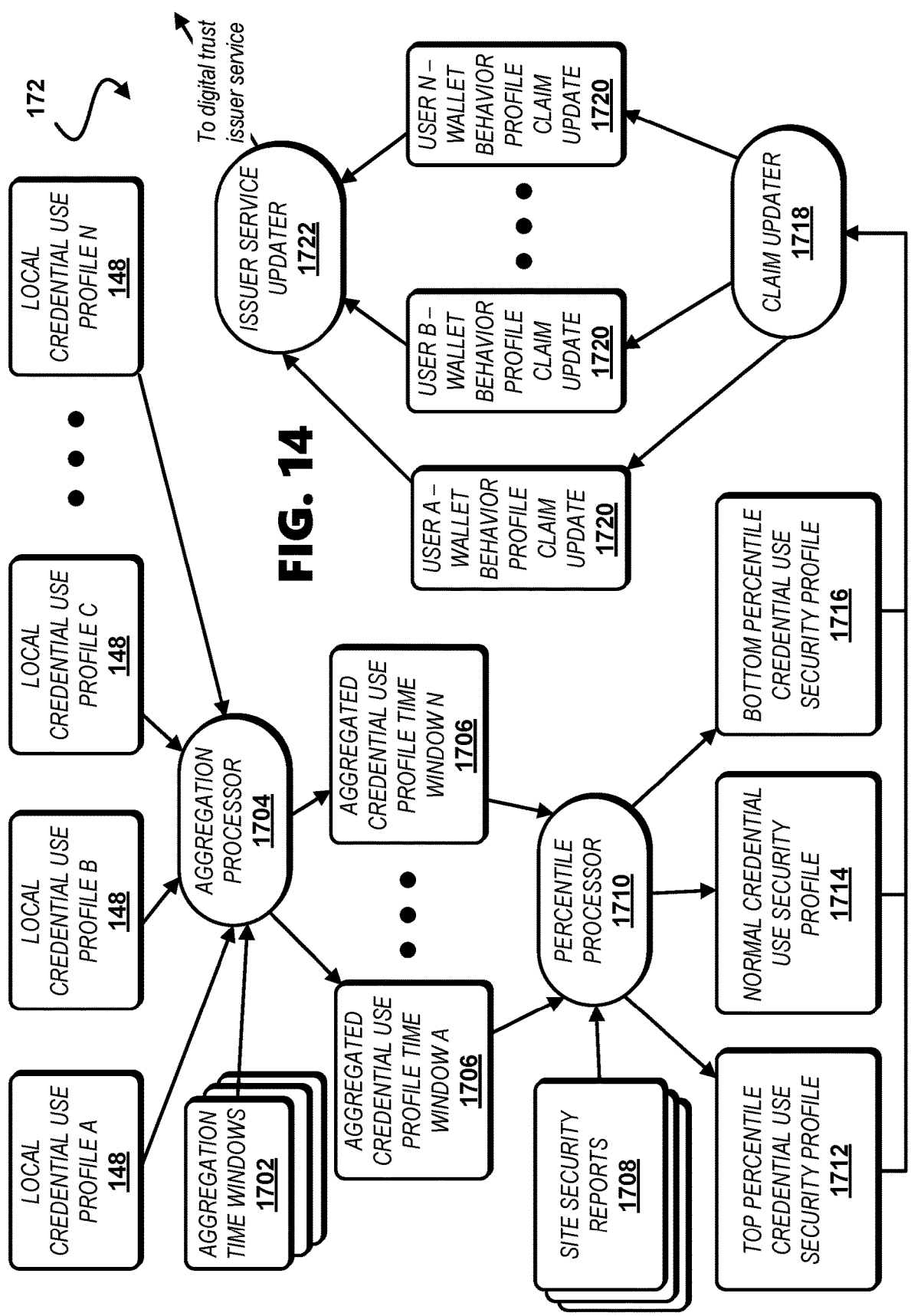

FIG. 14 shows systems and data flows of a digital trust assessment service as implemented in the process flow and system of FIG. 13.

Figure 15:
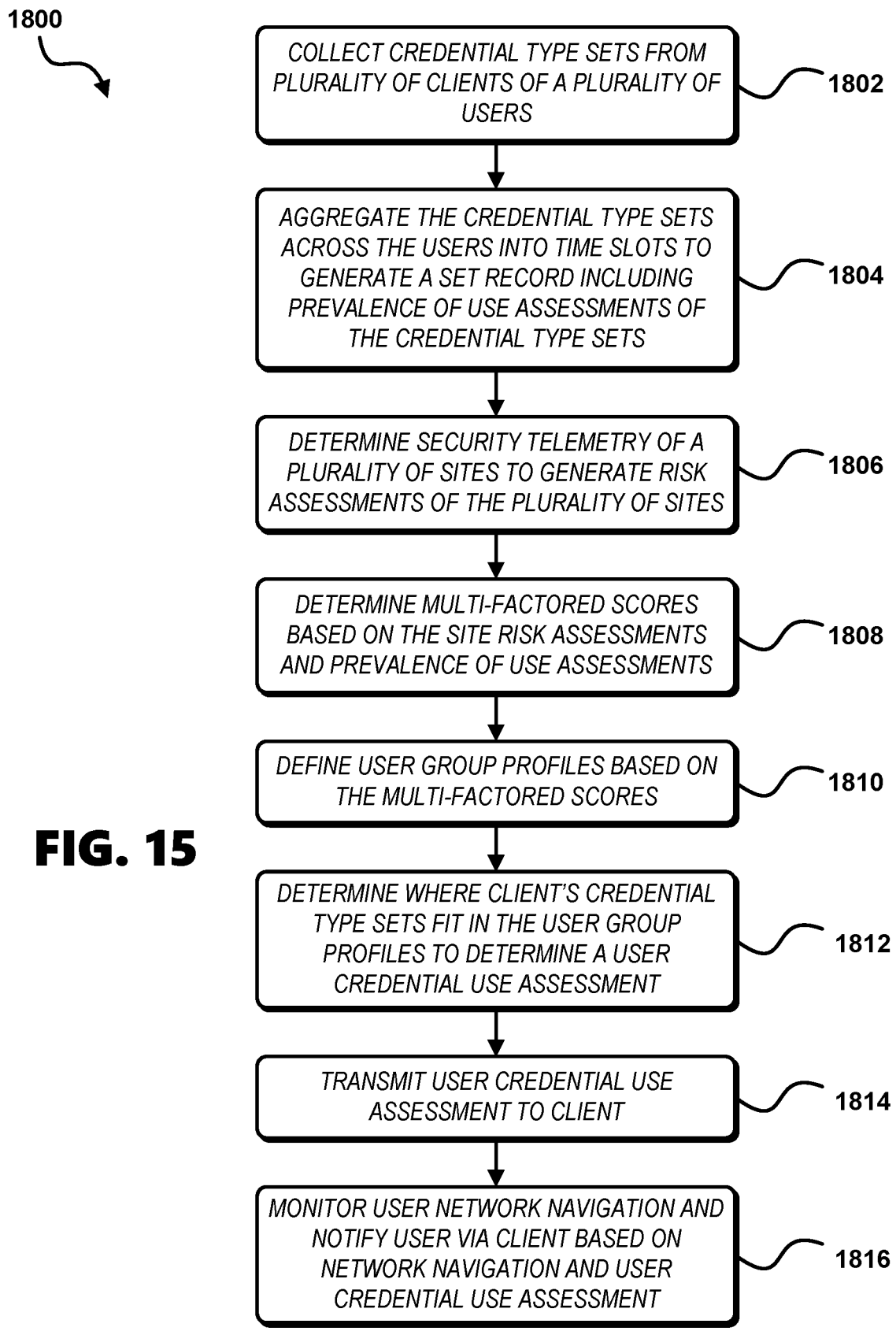

FIG. 15 is a diagram showing a method of cross-correlating credential type usage to facilitate secure navigation in a computer network.

Figure 16:
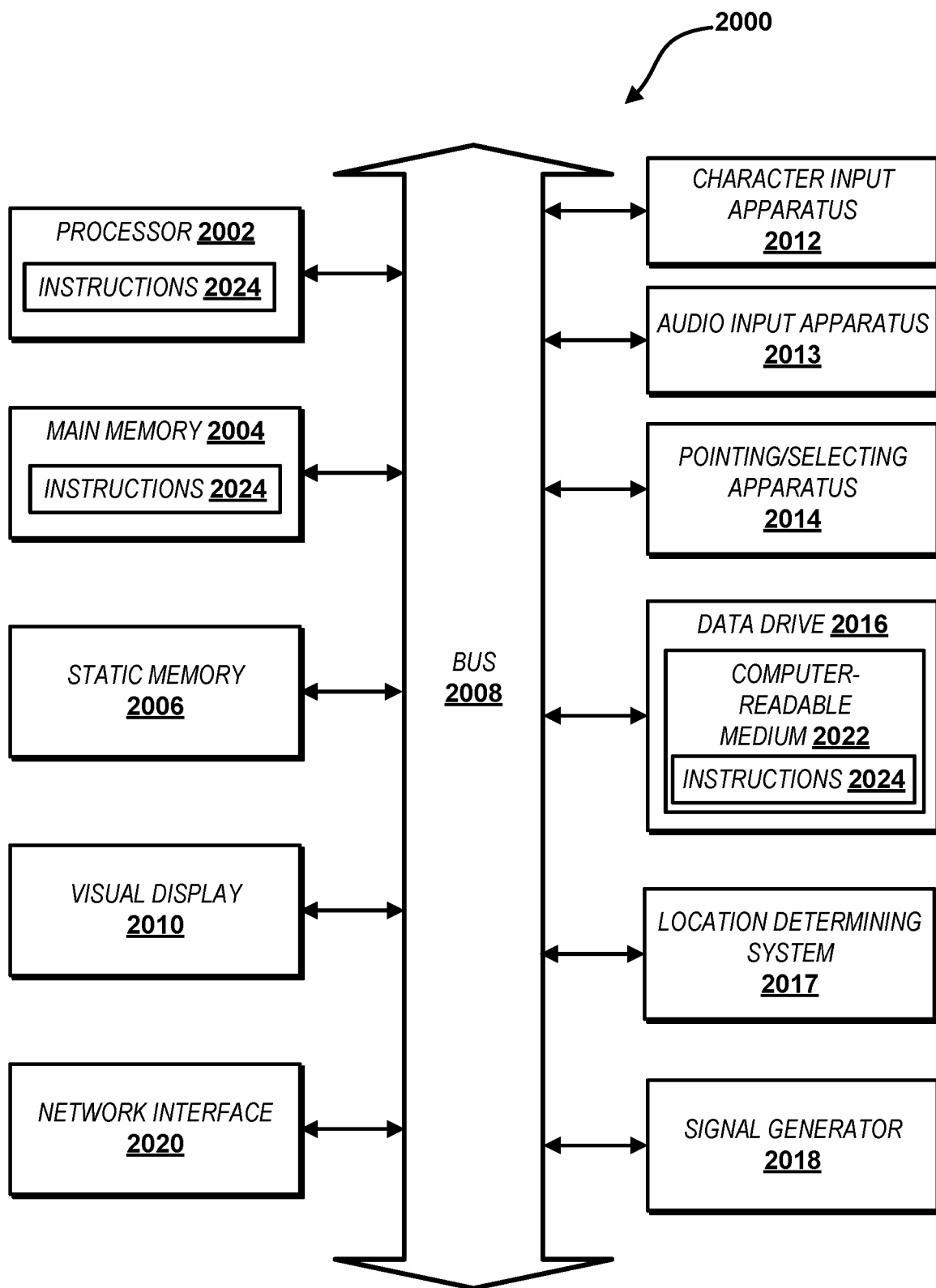

FIG. 16 shows a computer system for performing described methods according to illustrative embodiments.

DETAILED DESCRIPTION OF ILLUSTRATIVE EMBODIMENT(S)

There are limitations in current self-sovereign identity ("SSI") infrastructure models with respect to secure processing of transactions. It is desirable to track, log, and audit SSI transactions for security and monetization purposes. Described herein are systems and methods which introduce mechanisms to track and monetize the use of SSI infrastructure and services built on top of SSI infrastructure. The herein described systems and methods do not require changes to core SSI infrastructure requirements including verifiable credentials and the structure and use of verifiable credentials within an SSI exchange.

In self-sovereign identity ("SSI") systems, establishing trust between entities is a multi-layered problem. Cryptographically verifiable credentials and the content of the cryptographically verifiable credentials are important in the establishment of trust. The content of a cryptographically verifiable credential codifies a "credential claim" including attributes of the credential, for example the credential holder's first name, last name, date of birth, credit card number, social security number, passport number, university transcript information, and professional credential information.

Further described herein are systems that incorporate additional information that signals qualities of the credential holder ("signaling information"). The signaling information is provided in a cryptographically secure form and provides an additional layer of trust to facilitate transactions requiring network communication and credentials. The signaling information can be derived by monitoring computing systems and network activities associated with an entity that needs to assert their level of trustworthiness or reputation quality in order to transact with another entity for a network-enabled service. The additional layer of trust is implemented by incorporating a layer of reputational assessment on top of an SSI system, and verifiable credentials are used in the SSI system to deliver the reputational assessment. The signaling information and corresponding additional layer of trust are for example based on observations regarding a first entity made by a second entity such that a third entity can benefit from a higher level of trust with the first entity to facilitate its transactions with the first entity for a network-enable service.

A credential holder ("holder") can store credentials in a digital wallet on a computing system for presentation to a verifier. An important challenge in both credential issuance to a holder implementing a digital wallet and credential verification when a holder presents a credential to a service provider is ensuring that a verifier can trust the credentials being presented even if the credential is correctly formed, correctly issued, and is digitally signed as authentic.

Further described herein is a mechanism where an assessment system can profile credential usage on the internet in a manner that helps provide additional security telemetry that a verifier or issuer can leverage for trusting the holder of credentials.

Terms sett forth herein are described as follows:

An "issuer" is an entity issuing a verifiable credential or data artifact.

A "holder" is an entity that holds a verifiable credential or data artifact provided to them by issuer entities.

A "verifier" is an entity verifying a data artifact furnished by a holder as part of a transaction and a provider of a service a holder wishes to engage with.

A "contract" defines what data artifacts are required from a requesting entity of a service before a provider is willing to fulfill the service to the requesting entity.

An "agent" is an application component, executed on a computing system, operating on behalf of an entity (e.g., a user or organization) to transact for the entity.

A "transaction agent" is an application component, executed on a computing system, that provides capabilities to track, communicate, aggregate, and interface on transactions leveraging credentials.

A "transaction agent service provider system" is a system (e.g., software or hardware system) that hosts one or more transaction agents and one or more transaction ledgers on behalf of holders, issuers, or verifiers that choose to implement the system. A transaction agent service provider system can take on a different role for each of an issuer, a holder, and a verifier. A transaction agent service provider system can also be described as a "transaction agent provider," "payment infrastructure," or "platform provider."

A "payment agent" is a transaction agent that provides payment functions.

A "sponsor" is an entity that sponsors (e.g., pays for) the issuing of a verifiable credential, thus crediting a user. A sponsor can be entitled to receive the major portion of the verifier's payment for verification of the credential. A sponsor can be an independent entity, or the sponsor can be a role of an issuer, a role of a holder's transaction agent service provider system, or role of a verifier.

A "locked credential" is a verifiable credential ("VC") that may be shared by a holder, but it cannot be verified by a verifier without unlocking. The unlocking may be cryptographic (e.g., a verifier needs to receive a cryptographic key to unlock the content or part of the content of the credential) or may be policy based (e.g., a verifier's agent must adhere to the policy and only unlock the credential for verification after the procedural conditions are met—e.g., payment is confirmed).

An "unlocked credential" is a verifiable credential that can be shared by a holder, which has previously been acquired from an issuer, and can be used multiple times by the holder for use in transactions where the credential is required without having to pay the issuer or notify the issuer of such use.

A "co-protocol" is an interaction between two entities (e.g., holder, verifier, or issuer) within a payment scheme for an action that requires payment.

A "use case" is an example in the real-world of how users, consumers, and computers engage with services and service providers.

A "transaction scheme" or "payment scheme" is a sequence of exchanges between entities in a transaction agent system to accomplish a use case.

A "transaction" or "txn" represents an exchange between two parties, whether free or paid for, for example to engage in a service delivered by one party to another requesting party, for example a purchase order.

A "cryptographic system flow" is a system flow describing transaction data exchanges wherein protection provided by a system is cryptographically enforced. That is, a verifiable credential is not made available for use in a transaction without the cryptographic proofs necessary to validate the signature on the credential.

A "policy system flow" is a system flow describing transaction data exchanges wherein the protection provided by a system is enforced by policies that are defined and deployed across the system. That is, a verifiable credential is not made available for use in a transaction without verification that the credential complies with the policies agreed within the entities of the system.

"Telemetry data" is activity data, status data, and settings information on a computing system. The telemetry data includes but is not limited to device security settings, application settings, installed applications, and user online behavior.

A "digital trust assessment service" is a system that determines assessments of an entity based on monitored network activity, telemetry data, or a combination thereof.

A "digital trust issuer service" is a system that receives a request for, generates, and issues a verifiable credential based on one or more assessments of an entity.

"Trust signals" are data including signals from which a level of trust or quality of reputation of an entity can be assessed, for example derived from monitored network activity or telemetry data related to an entity.

A "network-enabled service" is one or more of the hosting or support of an application via a computer network (e.g., wide area network, local area network, or internet), the delivery of an application or components thereof via a computer network, or the updating of an application via a computer network.

A "client" is a network-accessible application or process executed on a computing system.

As described herein, reference to "first," "second," and "third," components (e.g., a "first agent," a "second agent") or "particular" or "certain" or "primary" components or implementations (e.g., a "particular user," a "certain user," a "particular computing device", a "particular implementation", a "primary transaction agent", a "primary issuer agent", a "primary verifier agent") is not used to show a serial or numerical limitation or a limitation of quality but instead is used to distinguish or identify the various components and implementations.

Some steps and elements in the Figures are shown in dashed line to indicate that they are optional or that they may be removed without precluding the functioning of the corresponding process or system. Notwithstanding, there exist steps or elements in the Figures that are shown in solid line that may also be optional or removed without precluding the functioning of the corresponding process or system.

Figure 1:
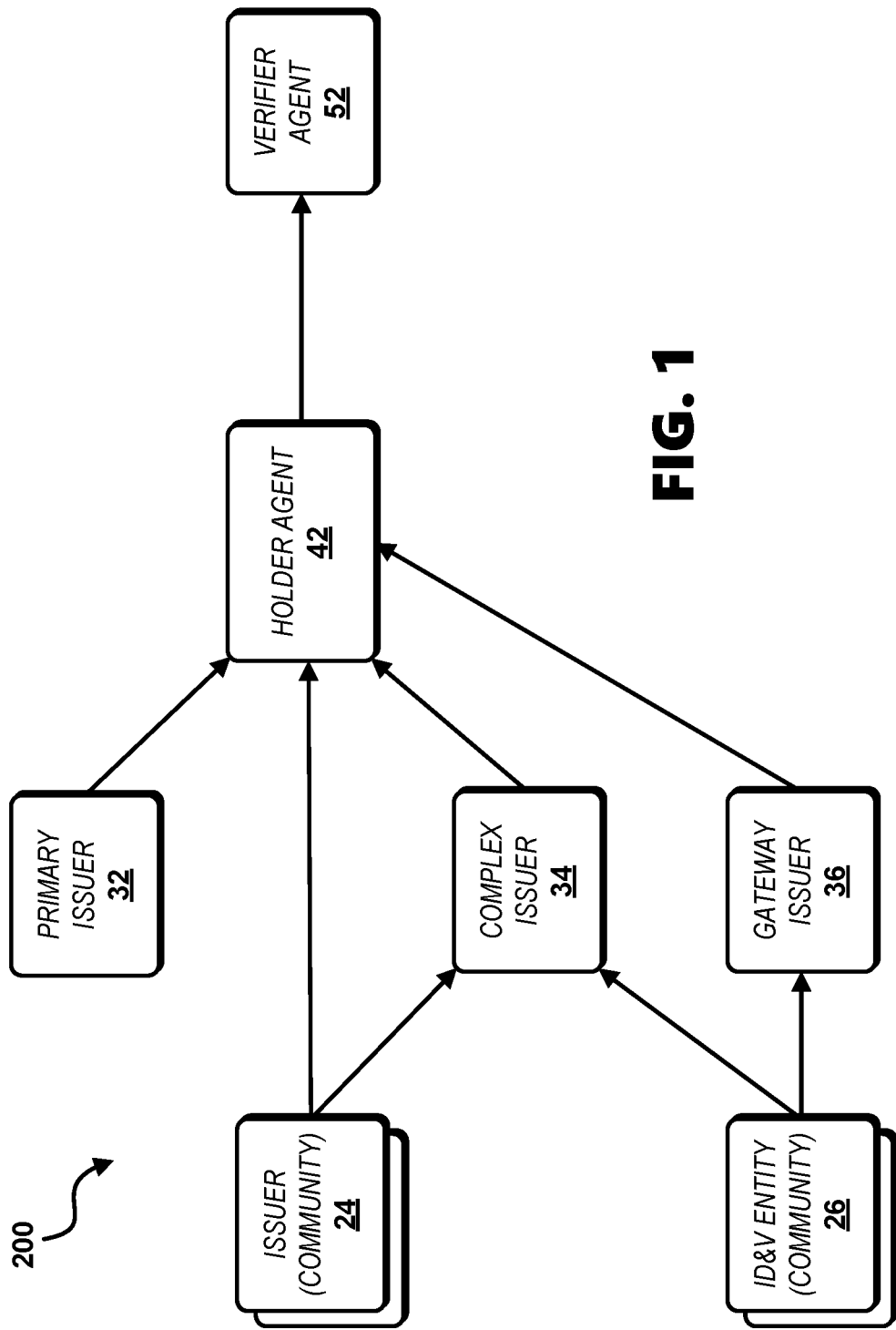
FIG. 1 shows a process flow and system in which data artifacts are provided by issuers to a holder agent and verified by a verifier agent.

Referring to FIG. 1, a process flow and system 200 enabled in a network environment is shown. Third-party data artifact issuers 24, for example a community of data artifact issuers 24, provide data artifacts (e.g., verifiable credentials) to a holder agent 42. The holder agent 42 can be provided in the form of a software agent including software encompassing a digital wallet holding issued data artifacts belonging to a user (i.e., "holder") of the holder agent 42, as well as software applications and network stack necessary to support the use of the digital wallet.

A primary issuer 32 is also enabled to provide data artifacts to the holder agent 42. A complex issuer 34 acts in partnership with other issuers including third-party data artifact issuers 24 and identification and verification ("ID&V") entities 26 in an ("ID&V community") to produce data artifacts for the holder agent 42. A gateway issuer 36 acts on behalf of the ID&V entities 26 to issue data artifacts to the holder agent 42. The primary issuer 32, complex issuer 34, and gateway issuer 36 are for example enabled by the same entity that enables a software agent forming the holder agent 42. A verifier agent 52 interfaces with the holder agent 42 to verify data artifacts.

Figure 2:
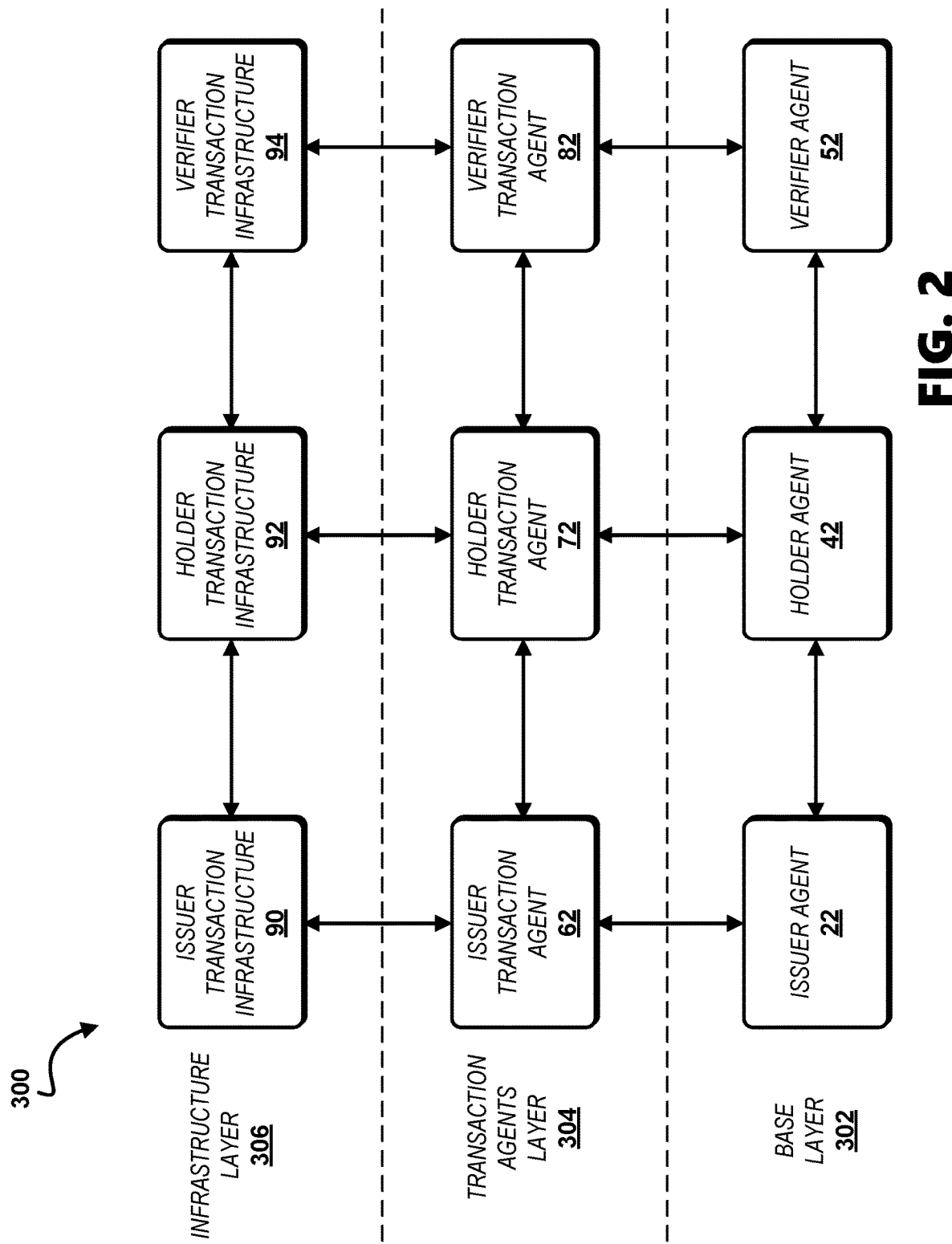
FIG. 2 shows a self-sovereign identity ("SSI") system and corresponding infrastructure layer, transaction agents layer, and base layer.

Referring to FIG. 2, a self-sovereign identity ("SSI") system 300 is provided. For privacy reasons, it is not desirable for a holder and issuer (e.g., via holder agent 42 and issuer agent 22) to communicate directly when implementing verifiable credentials. For purposes of illustration, if a driver license issued by a state's department of motor vehicles ("DMV") were a verifiable credential and was used by a holder to obtain access to various nightclubs, the holder may not want the DMV to be informed of their visits to the nightclubs in order to verify their driver license. The SSI system 300 supports a holder's privacy via a transaction layer 304 by allowing a holder via a holder agent 42 to use verifiable credentials (even locked credentials) without issuers of the credentials becoming aware of where the credentials are being used. The SSI system 300 further supports via the transaction layer 304 cryptographically tracking a proof of a transaction for example for the purpose of auditing and tracking payments associated with the transaction.

A base layer 302 defines base components of the SSI system 300. The transaction layer 304 defines components handling the processing of payments associated with transactions and includes an issuer transaction agent 62, a holder transaction agent 72, and a verifier transaction agent 82. An infrastructure layer 306 defines services necessary to support the base layer 302 and the transaction layer 304. The infrastructure layer includes issuer transaction infrastructure 90, holder transaction infrastructure 92, and verifier transaction infrastructure 94.

The base layer incudes an issuer agent 22, which includes one or more of a third-party data artifact issuer 24, ID&V entity 26, primary issuer 32, complex issuer 34, or gateway issuer 36. The starting point of a transaction occurs when a holder corresponding to a holder agent 42 with an existing issued verifiable credential wants and attempts to use a verified service. A data flow between the holder agent 42, the verifier agent 52, and one or more of the transaction agents 62, 72, 82 follows on the basis of a per transaction payment.

Figure 3:
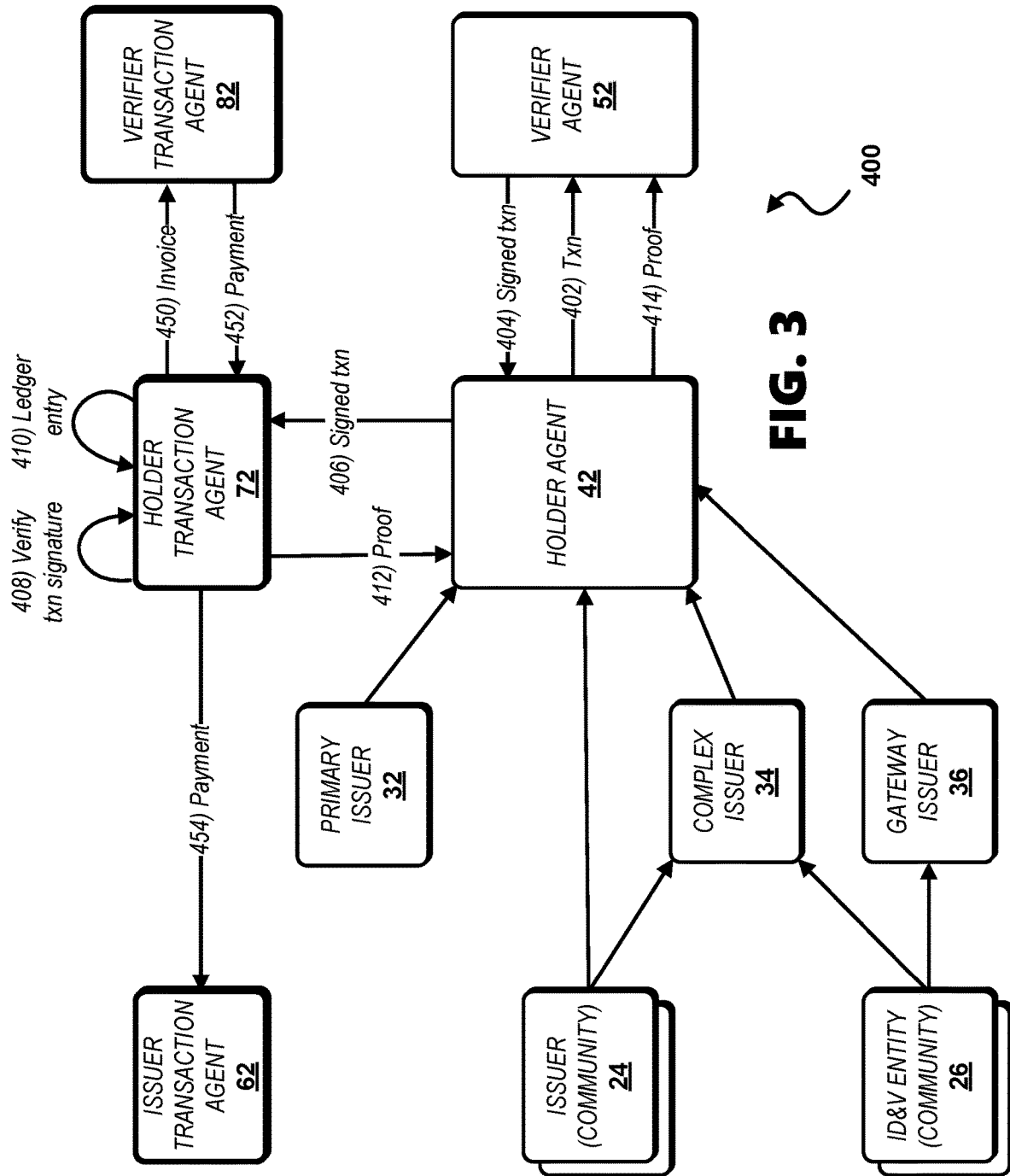
FIG. 3 shows a process flow and system in which data artifacts are provided by issuers to a holder agent and verified by a verifier agent with transactions facilitated by transaction agents.

A challenge to the SSI system 300 arises where providers of software and services enabling transactions or services via the SSI system 300 want to track, audit, and monetize the transactions or services, for example to enhance system security and usability and to protect privacy of a holder's use of credentials. Referring to FIGS. 2 and 3, as a solution to the challenge, the transaction agent architecture introduces three functional roles to the process flow and system 200 as set forth in the SSI system 300 to enable a process flow and system 400. The three functional roles include transaction agent roles enabled by the issuer transaction agent 62, holder transaction agent 72, and verifier transaction agent 82.

The issuer transaction agent 62 provides tracking of transactions that the issuer transaction agent 62 is engaged in, including monetization, back to the issuer agent 22 based on transactions of holders and verifiers (via holder agent 42 and verifier agent 52 respectively) without requiring the issuer (via issuer agent 22) to be involved in the transactions, wherein the issuer agent 22 can include one or more of the third-party data artifact issuer 24, ID&V entity 26, primary issuer 32, complex issuer 34, or gateway issuer 36. The holder transaction agent 72 provides tracking of transactions that the holder transaction agent 72 is engaged in, including monetization, occurring by the holder agent 42 (e.g., a software agent) back to the provider of services enabling the holder agent 42 (e.g., software agent services), for example a security services provider. The verifier transaction agent 82 provides monetization of the transactions to the verifier agent 52 including transaction invoicing and tracking services for transactions that the verifier transaction agent 82 is engaged in. The issuer transaction agent 62, holder transaction agent 72, and verifier transaction agent 82 maintain separate lines of communication and tracking to enable system security and usability and to protect privacy of a holder's use of credentials.

The process flow and system 400 includes a per transaction flow represented by steps 402 through 414. In the step 402, the holder agent 42 sends a transaction to the verifier agent 52 for example a transaction including a verifiable credential of the holder of the holder agent 42. The verifier agent 52 signs and returns the transaction to the holder agent (step 404). The holder agent 42 sends the signed transaction to the holder transaction agent 72 (step 406). The holder transaction agent 72 verifies the signature, for example by application of a public key of the verifier agent (step 408). The holder transaction agent 72 creates a transaction ledger entry (step 410). The holder transaction agent 72 sends back a proof for the transaction ("transaction proof") to the holder agent 42 (step 412). The holder agent 42 sends the transaction proof to the verifier agent 52 (step 414).

The process flow and system 400 further includes an asynchronous, in batch process flow and system represented by steps 450 through 454. In the step 450, the holder transaction agent 72 sends an invoice to the verifier transaction agent 82. The verifier transaction agent 82 send payment to the holder transaction agent 72 (step 452), and the holder transaction agent 72 pays the issuer transaction agent 62 (step 454).

Figure 4:
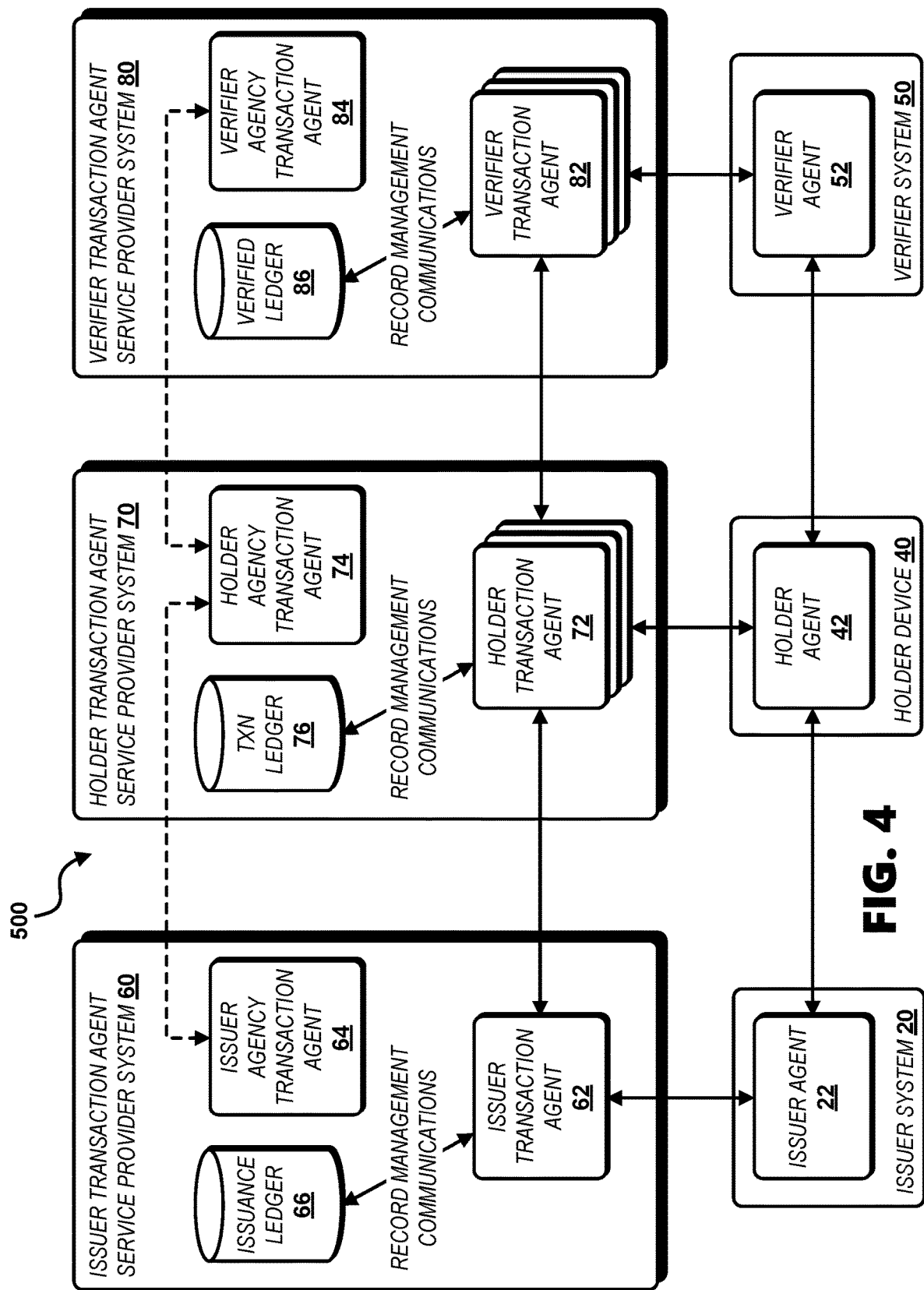
FIG. 4 is a diagram showing a transaction scheme system including systems that respectively enable issuer, holder, and verifier agents and respectively enable issuer, holder, and verifier transaction agents.

Referring to FIG. 4, an exemplary transaction scheme system 500 (e.g., a payment scheme system) in accordance with the SSI system 300 is provided. The transaction scheme system 500 enables cryptographically tracking a proof of a transaction for example for the purpose of auditing and tracking payments associated with the transaction. The transaction scheme system 500 enables a set of data flows between the issuer agent 22, holder agent 42, verifier agent 52, issuer transaction agent 62, holder transaction agent 72, and verifier transaction agent 82. The transaction scheme system 500 is operable in a computer network including one or more wired or wireless networks or a combination thereof, for example including a local area network (LAN), a wide area network (WAN), the internet, mobile telephone networks, and wireless data networks such as Wi-Fi™ and 3G/4G/5G cellular networks.

An issuer transaction agent service provider system 60 includes the issuer transaction agent 62 and an issuance ledger 66 for recording record management communications from the issuer transaction agent 62 and rendering record management communications accessible to the issuer transaction agent 62. The issuer transaction agent service provider system 60 further includes an issuer agency transaction agent 64 for transmitting and receiving agency-related communications.

A holder transaction agent service provider system 70 includes the holder transaction agent 72 and a transaction ledger 76 for recording record management communications from the holder transaction agent 72 and rendering record management communications accessible to the holder transaction agent 72. The holder transaction agent service provider system 70 further includes a holder agency transaction agent 74 for transmitting and receiving agency-related communications to and from the issuer agency transaction agent 64 and a verifier agency transaction agent 84.

A verifier transaction agent service provider system 80 includes the verifier transaction agent 82 and a verified ledger 86 for recording record management communications from the verifier transaction agent 82 and rendering record management communications accessible to the verifier transaction agent 82. The verifier transaction agent service provider system 80 further includes the verifier agency transaction agent 84 for transmitting and receiving agency-related communications to and from the holder agency transaction agent 74.

A network-connectable processor-enabled issuer system 20 enables the issuer agent 22. A network-connectable processor-enabled holder device 40 enables the holder agent 42. The holder agent 42 can be provided on the holder device 40 for example as a standalone application or a plugin, add-on, or extension to an existing application, for example a web browser plugin. A network-connectable processor-enabled verifier system 50 enables the verifier agent 52. The verifier agent 52 can be provided on the verifier system 50 for example as a standalone application or a plugin, add-on, or extension to an existing application, for example a web browser plugin.

The data flows enabled by the transaction scheme system 500 include those set forth below in Table 1.

TABLE 1

| Data Flow, Purpose | From | To |
|---|---|---|
| Bi-directional, issuance of verifiable credentials | Issuer agent 22 | Holder agent 42 |
| Bi-directional, issuance records management | Issuer agent 22 | Issuer transaction agent 62 |
| Bi-directional, use of verifiable credentials | Holder agent 42 | Verifier agent 52 |
| Bi-directional, transaction records management | Holder agent 42 | Holder transaction agent 72 |
| Bi-directional, verification of verifiable credentials transactions | Verifier agent 52 | Verifier transaction agent 82 |
| Bi-directional, payment of issuer, payment of holder transactions | Verifier transaction agent 82 | Holder transaction agent 72 |
| Bi-directional, payment of verifier, payment of holder transactions | Issuer transaction agent 62 | Holder transaction agent 72 |

Herein a set of co-protocols are defined that will take place, as part of payment schemes within a transaction agent system including the SSI system 300. The described co-protocols track and monetize use of verifiable credentials while using the SSI system 300 in multiple scenarios. The described co-protocols support real-time tracking of transactions where verifiable credentials are used regardless of the cost or payment necessary to support those transactions. Co-protocols can be categorized as either a credential payment category or service payment category.

A credential payment category is where payment occurs during or post-use of a transaction credential. A service payment category is where payment occurs during, or post-use of a service engaged in by a holder from a service provider. It is assumed that the verifier does not get paid to participate in using the SSI infrastructure, except for specific service delivery use cases as described below. For credential payment category use cases, the benefits to the verifier include better quality data, reduced costs of data acquisition, and lower friction to transactions.

In an exemplary first co-protocol corresponding to a credential payment category, a holder agent 42 requests a verifiable credential from an issuer agent 22 and the issuer agent 22 requires payment prior to issuance. In the first co-protocol, the holder of the holder agent 42 is the payer and the issuer agent 22 is the payee. For example, a holder (e.g., consumer) implementing the holder agent 42 wants to use a service on the internet that requires a particular verifiable credential from an issuer implementing the issuer agent 22, and the holder must pay to get the verifiable credential prior to initiating the transaction with the service, wherein the service implements a verifier agent 52.

In an exemplary second co-protocol corresponding to a credential payment category, a holder agent 42 requests a service as part of a transaction that requires a verifiable credential, and an issuer agent 22 requires payment prior to the issuer agent 22 providing an unlock signature allowing a verifier agent 52 implemented by the service to make use of the verifiable credential. In the second co-protocol, the verifier of the verifier agent 52 is the payer, and the issuer agent 22 is the payee. For example, a subscription media streaming service (e.g., Netflix™) implementing the verifier agent 52 pays the issuer agent 22 which provides credential information of a consumer (the holder of the holder agent 42) used as part of a subscription sign up process.

In an exemplary third co-protocol corresponding to a credential payment category, a service is used by a holder of a holder agent 42 in a transaction with a verifier of a verifier agent 52 that requires a verifiable credential, and a system provider of the holder agent 42 requires payment for using the SSI system 300 as part of the transaction. In the third co-protocol, the verifier of the verifier agent 52 is the payer and the system provider of the holder agent 42 is the payee. For example, a credit card company system provides a service to a holder (e.g., a consumer) of the holder agent 42 and the credit card company system receives payment from a verifier (e.g., a product or service vendor) of the verifier agent 52.

In an exemplary fourth co-protocol corresponding to a credential payment category, a service is used by a holder of a holder agent 42 in a transaction with a verifier of a verifier agent 52 that requires a verifiable credential that the holder agent 42 already possesses, and the holder receives payment from the verifier for providing the verifiable credential. In the fourth co-protocol, the verifier of the verifier agent 52 is the payer and the holder of the holder agent 42 is the payee. For example, the holder can be a loyalty program purchaser where the verifier (e.g., loyalty program administrator) pays the holder for providing a verifiable credential as part of a verified purchased transaction under the loyalty program.

In an exemplary fifth co-protocol corresponding to a service payment category, a service provided by a verifier of the verifier agent 52 is used by the holder of the holder agent 42, and the holder wants to pay for the service using the same transaction tracking mechanism that is used for credential tracking but instead is used for service tracking. In the fifth co-protocol, the holder of the holder agent 42 (e.g., buyer) is the payer and the verifier of the verifier agent 52 (e.g., seller) is the payee. For example, a holder of a holder agent 42 (e.g., consumer) has subscribed to a subscription media streaming service (e.g., Netflix™) and wants to pay for the subscription media streaming service using a transaction agent system including the SSI system 300.

In an exemplary sixth co-protocol corresponding to a service payment category, a service provided by a verifier of the verifier agent 52 is used by the holder of the holder agent 42. The service allows different payment mechanisms supported by the verifier, while the holder wants to choose which payment method is their preferred method during a specific transaction between the holder and verifier. In the sixth co-protocol, the holder of the holder agent 42 (e.g., buyer) is the payer and the verifier of the verifier agent 52 (e.g., seller) is the payee. For example, a holder of a holder agent 42 (e.g., consumer) has subscribed to a subscription media streaming service (e.g., Netflix™) and wants to pay for the subscription media streaming service using a third-party payment service (e.g., PayPal™) instead of a credit card while using the same transaction agent system (e.g., the SSI system 300) as was used for establishing the subscription.

In an exemplary seventh co-protocol corresponding to a credential payment category, the holder agent 42 requests a verifiable credential from an issuer agent 22 and the issuer agent 22 requires payment prior to issuance. In the seventh co-protocol, a sponsor of the holder of the holder agent 42 is the payer and the issuer agent 22 is the payee.

Various payment schemes are supported by the transaction agents system including the SSI system 300. Described payment schemes rely on the same architectural components included in the SSI system 300 and highlight how the architectural components interact with each other as part of a transaction to support various co-protocols that may be combined to support a payment scheme.

Three exemplary payment schemes are summarized in Table 2.

TABLE 2

| Payment Scheme | Description | Payer | Payee | Frequency |
| --- | --- | --- | --- | --- |
| 1st | Verifier pays issuer per verification for a locked credential | Verifier | Issuer | Per verification |
| 2nd | Holder pays issuer per issuance for a verifiable credential | Holder | Issuer | Per issuance |
| 3rd | Verifier pays holder per transaction for a verifiable credential | Verifier | Holder | Per verification |

In the exemplary payment schemes of Table 2 there are two scenarios described. The first scenario describes how the payment scheme supports a new verifiable credential being established, and the second scenario describes how subsequent transactions leverage an existing verifiable credential, locked or unlocked. In the case of the third payment scheme, a new verifiable credential payment would occur using the second payment scheme before proceeding with the third payment scheme. Beneficial pre-conditions for the first, second, and third payment schemes include: that the issuer agent 22, holder agent 42, and verifier agent 52 exist and support SSI infrastructure of an SSI system 300, and that transaction infrastructure including transaction agents 62, 72, 82 exists.

Following are four exemplary use cases defined to help highlight the relative pros and cons of each payment scheme of Table 2. A first use case includes providing identity proof for online service sign up. A second use case includes providing a proof of education certificate for an employment application. A third use case includes providing a proof of age to gain access to a social club. A fourth use case includes providing a proof of certified buyer of a particular product when a user (i.e., buyer) writes a product/service review.

Figure 5A:
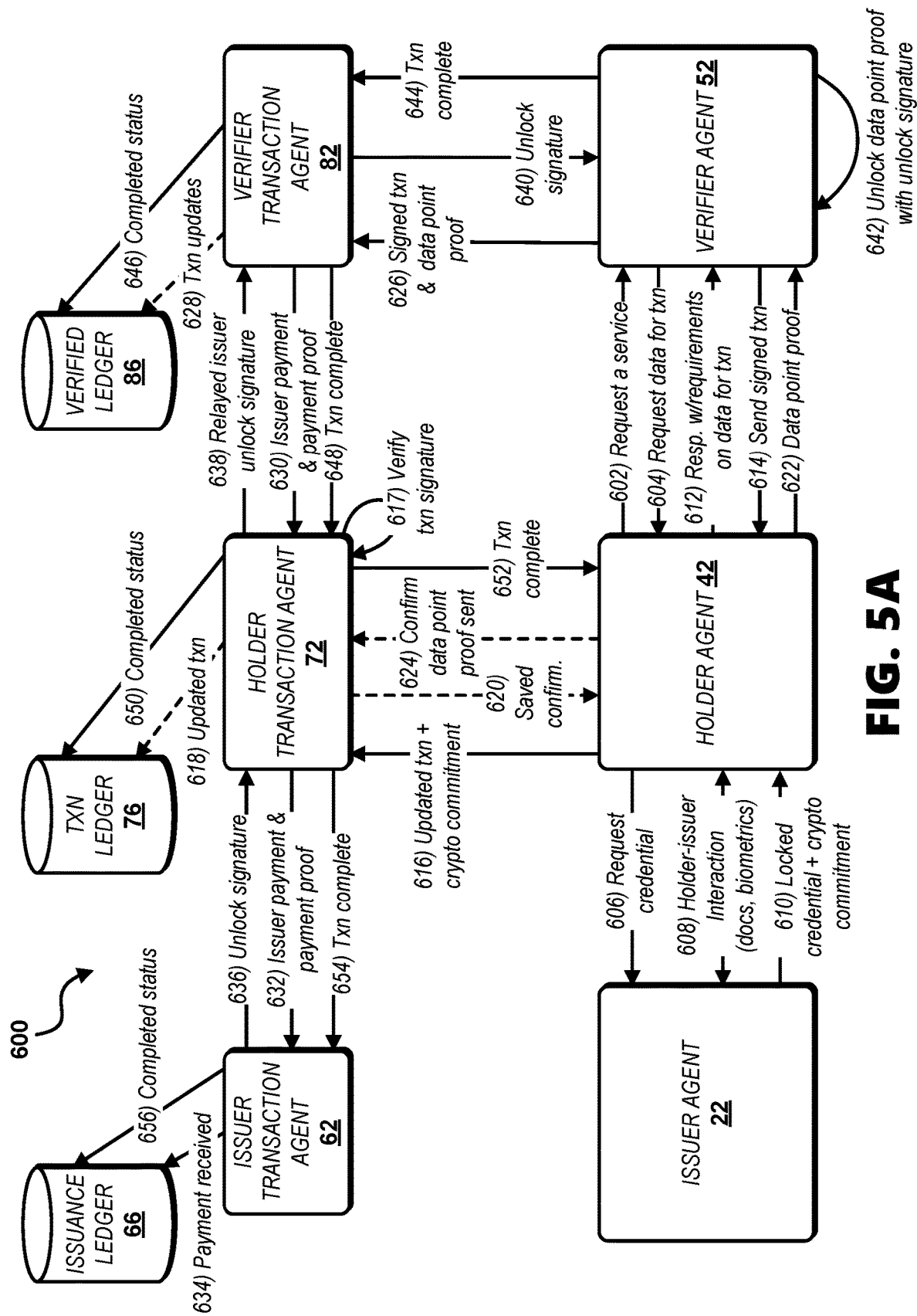
Figure 5B:
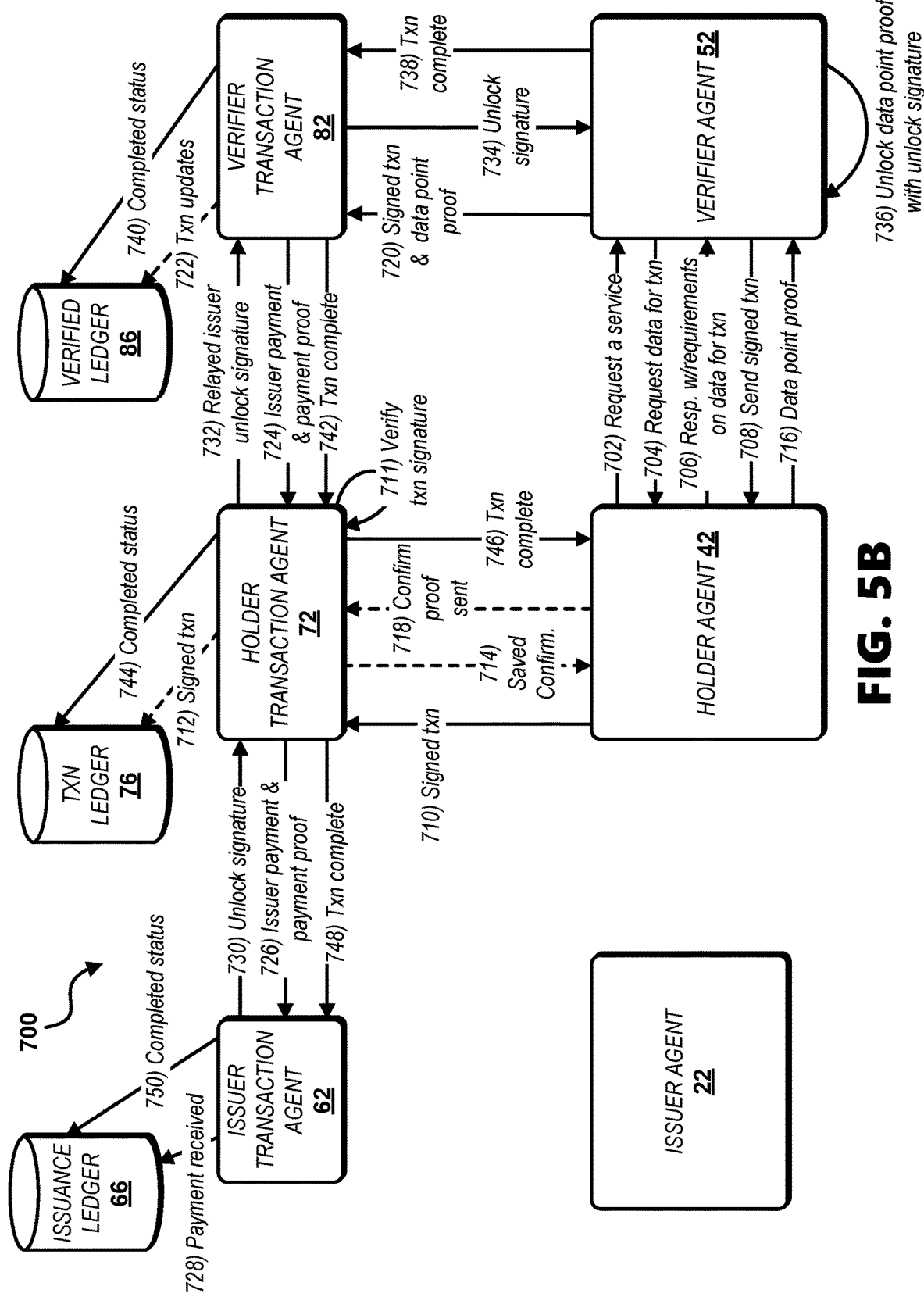

In the first payment scheme in Table 2, the verifier pays the issuer per verification for a locked credential. The first payment scheme implements transaction agents in the verification of credential processes. Payment terms of the first payment scheme include a requirement to pay per verification of transaction. Referring to FIGS. 5A and 5B, two exemplary scenarios where the first payment scheme applies are respectively represented by the process flow and system 600 and the process flow and system 700. In the process flow and system 600 of FIG. 5A, a new verifiable credential is required from an issuer agent 22. Pre-conditions of the process flow and system 600 include a requirement that no prior verifiable credential be held by the holder agent 42. In the process flow and system 700 of FIG. 5B, the holder agent 42 already possesses a verifiable credential previously received from an issuer agent 22.

The process flows and systems 600, 700 enable methods for transacting over a network by a plurality of agents including a first agent, second agent, third agent, fourth agent, fifth agent, and sixth agent. As described with respect to the process flow and system 600 and process flow and system 700, the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. The depictions of the plurality of agents with respect to the process flows and systems 600, 700 are exemplary in nature, and the process flows and systems 600, 700 are not limited by the particular naming of each agent.

Referring to FIG. 5A, the process flow and system 600 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 602). The verifier agent 52 specifies to the holder agent 42 which one or more data points such as attributes (e.g., attributes of a verifiable credential) for the transaction are required in a request for data for the transaction (e.g., a presentation request) (step 604), the one or more data points for example defining terms for the transaction (e.g., a contract) analogous to contract terms. Data points can include for example one or more of a holder's first name, last name, date of birth, credit card number, social security number, or passport number. The holder agent 42 requests a verifiable credential from the issuer agent 22 (i.e., the sixth agent) responsive to the request for data from the verifier agent 52 (step 606). The holder agent 42 does not need to disclose the identity of the verifier agent 52 in its request to the issuer agent 22, but the holder agent 42 can present the data points required by the verifier agent 52.

The holder agent 42 and issuer agent 22 interact (step 608) in order to satisfy conditions that need to be met for the issuer agent 22 to be able to issue the requested verifiable credential based on the use case, type of credential, and assurance level. For example, for a know-your-client "KYC" type verifiable credential, the holder of the holder agent 42 may be required to present their driver license or other identification on camera alongside their face. The issuer agent 22 sends to the holder agent 42 a locked credential (i.e., a verifiable credential that is locked) of the holder and a crypto commitment (step 610), information that will allow a transaction agent to pay a fee for verification. The crypto commitment is related to the locked credential and includes information for the verifier agent 52 to use to contact the issuer agent 22. The crypto commitment can be provided as a partial signature for the locked credential guaranteeing the locked credential is usable by the holder agent 42 and enabling the verifier agent 52 to verify the locked credential after a payment or other requirement is completed via the verifier transaction agent 82. The crypto commitment can include cost and payment information regarding the cost of the locked credential.

The holder agent 42 transmits a response to the verifier agent 52 (e.g., a response to a presentation request) including one or more requirements on the data requested by the verifier agent 52 for fulfilling one or more data points for the transaction (e.g., a contract) to be initiated (step 612). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent transmits a response to the holder agent 42 including the signed transaction (step 614). The signed transaction includes data of the issuer agent 22 (e.g., digital identity of the issuer agent 22).

The signed (i.e., "updated") transaction obtained by the holder agent 42 from the verifier agent 52 in step 614, including data of the issuer agent 22 (e.g., digital identity of the issuer agent 22), and the crypto commitment obtained by the holder agent 42 from the issuer agent 22 in step 610 are sent by the holder agent 42 to the holder transaction agent 72 (i.e., the first agent) (step 616). The holder transaction agent 72 beneficially verifies the signature of the signed transaction, for example by applying a public key associated with the verifier agent 52 (step 617). The signed (i.e., "updated") transaction received by the holder transaction agent 72 from the holder agent 42 in the step 616 is written to the transaction ledger 76 by the holder transaction agent 72 (step 618). Confirmation of storing of the signed transaction on the transaction ledger 76 is transmitted by the holder transaction agent 72 to the holder agent 42 (step 620). The holder agent 42 sends the verifier agent 52 a locked verifiable proof, based on the locked credential (e.g., including the locked credential), including the one or more data points ("data point proof") requested by the verifier agent 52 (step 622). The data point proof includes a presentation of the requested one or more data points and one or more locked proofs associated with the requested one or more data points.

The holder agent 42 confirms to the holder transaction agent 72 the fact that the verifier agent 52 was sent the data point proof (step 624), thus unblocking the payment part of the transaction by action of the holder transaction agent 72. The verifier agent 52 sends to the verifier transaction agent 82 (i.e., the fourth agent) the signed transaction and the data point proof received from the holder agent 42 (step 626).

The verifier transaction agent 82 saves the signed transaction and the data point proof to a verified ledger 86 (step 628) to trigger payment initiation. The verifier transaction agent 82 sends payment and proof of the payment for the issuer agent 22 to the holder transaction agent 72 (step 630). The holder transaction agent 72 deidentifies the payment and proof of the payment, and the payment and proof of the payment for the issuer agent 22 ("payment proof"), which does not disclose the payer's identity, is relayed to the issuer transaction agent 62 (i.e., the fifth agent) by the holder transaction agent 72 (step 632). The issuer transaction agent 62 saves the payment proof to the issuance ledger 66 (step 634) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 636) for relay to the verifier agent 52. The holder transaction agent 72 relays the unlock signature received from the issuer transaction agent 62 for the locked credential to the verifier transaction agent 82 (step 638). The verifier transaction agent 82 sends to the verifier agent 52 the unlock signature received from the issuer agent 22 for the locked credential to unlock the data point proof associated with the signed transaction (step 640). The verifier agent 52 subsequently unlocks the data point proof received from the holder agent 42 for the signed transaction using the unlock signature for the locked credential (step 642).

The verifier agent 52 sends notification to the verifier transaction agent 82 that the transaction has completed successfully (step 644) so that the verifier transaction agent 82 can relay the completed status, and so that the verifier transaction agent 82 can update the verified ledger 86 with the completed status. The verifier transaction agent 82 updates the verified ledger 86 with the completed status (step 646). The verifier transaction agent 82 notifies the holder transaction agent 72 that the transaction has been completed (step 648). The holder transaction agent 72 then updates the transaction ledger 76 with the completed status (step 650).

The holder transaction agent 72 notifies the holder agent 42 that the transaction has been completed (step 652), and the holder agent 42 may choose to show any updates to a user or system. The holder transaction agent 72 notifies the issuer transaction agent 62 that the transaction has been completed (step 654), and the issuer transaction agent 62 updates the issuance ledger 66 with the completed status (step 656).

Steps 618, 620, 624, and 628 provide additional levels of completeness that ensure that the SSI system 300 can detect issues and/or show progress throughout the flow sequence of the process flow and system 600. A system implementation may choose to skip one or more of steps 618, 620, 624, and 628 for optimization purposes without losing the overall resultant exchange of a transaction.

Referring to FIG. 5B, the process flow and system 700 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 702). The verifier agent 52 specifies to the holder agent 42 which one or more data points such as attributes (e.g., attributes of a verifiable credential) for the transaction are required in a request for data for the transaction (e.g., a presentation request) (step 704), the one or more data points for example defining terms for the transaction (e.g., a contract) analogous to contract terms. Data points can include for example one or more of a holder's first name, last name, date of birth, credit card number, social security number, or passport number.

The holder agent 42 transmits a response to the verifier agent 52 (e.g., a response to a presentation request) including one or more requirements on the data requested by the verifier agent 52 for fulfilling the one or more data points for the transaction (e.g., contract) to be initiated (step 706). The one or more requirements provided by the holder agent 42 include for example one or more of price, a service level agreement ("SLA"), or policies for the data requested. If the one or more requirements are acceptable to the verifier agent 52, the verifier agent 52 responds by updating the transaction to generate a signed transaction that confirms that the one or more requirements are acceptable, and the verifier agent 52 transmits a response to the holder agent 42 including the signed transaction (step 708). The signed transaction includes data of the issuer agent 22 (e.g., digital identity of the issuer agent 22).

The signed (i.e., "updated") transaction obtained by the holder agent 42 from the verifier agent 52 in step 708, including data of the issuer agent 22 (e.g., digital identity of the issuer agent 22), and a crypto commitment obtained from the issuer agent 22 at an earlier time is sent by the holder agent 42 to the holder transaction agent 72 (step 710). The holder transaction agent 72 beneficially verifies the signature of the signed transaction, for example by applying a public key associated with the verifier agent 52 (step 711). The signed (i.e., "updated") transaction received by the holder transaction agent 72 from the holder agent 42 in the step 710 is written to the transaction ledger 76 by the holder transaction agent 72 (step 712). Confirmation of storing of the signed transaction on the transaction ledger 76 is transmitted by the holder transaction agent 72 to the holder agent 42 (step 714). The holder agent 42 sends the verifier agent 52 a locked verifiable proof, based on the locked credential (e.g., including the locked credential), including the one or more data points ("data point proof") requested by the verifier agent 52 (step 716). The data point proof includes presentation of the requested one or more data points and locked proofs associated with the requested datapoints.

The holder agent 42 confirms to the holder transaction agent 72 the fact that the verifier agent 52 was sent the data point proof (step 718), thus unblocking the payment part of the transaction by action of the holder transaction agent 72. The verifier agent 52 sends to the verifier transaction agent 82 (i.e., the fourth agent) the signed transaction and the data point proof received from the holder agent 42 (step 720).

The verifier transaction agent 82 saves the signed transaction and the data point proof to a verified ledger 86 (step 722) to trigger payment initiation. The verifier transaction agent 82 sends payment and proof of the payment for the issuer agent 22 to the holder transaction agent 72 (step 724). The holder transaction agent deidentifies the payment and proof of the payment, and the payment and proof of the payment for the issuer agent 22 ("payment proof"), which does not disclose the payer's identity, is relayed to the issuer transaction agent 62 by the holder transaction agent 72 (step 726). The issuer transaction agent 62 saves the payment proof to the issuance ledger 66 (step 728) so that an unlock signature for the locked credential as associated with the data point proof can be sent back to the verifier agent 52 via the holder transaction agent 72 and verifier transaction agent 82.

The issuer transaction agent 62 sends to the holder transaction agent 72 the unlock signature for the locked credential associated with the data point proof associated with the signed transaction (step 730) for relay to the verifier agent 52. The holder transaction agent 72 relays the unlock signature received from the issuer agent 22 for the locked credential to the verifier transaction agent 82 (step 732). The verifier transaction agent 82 sends to the verifier agent 52 the unlock signature received from the issuer agent 22 for the locked credential to unlock the data point proof associated with the signed transaction (step 734). The verifier agent 52 subsequently unlocks the data point proof received from the holder agent 42 for the signed transaction using the unlock signature for the locked credential (step 736).

The verifier agent 52 sends notification to the verifier transaction agent 82 that the transaction has completed successfully (step 738) so that the verifier transaction agent 82 can relay the completed status, and so that the verifier transaction agent 82 can update the verified ledger 86 with the completed status. The verifier transaction agent 82 updates the verified ledger 86 with the completed status (step 740). The verifier transaction agent 82 notifies the holder transaction agent 72 that the transaction has been completed (step 742). The holder transaction agent 72 then updates the transaction ledger 76 with the completed status (step 744).

The holder transaction agent 72 notifies the holder agent 42 that the transaction has been completed (step 746), and the holder agent 42 may choose to show any updates to a user or system. The holder transaction agent 72 notifies the issuer transaction agent 62 that the transaction has been completed (step 748), and the issuer transaction agent 62 updates the issuance ledger 66 with the completed status (step 750).

Steps 712, 714, 718, and 722 provide additional levels of completeness that ensure that the SSI system 300 can detect issues and/or show progress throughout the flow sequence of the process flow and system 700. A system implementation may choose to skip one or more of steps 712, 714, 718, and 722 for optimization purposes without losing the overall resultant exchange of a transaction.

The scenarios represented by the process flows and systems 600, 700 enable the second co-protocol and the third co-protocol as described above. In the second co-protocol, the holder agent 42 requests a service as part of a transaction that requires a verifiable credential, and the issuer agent 22 requires payment prior to the issuer agent 22 providing an unlock signature allowing the verifier agent 52 to make use of the verifiable credential. In the second co-protocol, the verifier of the verifier agent 52 is the payer and the issuer agent 22 is the payee. In the third co-protocol, a service is used by a holder of a holder agent 42 in a transaction with a verifier of a verifier agent 52 that requires a verifiable credential, and a system provider of the holder agent 42 requires payment for using the SSI system 300 as part of the transaction. In the third co-protocol, the verifier of the verifier agent 52 is the payer and the system provider of the holder agent 42 is the payee.

The scenarios represented by the process flows and systems 600, 700 are particularly suited for application in support of the herein described first use case which includes providing identity proof for online service sign up. The scenarios represented by the process flows and systems 600, 700 are further suited for application in support of the herein described fourth use case including providing a proof of certified buyer of a particular product when a user (i.e., buyer) writes a product/service review. With regards to the fourth use case, the issuer agent 22 may be motivated not to allow certain incident response platforms ("IRPs") to be able to verify the verifiable credential (e.g., if the IRPs publish bad reviews). Alternatively, other use cases can be supported by the scenarios represented by the process flows and systems 600, 700.

Figure 6A:
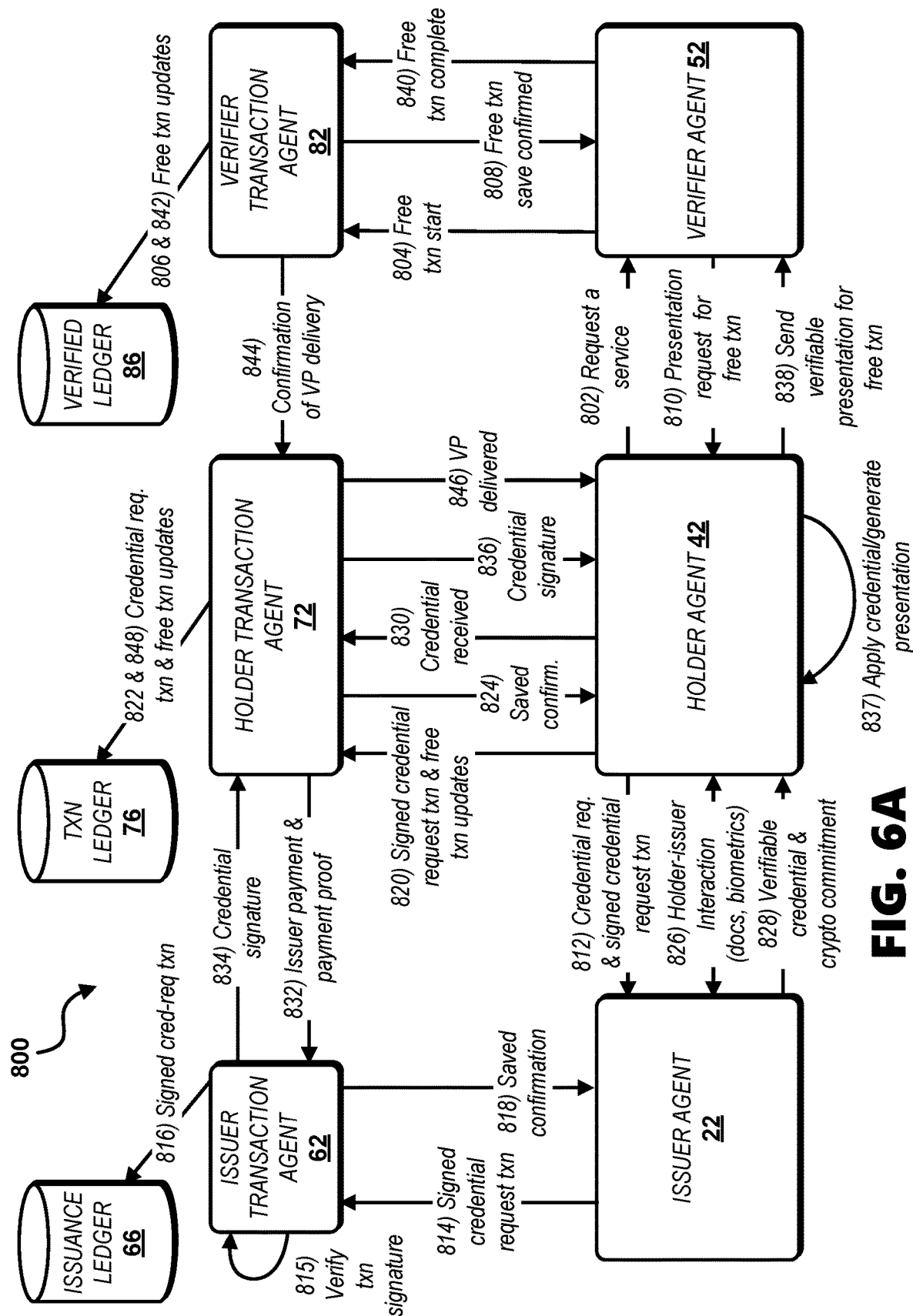
Figure 6B:
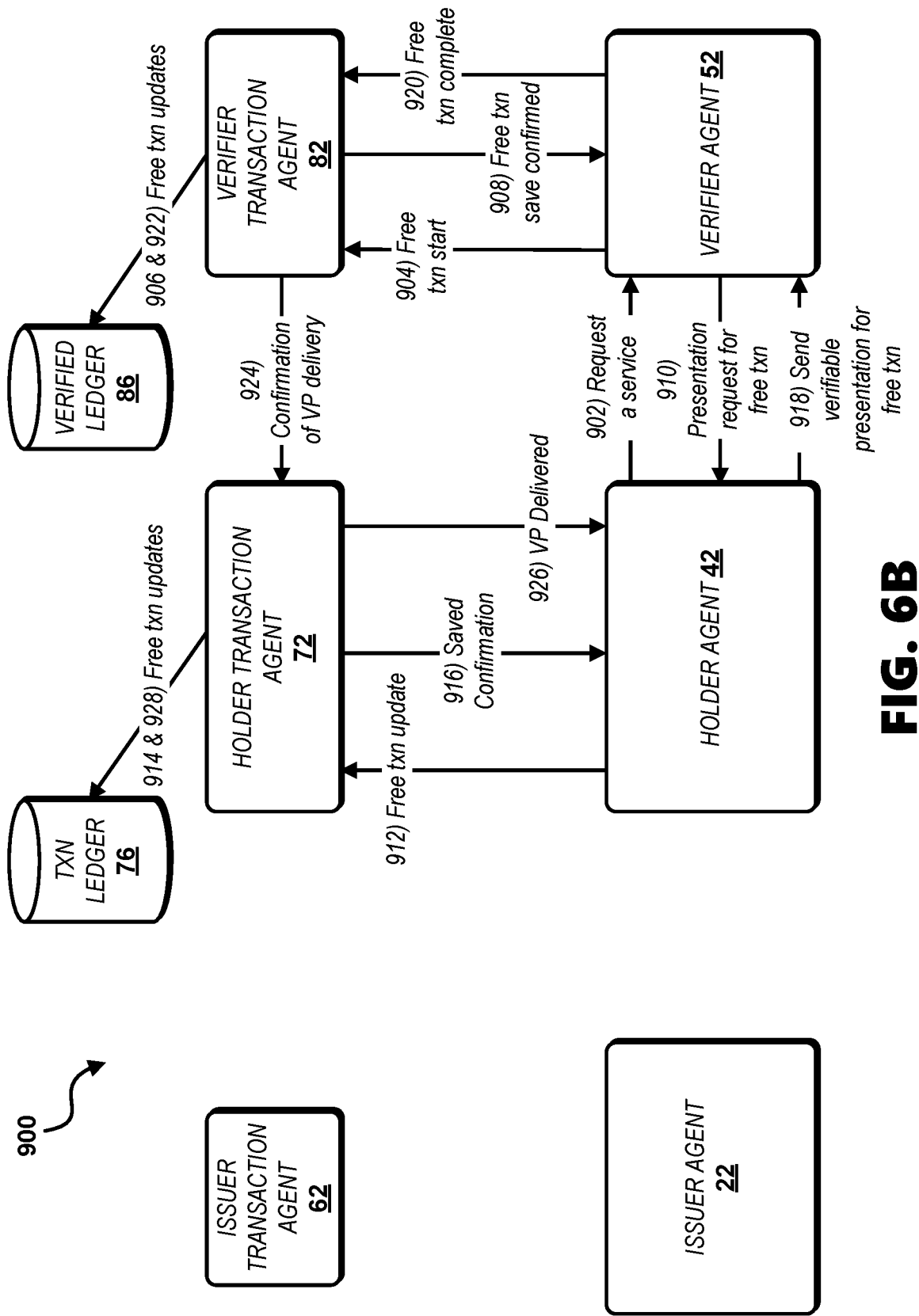

In the second payment scheme in Table 2, a holder pays an issuer per issuance for a verifiable credential. The second payment scheme implements transaction agents in the performance of credential processes. Payment terms of the second payment scheme include a requirement to pay per issuance of verifiable credentials used within a transaction. Referring to FIGS. 6A and 6B, two exemplary scenarios where the second payment scheme applies are respectively represented by the process flow and system 800 and the process flow and system 900. In the process flow and system 800 of FIG. 6A, a new verifiable credential is required from an issuer agent 22. Pre-conditions of the first process flow and system 800 include a requirement that no prior verifiable credential be held by the holder. In the process flow and system 900 of FIG. 6B, the holder agent 42 already possesses a verifiable credential previously received from the issuer agent 22.

The process flows and systems 800, 900 enable methods for transacting over a network by a plurality of agents including a first agent, second agent, third agent, fourth agent, fifth agent, and sixth agent. As described with respect to the process flow and system 800 and process flow and system 900, the first agent is depicted as a holder transaction agent 72, the second agent is depicted as a holder agent 42, the third agent is depicted as a verifier agent 52, the fourth agent is depicted as an issuer transaction agent 62, the fifth agent is depicted as an issuer agent 22, and the sixth agent is depicted as a verifier transaction agent 82. The depictions of the plurality of agents with respect to the process flows and systems 800, 900 are exemplary in nature, and the process flows and systems 800, 900 are not limited by the particular naming of each agent.

Referring to FIG. 6A, the process flow and system 800 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 802). The verifier agent 52 initiates a new transaction not subject to issuer-imposed or holder-imposed cost (hereinafter "free transaction") by sending a start notification to the verifier transaction agent 82 (i.e., the sixth agent) (step 804). The verifier transaction agent 82 saves the notification of the free transaction in the verified ledger 86 in the form of a transaction update (step 806).

The verifier transaction agent 82 notifies the verifier agent 52 that the free transaction has successfully been saved to the verified ledger 86 to allow the verifier agent 52 to begin processing a presentation request (step 808). The verifier agent 52 specifies to the holder agent 42, in a presentation request for the free transaction, one or more data points (e.g., attributes of a verifiable credential) which are required, the presentation request defining terms for the free transaction, the free transaction for example being analogous to a contract (step 810). The holder agent 42 requests a verifiable credential from the issuer agent 22 (i.e., the fifth agent), and the holder agent 42 initiates a signed credential request transaction for including payment for issuance of the verifiable credential (step 812). The issuer agent 22 sends to the issuer transaction agent 62 (i.e., the fourth agent) the signed credential request transaction from the holder agent 42 (step 814). The issuer transaction agent 62 verifies a digital signature of the digitally signed transaction (step 815), for example by application of a public key of the holder agent 42.

The issuer transaction agent 62 saves the signed credential request transaction to the issuance ledger 66 (step 816). The issuer transaction agent 62 sends confirmation of the saving of the signed credential request transaction (step 818) so that the issuer agent 22 can continue with the exchange with the holder agent 42 and to allow the issuance of a verifiable credential to the holder agent 42.

The free transaction obtained from the verifier agent 52 by the holder agent 42 in step 810 and the signed credential request transaction between the holder agent 42 and the issuer agent 22, including data of the issuer agent 22 (e.g., digital identity of the issuer agent 22) are sent by the holder agent 42 to the holder transaction agent 72 (i.e., the first agent) in the form of transaction updates (step 820). The free transaction and the credential request transaction received in step 820 by the holder transaction agent 72 are written to the transaction ledger 76 by the holder transaction agent 72 in the form of transaction updates (step 822). Confirmation of the storing of the free transaction and the credential request transaction on the transaction ledger 76 is sent by the holder transaction agent 72 to the holder agent 42 (step 824).

The holder agent 42 and issuer agent 22 interact (step 826) in order to satisfy conditions that need to be met for the issuer agent 22 to be able to issue the requested verifiable credential based on the use case, type of credential, and assurance level. For example, for a know-your-client ("KYC") type verifiable credential, the holder of the holder agent 42 may be required to present their driver license or other identification on camera alongside their face. The issuer agent 22 sends to the holder agent 42 a verifiable credential of the holder and a crypto commitment (step 828), information that will allow a transaction agent to pay a fee for verification. The crypto commitment is related to the verifiable credential and includes information for the verifier agent 52 to use to contact the issuer agent 22. The crypto commitment can be provided as a partial signature for the verifiable credential guaranteeing the verifiable credential is usable by the holder agent 42 and enabling the verifier agent 52 to verify the verifiable credential after the holder completes payment or other requirement via the holder transaction agent 72. The crypto commitment can include cost and payment information regarding the cost of the verifiable credential.

The holder agent 42 confirms to the holder transaction agent 72 the fact that the issuer agent 22 sent the verifiable credential to the holder agent 42 and the holder agent 42 received the verifiable credential (step 830) thus unblocking the payment part of the credential request transaction by action of the holder transaction agent 72. The holder transaction agent 72 sends to the issuer transaction agent 62 payment for the issuer agent 22 and proof of the payment (step 832). The issuer transaction agent 62 sends to the holder transaction agent 72 a credential signature (originating from the issuer agent 22) for the verifiable credential associated with the credential request transaction (step 834) for the holder transaction agent 72 to relay to the holder agent 42. The holder transaction agent 72 sends to the holder agent 42 the credential signature from the issuer transaction agent 62 to allow the verifiable credential associated with the credential request transaction be used (step 836).

The holder agent 42 sends a verifiable presentation for the free transaction to the verifier agent 52 (step 838), the verifiable presentation including the verifiable credential which includes the one or more data points requested by the verifier agent 52 and one or more proofs corresponding to the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the free transaction has been completed with the holder agent 42 (step 840). The verifier transaction agent 82 saves the verifiable presentation completion status including the free transaction completion information to the verified ledger 86 in the form of a transaction update (step 842). The verifier transaction agent 82 sends notification to the holder transaction agent 72 that the verifiable presentation was delivered to the verifier agent 52 and that the free transaction was completed (step 844).

The holder transaction agent 72 notifies the holder agent 42 that the verifiable presentation was delivered and that the free transaction was completed (step 846). The holder transaction agent 72 updates the transaction ledger 76 with the completion status of the free transaction indicating that the free transaction is complete (step 848).

The scenario represented by the process flow and system 800 enables the first co-protocol and the fourth co-protocol as described above. In the first co-protocol, the holder agent 42 requests a verifiable credential from an issuer agent 22 and the issuer agent 22 requires payment prior to issuance. The process flow and system 800 enables a holder to pay an issuer. Further steps can be configured so the verifier prepays or reimburses the holder for money paid or to be paid to the issuer by the holder. In the fourth co-protocol, a service is used by a holder of a holder agent 42 in a transaction with a verifier of a verifier agent 52 that requires a verifiable credential that the holder agent 42 already possesses, and the holder receives payment from the verifier for providing the verifiable credential as part of a transaction.

Referring to FIG. 6B, the process flow and system 900 is shown enabled in a network environment. A holder via the holder agent 42 (i.e., the second agent) wants to initiate a transaction for use of a service from a provider, and the provider acting as a verifier via the verifier agent 52 (i.e., the third agent) wants to verify the holder. The holder agent 42 requests the service from the verifier agent 52 (step 902). The verifier agent 52 initiates a new transaction not subject to issuer-imposed or holder-imposed cost (hereinafter "free transaction") by sending a start notification to the verifier transaction agent 82 (i.e., the sixth agent) (step 904). The verifier transaction agent 82 saves the notification of the free transaction in the verified ledger 86 in the form of a transaction update (step 906).

The verifier transaction agent 82 notifies the verifier agent 52 that the free transaction has successfully been saved to the verified ledger 86 to allow the verifier agent 52 to begin processing a presentation request (step 908). The verifier agent 52 specifies to the holder agent 42, in a presentation request for the free transaction, one or more data points (e.g., attributes of a verifiable credential) which are required, the presentation request defining terms for the free transaction, the free transaction for example being analogous to a contract (step 910).

The free transaction obtained from the verifier agent 52 by the holder agent 42 in step 910 is sent by the holder agent 42 to the holder transaction agent 72 (i.e., the first agent) in the form of a transaction update (step 912). The free transaction received in step 912 by the holder transaction agent 72 is written to the transaction ledger 76 by the holder transaction agent 72 in the form of a transaction update (step 914). Confirmation of the storing of the free transaction on the transaction ledger 76 is sent by the holder transaction agent 72 to the holder agent 42 (step 916).

The holder agent 42 sends a verifiable presentation for the free transaction to the verifier agent 52 (step 918), the verifiable presentation including the verifiable credential which includes the one or more data points requested by the verifier agent 52 and one or more proofs corresponding the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the free transaction has been completed with the holder agent 42 (step 920). The verifier transaction agent 82 saves the verifiable presentation completion status including the free transaction completion information to the verified ledger 86 in the form of a transaction update (step 922). The verifier transaction agent 82 sends notification to the holder transaction agent 72 that the verifiable presentation was delivered to the verifier agent 52 and that the free transaction was completed (step 924).

The holder transaction agent 72 notifies the holder agent 42 that the verifiable presentation was delivered and that the free transaction was completed (step 926). The holder transaction agent 72 updates the transaction ledger 76 with the completion status of the free transaction indicating that the free transaction is complete (step 928).

The scenario represented by the process flow and system 900 is particularly suited for application in support of the herein described first use case which includes providing identity proof for online service sign up. A new credential holder may find it unusual and unacceptable to have to pay for an identity credential during a service signup (if they do not already have one) under the process flow and system 800. However, a holder of an existing verifiable credential that matches the requirements of a verifier can provide that unlocked credential under the process flow and system 900 to enable an online service signup. Further, the scenarios represented by the process flows and systems 800, 900 are particularly suited for application in support of the herein described exemplary second use case (i.e., providing proof of education certificate), third use case (i.e., providing a proof of age to gain access to a social club), and fourth use case (i.e., providing a proof of certified buyer of a particular product when a user writes a product/service review). Alternatively, other use cases can be supported by the scenarios represented by the process flows and systems 800, 900.

Figure 7:
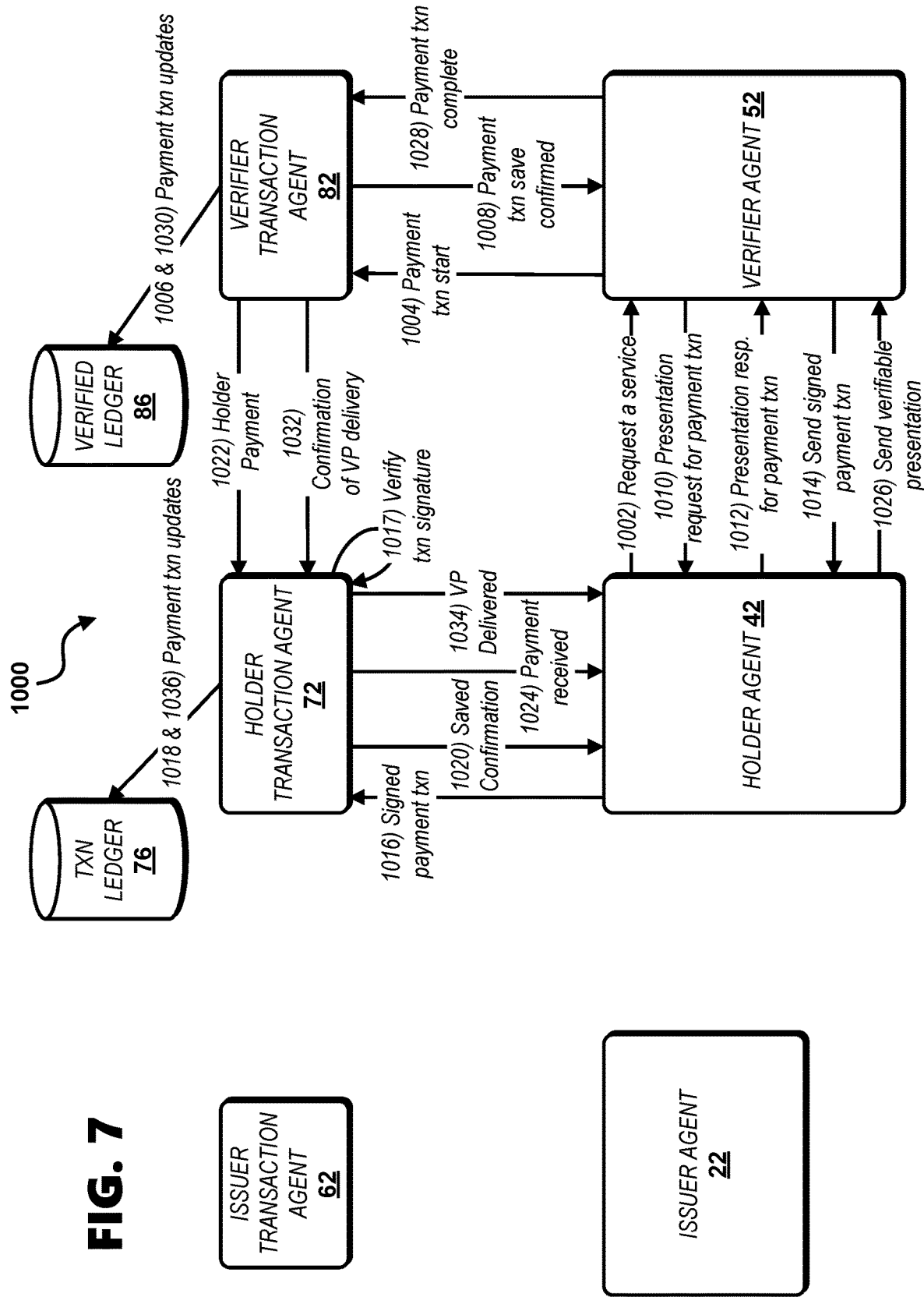

In the third payment scheme in Table 2, transaction agents are involved in a transaction where a verifier pays a holder. Payment terms of the third payment scheme include a requirement to pay a holder per transaction for a verifiable credential used within a transaction. Referring to FIG. 7, an exemplary scenario where the third payment scheme applies is represented by the process flow and system 1000 enabled in a network environment. In a case where the third payment scheme applies and where a holder does not yet have the necessary verifiable credential, the process steps applied to acquire a verifiable credential as set forth in the process flow and system 800 are performed followed by the process steps of the process flow and system 1000.

The process flow and system 1000 enables a method for transacting over a network by a plurality of agents including a first agent, second agent, third agent, fourth agent, fifth agent, and sixth agent. As described with respect to the process flow and system 1000, the first agent is depicted as a holder agent 42, the second agent is depicted as a verifier agent 52, the third agent is depicted as a holder transaction agent 72, the fourth agent is depicted as a verifier transaction agent 82, the fifth agent is depicted as an issuer agent 22, and the sixth agent is depicted as an issuer transaction agent 62. The depictions of the plurality of agents with respect to the process flow and system 1000 are exemplary in nature, and the process flow and system 1000 is not limited by the particular naming of each agent.

In the process flow and system 1000, a holder via a holder agent 42 (i.e., the first agent) wants to initiate a transaction for use of a service from a provider, and the provider acting as a verifier via a verifier agent 52 (i.e., the second agent) wants to verify the holder. The holder agent 42 requests the service from the verifier agent 52 (step 1002). The verifier agent 52 initiates a new transaction enabling payment by the verifier to the holder (hereinafter "payment transaction") by sending a start notification to the verifier transaction agent 82 (i.e., the fourth agent) (step 1004). The verifier transaction agent 82 saves the notification of the payment transaction in the verified ledger 86 in the form of a transaction update (step 1006).

The verifier transaction agent 82 notifies the verifier agent 52 that the payment transaction has successfully been saved to the verified ledger 86 to allow the verifier agent 52 to begin processing a presentation request (step 1008). The verifier agent 52 specifies to the holder agent 42, in a presentation request for the payment transaction, one or more data points (e.g., attributes of a verifiable credential) which are required, the presentation request defining terms for the payment transaction, the payment transaction for example being analogous to a contract (step 1010). The holder agent 42 transmits a response to the presentation request for the payment transaction of the verifier agent 52 including one or more requirements on the data requested by the verifier agent 52 for fulfilling one or more data points for the payment transaction (e.g., a contract) to be initiated (step 1012). The one or more requirements provided by the holder agent 42 includes for example one or more of price, a service level agreement ("SLA"), or policies for the data requested. If the one or more requirements are acceptable to the verifier agent 52, the verifier agent 52 responds by updating the payment transaction to generate a signed payment transaction that confirms that the one or more requirements are acceptable, and the verifier agent 52 transmits a response to the holder agent 42 including the signed payment transaction (step 1014).

The signed (i.e., updated) payment transaction obtained by the holder agent 42 from the verifier agent 52 in step 1014 is sent by the holder agent 42 to the holder transaction agent 72 (i.e., the third agent) (step 1016). The holder transaction agent 72 beneficially verifies the signature of the signed payment transaction, for example by applying a public key associated with the verifier agent 52 (step 1017). The signed (i.e., updated) payment transaction received by the holder transaction agent 72 from the holder agent 42 in the step 1016 is written to the transaction ledger 76 by the holder transaction agent 72 (step 1018). Confirmation of the storing of the signed payment transaction on the transaction ledger 76 is transmitted by the holder transaction agent 72 to the holder agent 42 (step 1020).

The verifier transaction agent 82 sends payment confirmation to the holder transaction agent 72 for the signed payment transaction (step 1022). The holder transaction agent 72 sends confirmation to the holder agent 42 that the payment has been received from the verifier via the verifier transaction agent 82 for the payment transaction (step 1024).

The holder agent 42 sends a verifiable presentation for the payment transaction to the verifier agent 52 (step 1026), the verifiable presentation including the verifiable credential which includes the one or more data points requested by the verifier agent 52 and one or more proofs corresponding the requested one or more data points. Responsive to receiving the verifiable presentation including the verifiable credential, the verifier agent 52 sends a verifiable presentation completion status to the verifier transaction agent 82 and notifies the verifier transaction agent 82 that the verifiable presentation has been received from the holder agent 42 and the payment transaction has been completed with the holder agent 42 (step 1028). The verifier transaction agent 82 saves the verifiable presentation completion status including the payment transaction completion information to the verified ledger 86 in the form of a transaction update (step 1030). The verifier transaction agent 82 sends notification to the holder transaction agent 72 that the verifiable presentation ("VP") was delivered to the verifier agent 52 and that the payment transaction was completed (step 1032).

The holder transaction agent 72 notifies the holder agent 42 that the verifiable presentation was delivered, and that the payment transaction was completed (step 1034). The holder transaction agent 72 updates the transaction ledger 76 with the completion status of the payment transaction indicating that the payment transaction is complete (step 1036).

The scenario represented by the process flow and system 1000 enables the fourth co-protocol as described above. In the fourth co-protocol, a service is used by a holder of a holder agent 42 in a transaction with a verifier of a verifier agent 52 that requires a verifiable credential that the holder agent 42 already possesses, and the holder receives payment from the verifier for providing the verifiable credential as part of a transaction. The scenario represented by the process flow and system 1000 is particularly suited for application in support of the herein described fourth use case (i.e., providing a proof of certified buyer of a particular product when a user writes a product/service review). Alternatively, other use cases can be supported by the scenario represented by the process flow and system 1000.

Further to the description above and referring to FIG. 5A, the process flow and system 600 enables a first method for transacting over a network by a plurality of agents including a first agent, second agent, third agent, fourth agent, fifth agent, and sixth agent. The first method is described with reference to the steps and elements of the process flow and system 600 wherein the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. The depictions of the plurality of agents with respect to the process flow and system 600 are exemplary in nature, and the process flow and system 600 is not limited by the particular naming of each agent.

The first method for transacting over a network includes receiving by a holder transaction agent 72 (i.e., the first agent) a digitally signed transaction from a holder agent 42 (i.e., the second agent), the digitally signed transaction received by the holder agent 42 from a verifier agent 52 (i.e., the third agent) and including a digital signature (step 616). The holder transaction agent 72 beneficially verifies the digital signature (step 617). A first verifiable proof (e.g., a payment proof, proof of payment) is received by the holder transaction agent 72 from a verifier transaction agent 82 (i.e., the fourth agent) (step 630). The first verifiable proof is transmitted by the holder transaction agent 72 to an issuer transaction agent (i.e., the fifth agent) (step 632). An unlock signature for a locked credential provided by an issuer agent 22 (i.e., the sixth agent) to the holder agent 42 is received by the holder transaction agent 72 from the issuer transaction agent (step 636), and the unlock signature is transmitted by the holder transaction agent 72 to the verifier transaction agent 82 (step 638).

The first method further includes transmitting by the holder agent 42 to the verifier agent 52 a request to initiate a use of a service (step 602), receiving by the holder agent 42 from the verifier agent 52 a request for one or more data points that support verification of an entity to initiate the use of the service (step 604), and transmitting by the holder agent 42 to the verifier agent 52 one or more requirements for fulfilling the one or more data points (step 612). For example, the entity can include one or both of a user of the holder agent 42 or an organization associated with the user of the holder agent 42. The one or more requirements can include for example one or more of a price, a service level agreement ("SLA"), or a policy. A data point can include for example one or more of a first name, last name, date of birth, credit card number, social security number, or passport number. The digitally signed transaction is received by the holder agent 42 from the verifier agent 52 (step 614), and a second verifiable proof (e.g., a data point proof) is transmitted by the holder agent 42 to the verifier agent 52, the second verifiable proof based on the locked credential and including the one or more data points (step 622). For example, the second verifiable proof can include the locked credential including the one or more data points. The first method can further include updating by the holder transaction agent 72 a ledger based on the digitally signed transaction received from the holder agent 42 (step 618).

The first method further includes transmitting by the holder agent 42 a request to the issuer agent 22 for the locked credential (step 606) responsive to the request for the one or more data points from the verifier agent 52, receiving by the holder agent 42 the locked credential from the issuer agent 22 (step 610), and generating by the holder agent 42 the second verifiable proof based on the locked credential (step 622). A request for entity-identifying information can be received by the holder agent 42 from the issuer agent 22, the holder agent 42 can acquire from a user the entity-identifying information, and the entity-identifying information can be transmitted by the holder agent 42 to the issuer agent 22 (step 608). Entity identifying information can include for example a driver license, business license, passport, or social security card.

The first method further includes receiving by the verifier transaction agent 82 from the verifier agent 52 the digitally signed transaction and the second verifiable proof (step 626) and transmitting by the verifier transaction agent 82 to the verifier agent 52 the unlock signature (step 640). A ledger can be updated by the verifier transaction agent 82 based on the digitally signed transaction and the second verifiable proof (step 628). The unlock signature is received by the verifier agent 52 from the verifier transaction agent 82 (step 640), the second verifiable proof is unlocked by the verifier agent 52 using the unlock signature (step 642), and the verifier agent 52 enables the use of the service responsive to the unlocking of the second verifiable proof by the verifier agent 52.

Further to the description above and referring to FIG. 6A, the process flow and system 800 enables a second method for transacting over a network by a plurality of agents including a first agent, second agent, third agent, fourth agent, fifth agent, and sixth agent. The second method is described with reference to the steps and elements of the process flow and system 800 wherein the first agent is depicted as a holder transaction agent 72, the second agent is depicted as a holder agent 42, the third agent is depicted as a verifier agent 52, the fourth agent is depicted as an issuer transaction agent 62, the fifth agent is depicted as an issuer agent 22, and the sixth agent is depicted as a verifier transaction agent 82. The depictions of the plurality of agents with respect to the process flow and system 800 are exemplary in nature, and the process flow and system 800 is not limited by the particular naming of each agent.

The second method for transacting over a network includes receiving by a holder transaction agent 72 (i.e., the first agent) a first transaction (e.g., a free transaction) from a holder agent 42 (i.e., the second agent) (step 820), the first transaction initiated by a verifier agent 52 (i.e., the third agent). A first verifiable proof (e.g., proof of payment) is transmitted by the holder transaction agent 72 to an issuer transaction agent 62 (i.e., the fourth agent) (step 832). The second method further includes receiving by the holder transaction agent 72 from the issuer transaction agent 62 a credential signature for a verifiable credential including one or more data points provided by an issuer agent 22 (i.e., the fifth agent) to the holder agent 42 for the first transaction (step 834) and transmitting by the holder transaction agent 72 to the holder agent 42 the credential signature (step 836).

The second method further includes receiving by the holder transaction agent 72 from the holder agent 42 a second transaction (e.g., a credential request transaction) including identifying data of the issuer agent 22 (step 820) and transmitting by the holder transaction agent 72 to the issuer transaction agent 62 the first verifiable proof based on the second transaction (step 832).

The second method further includes transmitting by the holder agent 42 to the issuer agent 22 a request for the verifiable credential, the request for the verifiable credential including the second transaction (step 812) and providing by the holder agent 42 to the issuer agent 22 entity-identifying information (step 826). The verifiable credential is received by the holder agent 42 from the issuer agent 22 (step 828). An indication that the verifiable credential was received by the holder agent 42 is received by the holder transaction agent 72 from the holder agent 42 (step 830). The transmitting by the holder transaction agent 72 to the issuer transaction agent 62 the first verifiable proof (e.g., the proof of payment) (step 832) is responsive to the receiving by the holder transaction agent 72 from the holder agent 42 the indication that the verifiable credential was received by the holder agent 42.

The second method further includes transmitting by the holder agent 42 to the verifier agent 52 a request to initiate a use of a service (step 802) and receiving by the holder agent 42 from the verifier agent 52 a request for the one or more data points to initiate the use of the service (step 810). The credential signature is applied to the verifiable credential by the holder agent 42 to generate a signed credential including the one or more data points (step 837), and the signed credential including the one or more data points is transmitted by the holder agent 42 to the verifier agent 52 (step 838). A second verifiable proof including the one or more data points can be generated by the holder agent 42 based on the signed credential (step 837). The second verifiable proof including the one or more data points can be transmitted by the holder agent 42 to the verifier agent 52 (step 838). The second verifiable proof can for example be generated and transmitted by the holder agent 42 to the verifier agent 52 as a verifiable presentation ("VP") including the signed credential.

The second method further includes receiving by a verifier transaction agent 82 from the verifier agent 52 an indication that the second verifiable proof has been received by the verifier agent 52 (step 840). The indication that the second verifiable proof has been received by the verifier agent 52 is received by the holder transaction agent 72 from the verifier transaction agent 82 (step 844). The indication that the second verifiable proof has been received by the verifier agent 52 is transmitted by the holder transaction agent 72 to the holder agent 42 (step 846).

The second method further includes updating by the holder transaction agent 72 a ledger based on the second transaction (e.g., a credential request transaction) from the holder agent 42 (step 822) and updating by the holder transaction agent 72 the ledger based on the indication that the second verifiable proof has been received by the verifier agent 52 (step 848).

The second method further includes receiving by the issuer transaction agent 62 from the issuer agent 22 the second transaction (e.g., a credential request transaction) (step 814) and transmitting the credential signature by the issuer transaction agent 62 to the holder transaction agent 72 based on the second transaction and the first verifiable proof (e.g., a proof of payment) (step 834). The second transaction can include a digitally signed transaction, and the issuer transaction agent 62 can verify the digitally signed transaction (step 815).

Further to the description above and referring to FIG. 7, the process flow and system 600 enables a third method for transacting over a network by a plurality of agents including a first agent, second agent, third agent, and fourth agent. The third method is described with reference to the steps and elements of the process flow and system 1000 wherein the first agent is depicted as a holder agent 42, the second agent is depicted as a verifier agent 52, the third agent is depicted as a holder transaction agent 72, and the fourth agent is depicted as a verifier transaction agent 82. The depictions of the plurality of agents with respect to the process flow and system 1000 are exemplary in nature, and the process flow and system 1000 is not limited by the particular naming of each agent.

The third method for transacting over a network includes transmitting by a holder agent 42 (i.e., the first agent) to a verifier agent 52 (i.e., the second agent) a request to initiate a use of a service (step 1002), receiving by the holder agent 42 from the verifier agent 52 a request for one or more data points to initiate the use of the service (step 1010), transmitting by the holder agent 42 to the verifier agent 52 one or more requirements for fulfilling the one or more data points (step 1012). A digitally signed transaction (e.g., a payment transaction) including a digital signature is received by the holder agent 42 from the verifier agent 52 (step 1014). The digitally signed transaction is transmitted by the holder agent 42 to a holder transaction agent 72 (i.e., the third agent) (step 1016). An indication that a first verifiable proof (e.g., proof of payment, payment proof) for the digitally signed transaction was received is received by the holder agent 42 from the holder transaction agent 72 (step 1024), and the holder agent 42 transmits to the verifier agent 52 a second verifiable proof, the second verifiable proof based on a verifiable credential including the one or more data points (step 1026).

The third method for transacting over a network further includes receiving by the holder transaction agent 72 from a verifier transaction agent 82 (i.e., the fourth agent) the first verifiable proof (e.g., proof of payment, payment proof) (step 1022) and transmitting by the holder transaction agent 72 to the holder agent 42 the indication that the first verifiable proof for the digitally signed transaction was received (step 1024).

The second verifiable proof beneficially includes the verifiable credential. The second verifiable proof can be transmitted as a verifiable presentation ("VP") including the verifiable credential (step 1026). The third method for transacting over a network further includes receiving by a verifier transaction agent 82 from the verifier agent 52 an indication that the second verifiable proof has been received by the verifier agent 52 to complete the digitally signed transaction (step 1028), receiving by the holder transaction agent 72 from the verifier transaction agent 82 the indication that the second verifiable proof has been received by the verifier agent 52 (step 1032), and transmitting by the holder transaction agent 72 to the holder agent 42 the indication that the second verifiable proof has been received by the verifier agent 52 (step 1034).

Further to the description above and referring to FIG. 4, the process flows and systems 600, 700, 800, 900, 1000 are enabled by the transaction scheme system 500 for transacting over a network by a plurality of agents including a first agent, second agent, third agent, fourth agent, fifth agent, and sixth agent. With respect to the transaction scheme system 500, the first agent is depicted as a holder transaction agent 72, the second agent is depicted as a holder agent 42, the third agent is depicted as a verifier agent 52, the fourth agent is depicted as a verifier transaction agent 82, the fifth agent is depicted as an issuer transaction agent 62, and the sixth agent is depicted as an issuer agent 22. A first computing device is depicted as a holder transaction agent service provider system 70 and a second computing device is depicted as a holder device 40. The depictions of the plurality of agents, devices, and ledgers with respect to the transaction scheme system 500 are exemplary in nature, and the transaction scheme system 500 is not limited by the particular naming of each agent, device, or ledger.

The transaction scheme system 500 is configured for transacting over a network and includes a holder transaction agent 72 (i.e., the first agent) and a holder agent 42 (i.e., the second agent). The holder agent 42 is operable to transact with a verifier agent 52 (i.e., the third agent) for use of a service. The verifier agent 52 is enabled to communicate with a verifier transaction agent 82 (i.e., the fourth agent). The holder transaction agent 72 is operable to communicate with the holder agent 42 to facilitate the transacting by the holder agent 42 with the verifier agent 52 for the use of the service, and the holder transaction agent 72 is operable to communicate with the verifier transaction agent 82 to facilitate the transacting by the holder agent 42 with the verifier agent 52 for the use of the service.

The holder transaction agent 72 is further operable to transact with an issuer transaction agent 62 (i.e., the fifth agent) for a signature for a verifiable credential to facilitate the transacting by the holder agent 42 with the verifier agent 52 for the use of the service. The holder agent 42 is further operable to transact with an issuer agent 22 (i.e., the sixth agent) for the verifiable credential to facilitate the transacting by the holder agent 42 with the verifier agent 52 for the use of the service, the issuer agent 22 enabled to communicate with the issuer transaction agent 62. The holder agent 42 is further operable to transmit the verifiable credential to the verifier agent 52.

The holder transaction agent 72 is further operable to transmit the signature for the verifiable credential to the verifier transaction agent 82. The verifier transaction agent 82, included in the transaction scheme system 500, is operable to transmit the signature for the verifiable credential to the verifier agent 52. The transaction scheme system 500 further includes a transaction ledger 76, the holder transaction agent 72 operable to update the transaction ledger 76 based on the transacting by the holder agent 42 for the use of the service. The transaction scheme system 500 further includes a verified ledger 86, the verifier transaction agent 82 operable to update the verified ledger 86 based on the transacting by the holder agent 42 for the use of the service.

The transaction scheme system 500 further includes a holder transaction agent service provider system 70 (i.e., the first computing device) on which the holder transaction agent 72 is enabled and a holder device 40 (i.e., the second computing device) on which the holder agent 42 is enabled.

The transaction scheme system 500 further includes the issuer transaction agent 62 which is operable to transact with the holder transaction agent 72 to provide the holder transaction agent 72 a signature for a verifiable credential to facilitate the transacting by the holder agent 42 with the verifier agent 52 for the use of the service. The verifier transaction agent 82 is operable to receive the signature for the verifiable credential from the holder transaction agent 72 and to transmit the signature for the verifiable credential to the verifier agent 52. The holder agent 42 is further operable to transact with an issuer agent 22 for the verifiable credential to facilitate the transacting by the holder agent 42 with the verifier agent 52 for the use of the service. The holder agent 42 is further operable to transmit the verifiable credential to the verifier agent 52.

The holder agent 42 is further operable to transmit to the issuer agent 22 a request for the verifiable credential. The issuer transaction agent 62 is further operable to receive the request for the verifiable credential from the issuer agent 22, receive a verifiable proof from the holder transaction agent 72, and transmit the signature for the verifiable credential to the holder transaction agent 72 based on the request for the verifiable credential and the verifiable proof.

In further illustrative embodiments, further self-sovereign identity ("SSI") systems are provided for enhancing digital trust for users of network-enabled services (e.g., consumers functioning as holders of credentials) and providers of network-enabled services (e.g., application providers functioning as verifiers of credentials or credential issuers) during transactions over a network.

Referring to FIG. 8, an enhanced self-sovereign identity ("SSI") system in the form of a digital trust system 1100 is provided. The digital trust system 1100 enables generation of a cryptographically verifiable credential that includes one or more assertions regarding an entity, for example a holder, an issuer, or a verifier, to determine trustworthiness of the entity ("digital trust credential"). The digital trust credential can be provided for example as a locked or unlocked vendor digital trust credential that attests to a set of assertions that have been evaluated with a focus on a vendor providing the role of an issuer or a verifier. Alternatively, the digital trust credential can be provided as a consumer digital trust credential that attests a set of assertions that have been evaluated with a focus on a consumer providing the role of a holder.

A digital trust issuer service 170 is a service from which issuers, holders, and verifiers can request a digital trust credential based on their role. The digital trust issuer service 170 can be provided as a cloud-based service that integrates with a digital trust assessment service 172 to determine the assessments on the digital trust credential.

The digital trust assessment service 172 evaluates security data, performs scanning, and performs analysis of multiple criteria to determine the resultant reports on assessments required by the digital trust issuer service 170. A holder via a holder device 140 can explicitly signal with the digital trust assessment service 172 by executing one or more security applications or exercising security options on one or more holder devices 140 to allow the digital trust assessment service 172 to evaluate the trustworthiness of the holder. The digital trust assessment service 172 performs both an initial assessment and ongoing assessments to maintain the accuracy of the assessments provided in a digital trust credential of an entity. The digital trust issuer service 170, the digital trust assessment service 172, and analytical backend systems 174 supporting processes performed by the digital trust assessment service 172 are collectively referred to herein as a primary transaction agent 162 which is executed on one or more computing systems respectively as a primary transaction agent service provider system 160.

A distributed ledger ("revocation ledger") 178 is provided that allows the digital trust issuer service 170 to maintain the validity and correctness of the digital trust credentials issued by the digital trust issuer service 170 to other roles in the digital trust system 1100 including a plurality of agents. The plurality of agents are configured to service an issuer, a holder, and a verifier and as such are respectively delineated as a primary issuer agent 122, a holder agent 142, and a primary verifier agent 152 which are executed on one or more computing systems respectively delineated as an issuer system 120, a holder device 140, and a verifier system 150.

An issuer and a verifier can include for example business entities that issue verifiable credentials or use verifiable credentials respectively the primary issuer agent 122 and the primary verifier agent 152 respectively to provide a network-enabled service to a holder (e.g., a consumer) via a holder agent 142. A network-enabled service as described herein can include for example a subscription media streaming service, a service enabling download or updating of one or more software applications, an internet-based subscription news site, an internet-based social networking site, a network-connectable news application, a network-connectable social networking application, a network-connectable messaging application, or a network-connectable media delivery application. By integrating with the digital trust system 1100 an issuer or a verifier via a primary issuer agent 122 or primary verifier agent 152 can leverage a digital trust credential in decision-making processes.

The digital trust system 1100 enables verifier-holder interactions 1102 between the primary verifier agent 152 and the holder agent 142. Issuer-holder interactions 1104 are enabled between the primary issuer agent 122 and the holder agent 142 and include transmission of a primary verifiable credential transmitted by the primary issuer agent 122 to the holder agent 142 for use by the holder agent 142 in transacting for a network-enabled service. Verifier to digital trust issuer service interactions 1106 are enabled between the primary verifier agent 152 and the digital trust issuer service 170. Issuer to digital trust issuer service interactions 1108 are enabled between the primary issuer agent 122 and the digital trust issuer service 170. Trust credential revocation updates 1110 are transmitted by the digital trust issuer service 170 to the revocation ledger service 178. Trust credential revocation updates 1112 are transmitted from the revocation ledger service 178 to the primary verifier agent 152. Trust credential revocation updates 1114 are transmitted from the revocation ledger service 178 to the primary issuer agent 122. Holder to digital trust issuer service interactions 1116 are enabled between the digital trust issuer service 170 and the holder agent 142 and include transmission of a holder's trust credential by the digital trust issuer service 170 to the holder agent 142. Holder to digital trust assessment service interactions 1118 are enabled between the holder agent 142 and the digital trust assessment service 172 and include transmission of information by the holder agent 142 to the digital trust assessment service 172 for processing by the digital trust assessment service 172 via analytical backend systems 174 to determine an assessment of the holder of the holder agent 142. Digital trust issuer service to digital trust assessment service interactions 1120 are enabled by the digital trust issuer service 170 and the digital trust assessment service 172 and include transmissions of assessments from the digital trust assessment service 172 to the digital trust issuer service 170 to be used in generation of trust credentials by the digital trust issuer service 170. Ledger updates 1122 for maintaining records of the digital trust credentials are transmitted by the digital trust issuer service 170 to the digital trust credential ledger 176.

The digital trust system 1100 enables a primary transaction agent 162 that provides a digital trust credential based on a tiered assessment level via the digital trust issuer service 170 on behalf of a requesting entity (e.g., a consumer, holder) acting as a credential holder via a holder agent 142. The digital trust is credential digitally signed based on one or more assessments of the requesting entity. During an issuance verification process, an issuer of a credential via a primary issuer agent 122 requests a digital trust credential from a consumer via the holder agent 142, the consumer via the holder agent 142 requests from the transaction-enabling entity the digital trust credential via the digital trust issuer service 170. The digital trust credential includes one or more credential claims including assessments for each aspect of digital activity or action of the consumer. To receive a digital trust credential from the digital trust issuer service 170, the consumer agrees to specific terms set by a service-providing entity implementing the digital trust issuer service 170 that allows the service-providing entity to provide the consumer with a digital trust credential based on a tiered assessment level. A credential issuer via the primary issuer agent 122 validates a digital trust credential provided by the consumer via the holder agent 142 to accept or decline to issue a particular additional verifiable credential requested by the consumer via the holder agent 142. A digital trust credential beneficially includes multiple credential claims including assessments established by the digital trust assessment service 172. A hypothetical example credential claim of a digital trust credential includes an assessment which asserts "My overall cyber hygiene is X, and my individual cyber hygiene vector scores are in the top 25% of analyzed users across behavior, OS, application vectors."

Figure 9:
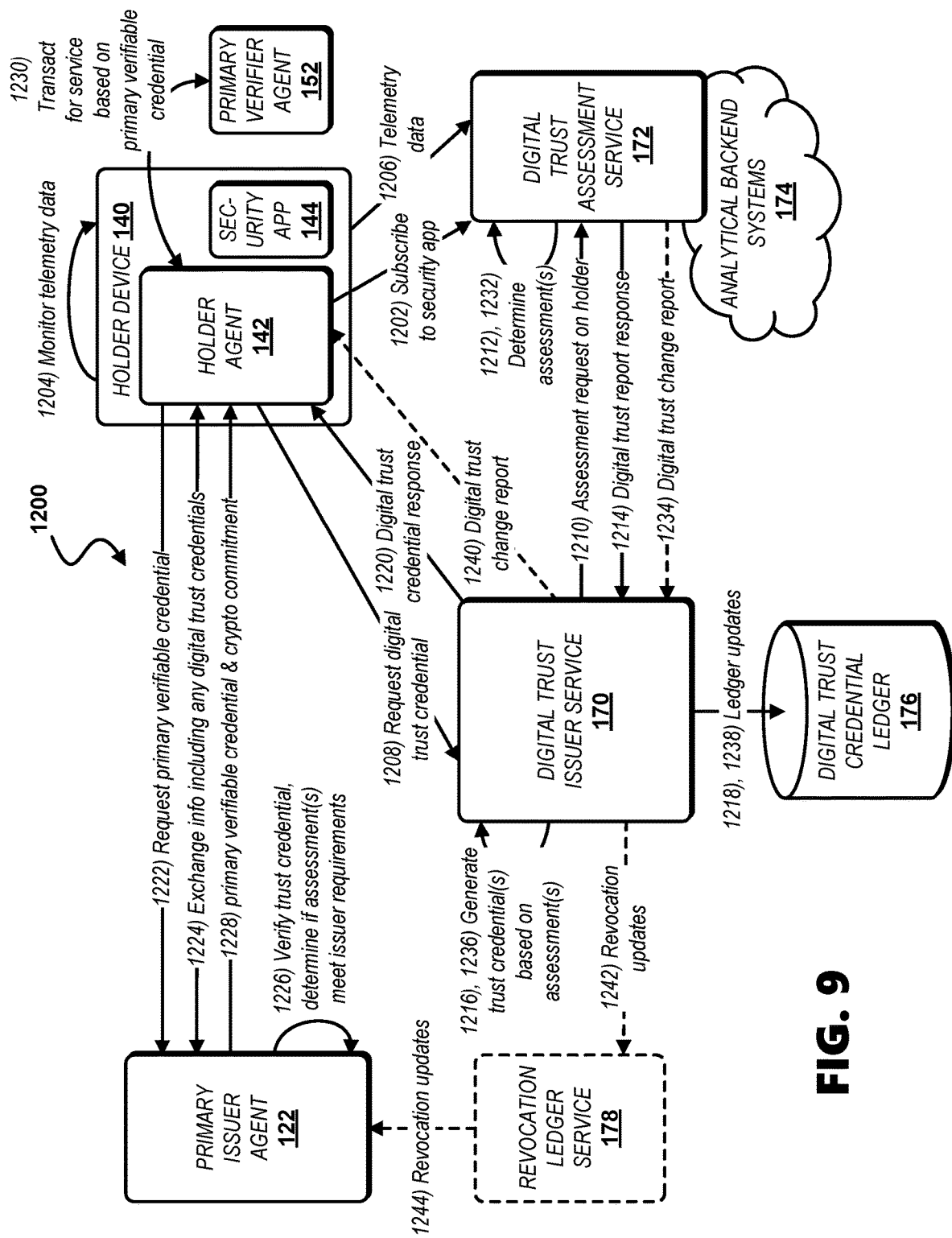

Referring to FIG. 9, an example scenario is depicted by a process flow and system 1200 incorporating the digital trust system 1100 in which a digital cryptographically verifiable credential (a "primary verifiable credential") is required by a holder agent 142 from a primary issuer agent 122 to enable the holder agent 142 to transact for a network-enabled service with a primary verifier agent 152. The primary credential can be for example locked or unlocked. The primary issuer agent 122 operates and transacts on behalf of an issuer of credentials (an "issuer") and uses an entity's digital trust credential as presented by the holder agent 142 as part of a credential issuance validation process. The digital trust assessment service 172 provides a report to the digital trust issuer service 170 to support credential claims, including assessments, to be included in one or more digital trust credentials pertaining to the entity (the "holder"). The digital trust assessment service 172 is integrated with analytical backend systems 174 to provide assessments and reports including the assessments. The digital trust issuer service 170 issues one or more digital trust credentials for the holder based on the assessment report received from the digital trust assessment service 172. The one or more digital trust credentials can be provided for example as locked or unlocked. A revocation ledger service 178 provides updates on when previously issued digital trust credentials for the holder are no longer valid or usable by the holder and the issuer.

The process flow and system 1200 enables methods for transacting over a network by a plurality of agents including a first agent, second agent, third agent, and fourth agent. As described with respect to the process flow and system 1200, the first agent is depicted as a holder agent 142, the second agent is depicted as a primary transaction agent 162 performing functions of the digital trust issuer service 170, the digital trust assessment service 172, and the analytical backend systems 174, the third agent is depicted as a primary issuer agent 122, and the fourth agent is depicted as a primary verifier agent 152. The depictions of the plurality of agents with respect to the process flow and system 1200 are exemplary in nature, and the process flow and system 1200 is not limited by the particular naming of each agent.

The process flow and system 1200 is shown enabled in a network environment. The holder, via the holder agent 142 (i.e., the first agent) which transacts on behalf of the holder, wants to obtain from an issuer via a primary issuer agent 122 (i.e., the third agent) one or more digital cryptographically verifiable credentials (each a "primary verifiable credential") for transacting with a provider of a service, the provider of the service operating as a verifier via the primary verifier agent 152 (i.e., the fourth agent). The holder agent 142 of the holder beneficially subscribes to a security application 144 executed on the holder device 140 of the holder to facilitate aggregation of data used in generating an assessment of the holder (step 1202). The holder device 140 is configured to monitor telemetry data via the security application 144 executed on the holder device 140 (step 1204). Telemetry data is activity data and settings information on a computing system. The telemetry data of the holder device 140 is transmitted by the holder device 140 to the digital trust assessment service 172, for example via the holder agent 142 or alternatively via the security application 144, and the digital trust assessment service 172 receives the telemetry data from the holder device 140 (step 1206). The digital trust assessment service 172 forms a component of the primary transaction agent 162 (i.e., the second agent). The telemetry data can include for example signals from which a level of trust or quality of reputation of the holder can be assessed ("trust signals"), for example device security settings, application settings, or user online behavior. Additional telemetry data can be received by the digital trust assessment service 172 from other computing devices operated by the holder executing one or both of the security application 144 or the holder agent 142 or from other network accessible resources.

The holder agent 142 requests one or more other digital cryptographically verifiable credentials ("trust credentials") from the digital trust issuer service 170 (step 1208), the digital trust issuer service 170 forming another component of the primary transaction agent 162. The digital trust issuer service 170 requests one or more assessments of the holder from the digital trust assessment service 172 responsive to the request from the holder agent 142 (step 1210). The digital trust assessment service 172 determines one or more assessments of the holder based on the telemetry data (step 1212) and transmits a digital trust report response including the determined one or more assessments to the digital trust issuer service 170 (step 1214). The one or more assessments can relate to a level of trust which can be implied to the holder. The digital trust issuer service 170 generates one or more trust credentials as one or more digitally signed credentials based on the one or more assessments of the holder in the digital trust report response, each of the one or more trust credentials based on one or more of the assessments (step 1216). The digital trust issuer service 170 updates a digital trust credential ledger 176 based on the generated one or more trust credentials (step 1218). The digital trust issuer service 170 transmits a response to the holder agent 142 including the one or more trust credentials, and the holder agent 142 receives the one or more trust credentials from the digital trust issuer service 170 (step 1220).

The monitoring of the telemetry data in step 1204 can include for example determining by the holder device 140 a security application (e.g., an antivirus application) installed on the holder device 140 and other devices operated by the holder. The transmitting of the telemetry data in step 1206 can include transmitting by the holder device 140 an indication of the security application to the digital trust assessment service 172, wherein the digital trust assessment service 172 in step 1212 is operable to determine one of the one or more assessments based on the indication of the security application installed on the holder device 140 and other devices operated by the holder.

The monitoring of the telemetry data in step 1204 can include for example determining by the holder device 140 a network location from which the holder device 140 and other devices of the holder operate in the computer network. The transmitting of the telemetry data in step 1206 can include transmitting by the holder device 140 an indication of the network location from which the holder device 140 and other devices of the holder operate in the computer network, wherein the digital trust assessment service 172 is operable in step 1212 to determine one of the one or more assessments based on the indication of the network location from which the holder device 140 and other devices of the holder operate in the computer network.

The monitoring of the telemetry data in step 1204 can include for example determining by the holder device 140 a frequency of change of network locations from which the holder device 140 and other devices of the holder operate in the computer network. The transmitting of the telemetry data in step 1206 can include transmitting by the holder device 140 an indication of the frequency of change of network locations from which the holder device 140 and other devices of the holder operate in the computer network, wherein the digital trust assessment service 172 is operable in step 1212 to determine one of the one or more assessments based on the indication of the frequency of change of network locations from which the holder device 140 and other devices of the holder operate in the computer network.

The holder device 140 includes an operating system. The monitoring of the telemetry data in step 1204 can include for example determining by the holder device 140 one or more versions of one or both of the operating system or the security application 144 installed on the holder device 140 and other devices operated by the holder. The transmitting of the telemetry data in step 1206 can include transmitting by the holder device 140 an indication of the one or more versions to the digital trust assessment service 172, wherein the digital trust assessment service 172 in step 1212 is operable to determine one of the one or more assessments based on the indication of the one or more versions.

The holder device 140 can further include a network browser (e.g., an internet browser). The monitoring of the telemetry data in step 1204 can include for example determining by the holder device 140 an instruction to disable tracking by the network browser on the holder device 140 and other devices operated by the holder. The transmitting of the telemetry data in step 1206 can include transmitting by the holder device 140 the determination of the instruction to disable the tracking to the digital trust assessment service 172, wherein the digital trust assessment service 172 in step 1212 is operable to determine one of the one or more assessments based on the determination of the instruction to disable the tracking.

The monitoring of the telemetry data in step 1204 can include for example determining by the holder device 140 one or more actions performed by the holder device 140 or one or more settings activated on the holder device 140 and other devices operated by the holder. The transmitting of the telemetry data in step 1206 can include transmitting by the holder device 140 the determination of the one or more actions performed by the holder device 140 or the one or more settings activated on holder device 140 to the digital trust assessment service 172, wherein the digital trust assessment service 172 in step 1212 is operable to determine a plurality of assessments of the holder based on the one or more actions performed by the holder device 140 or the one or more settings activated on holder device 140. The one or more assessments can include for example a security risk assessment based on the plurality of assessments of the holder.

The holder agent 142 is configured to transact with the primary issuer agent 122 for one or more cryptographically verifiable credentials (the "primary verifiable credential") based on the one or more trust credentials obtained by the holder agent 142 from the digital trust issuer service 170, which primary verifiable credential is useable to facilitate transacting by the holder agent 142 with the primary verifier agent 152 for use of a service. The holder agent 142 requests the primary verifiable credential from the primary issuer agent 122 (step 1222). The holder agent 142 and the primary issuer agent 122 exchange information in which a request by the primary issuer agent 122 for the one or more trust credentials is transmitted to the holder agent 142, which exchange of information includes a transmission of the one or more trust credentials of the holder from the holder agent 142 to the primary issuer agent 122 responsive to the request (step 1224). Further in step 1224, one or more assessment-based trust credentials of the issuer, as described herein for example with respect to step 1310 of the process flow and system 1300, can be requested by the holder agent 142 and provided to the holder agent 142 from the primary issuer agent 122 responsive to the request. The primary issuer agent 122 cryptographically verifies the one or more trust credentials of the holder, for example by using a public key rendered accessible by the digital trust issuer service 170, and the primary issuer agent 122 validates the one or more trust credentials of the holder by determining whether the one or more assessments in the one or more trust credentials meet requirements of the issuer (step 1226).

If the one or more trust credentials are verified and meet the requirements of the primary issuer agent 122, the primary issuer agent 122 transmits the primary verifiable credential and a crypto commitment to the holder agent 142, and the holder agent 142 receives the primary verifiable credential and the crypto commitment from the primary issuer agent 122 (step 1228). The crypto commitment is related to the primary verifiable credential and includes information for the primary verifier agent 152 to use to contact the primary issuer agent 122. The crypto commitment can be provided as a partial signature for the primary verifiable credential guaranteeing the primary verifiable credential is usable by the holder agent 142 and enabling the primary verifier agent 152 to verify the primary verifiable credential after a payment to the issuer or other requirement is completed for example via the primary verifier agent 152.

The holder agent 142 is enabled to transact with the primary verifier agent 152 for use of a service using the primary verifiable credential or a plurality of primary verifiable credentials (step 1230). During the transacting of step 1230, the holder agent 142 is enabled to transmit the primary verifiable credential to the primary verifier agent 152 as a verifiable presentation, and the primary verifiable credential is cryptographically verified and validated by the primary verifier agent 152 to enable the network-enabled service. The primary verifier agent 152 can access via a computer network a public key corresponding to the primary verifiable credential, for example rendered accessible by the primary issuer agent 122. The primary verifier agent 152 cryptographically verifies the primary verifiable credential based on the public key (step 1230) and provides the network-enabled service at least responsive to the cryptographically verifying the primary verifiable credential (step 1230). The primary verifier agent 152 can further validate the primary verifiable credential to confirm the content (e.g., claims, data points, attributes) of the primary verifiable credential meets one or more particular requirements, and the primary verifier agent 152 can provide the network-enabled service further responsive to the validating of the primary verifiable credential.

The transacting for the service of step 1230 can occur for example as described herein with respect to the holder agent 142 and the primary verifier agent 152 in the process flow and system 1500. Alternatively, the transacting for the service of step 1230 can occur for example as described herein with respect to the holder agent 42 and the verifier agent 52 in any one of the process flows and systems 600, 700, 800, 900, 1000. In a particular implementation, the holder agent 142 can transmit the one or more trust credentials and the primary verifiable credential to the primary verifier agent 152 for verification and validation by the primary verifier agent 152 to enable the network-enabled service.

Determinations by the digital trust assessment service 172 can be performed periodically to update the one or more assessments of the holder based on new or updated telemetry data. In a step 1232, one or more new or updated assessments of the holder are determined based on new or updated telemetry data. The digital trust assessment service 172 transmits a digital trust change report including the one or more new or updated assessments of the holder to the digital trust issuer service 170 (step 1234). The digital trust issuer service 170 generates one or more new or updated trust credentials as one or more new or updated digitally signed credentials based on the one or more new or updated assessments of the holder (step 1236). The digital trust issuer service 170 updates the digital trust credential ledger 176 based on the generated one or more new or updated trust credentials (step 1238). The digital trust issuer service 170 transmits a digital trust change report including the one or more new or updated trust credentials to the holder agent 142 (step 1240). The digital trust issuer service 170 can further transmit one or more revocation updates including the one or more new or updated trust credentials of the holder or a notification of the existence of the new or updated trust credentials of the holder to a revocation ledger service 178 (step 1242). The revocation ledger service 178 transmits the one or more revocation updates including the one or more new or updated trust credentials of the holder or a notification of the existence of the new or updated trust credentials of the holder to the primary issuer agent 122 (step 1244). Based on the one or more revocation updates, the primary issuer agent 122 can withhold additional credentials or require the one or more new or updated trust credentials from the holder agent 142 in response to new credential requests from the holder agent 142.

The digital trust system 1100 further enables providing of a digital trust credential based on a tiered assessment level by the digital trust issuer service 170 to a requesting organization (e.g., a credential verifier or credential issuer) via a primary issuer agent 122 or primary verifier agent 152, the digital trust credential digitally signed based on one or more assessments of the organization. A consumer via the holder agent 142 for example can leverage the digital trust credential of the organization when engaging with the organization via the primary issuer agent 122 or primary verifier agent 152 for credential issuance or credential verification purposes. During an issuance or verification process, a consumer implementing the holder agent 142 can receive the digital trust credential of an organization via the digital wallet 143 running on behalf of the consumer, and the digital wallet 143 checks and validates the digital trust credential.

Figure 10:
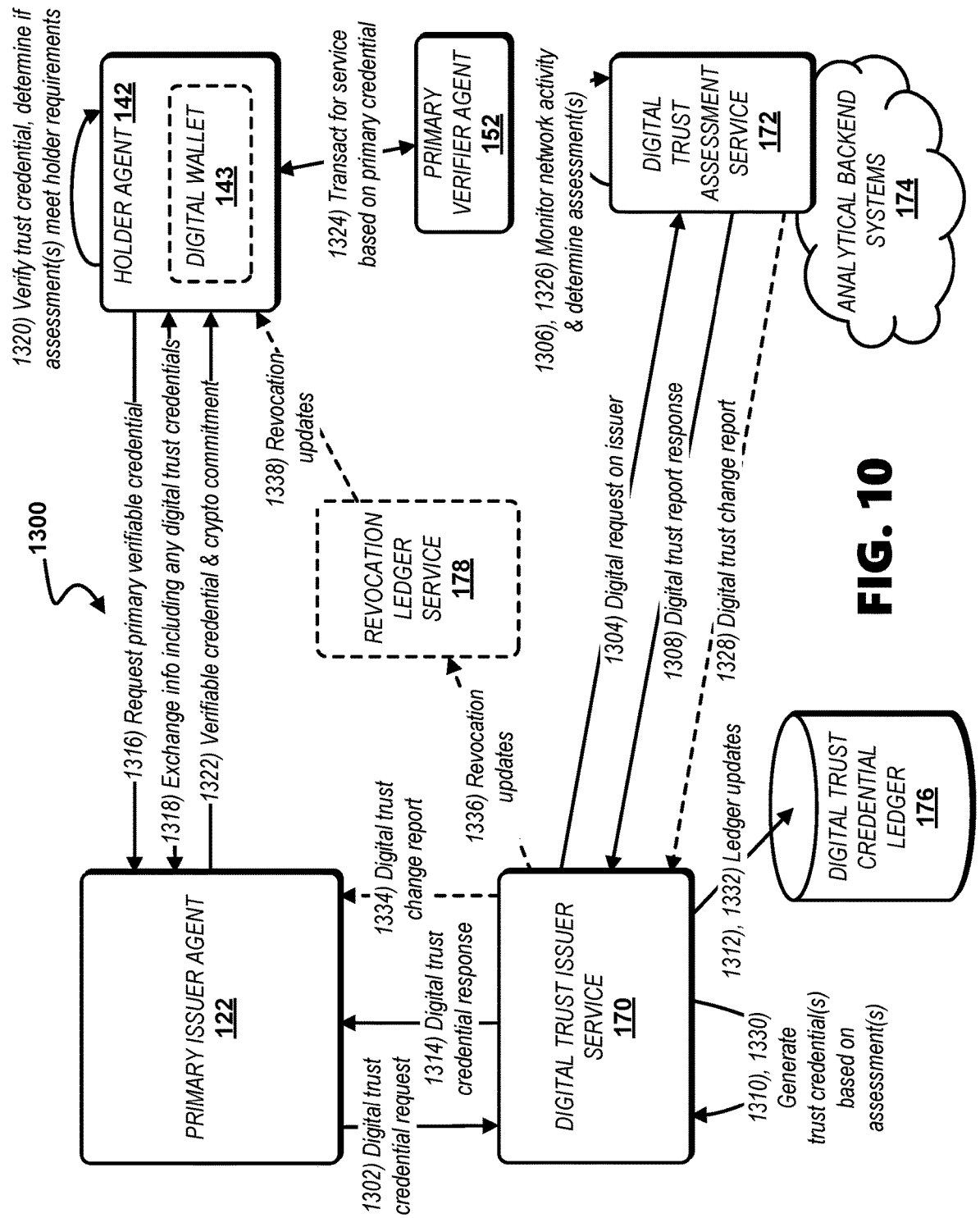

Referring to FIG. 10, an example scenario is depicted by a process flow and system 1300 incorporating the digital trust system 1100 in which a digital cryptographically verifiable credential ("primary credential") issued by the primary issuer agent 122 for an entity (a "holder") is required by the holder agent 142 operating and transacting on behalf of the holder for transacting for a service with a primary verifier agent 152. The primary credential can be provided for example as locked or unlocked. The primary issuer agent 122 operates and transacts on behalf of an issuer of credentials (an "issuer") and uses its own digital cryptographically verifiable credential ("trust credential") as part of a credential issuance validation process performed with the holder agent 142. The digital trust assessment service 172 provides a report to the digital trust issuer service 170 to support credential claims, including assessments, to be included in one or more digital trust credentials pertaining to the issuer. The digital trust assessment service 172 is integrated with analytical backend systems 174 to provide assessments and reports including the assessments. The digital trust issuer service 170 issues one or more trust credentials for the issuer based on an assessment report for the issuer received from the digital trust assessment service 172. The digital wallet 143 of the holder agent 142 is enabled to cryptographically verify and to validate and store a received trust credential pertaining to an issuer, which digital wallet 143 is also enabled to store received credentials (e.g., primary credentials) pertaining to the holder and trust credentials pertaining to the holder. A revocation ledger service 178 provides updates on when previously issued digital trust credentials of the issuer are no longer valid or usable by the issuer and the holder.

The process flow and system 1300 enables methods for transacting over a network by a plurality of agents including a first agent, second agent, third agent, and fourth agent. As described with respect to the process flow and system 1300, the first agent is depicted as a holder agent 142, the second agent is depicted as a primary transaction agent 162 performing functions of the digital trust issuer service 170, the digital trust assessment service 172, and the analytical backend systems 174, the third agent is depicted as a primary issuer agent 122, and the fourth agent is depicted as a primary verifier agent 152. The depictions of the plurality of agents with respect to the process flow and system 1300 are exemplary in nature, and the process flow and system 1300 is not limited by the particular naming of each agent.

The process flow and system 1300 is shown enabled in a network environment. The holder, via the holder agent 142

(i.e., the first agent) which transacts on behalf of the holder, wants to obtain from an issuer via a primary issuer agent 122 (i.e., the third agent) a digital cryptographically verifiable credential ("primary verifiable credential") for transacting with a provider of a service, the provider of the service acting as a verifier via the primary verifier agent 152 (i.e., the fourth agent).

The primary issuer agent 122 requests one or more digital cryptographically verifiable credentials ("trust credentials") from the digital trust issuer service 170, the request including identifying information of the issuer (step 1302). The digital trust issuer service 170 requests one or more assessments on the issuer from the digital trust assessment service 172 responsive to the request from the primary issuer agent 122, the request including the identifying information of the issuer (step 1304). The digital trust issuer service 170 and the digital trust assessment service 172 form components of the primary transaction agent 162 (i.e., the second agent). The digital trust assessment service 172 monitors network activity (e.g., internet activity) of the issuer and determines one or more assessments of the issuer based on the identifying information and the monitored network activity (step 1306). The monitored network activity can include for example signals from which a level of trust or quality of reputation of the issuer can be assessed ("trust signals"). The digital trust assessment service 172 transmits a digital trust report response including the determined one or more assessments to the digital trust issuer service 170 (step 1308). The digital trust issuer service 170 generates one or more trust credentials as one or more digitally signed credentials based on the one or more assessments of the issuer (step 1310). The digital trust issuer service 170 updates the digital trust credential ledger 176 based on the generated one or more trust credentials (step 1312). The digital trust issuer service 170 transmits a response to the primary issuer agent 122 including the one or more trust credentials (step 1314).

The holder agent 142 is configured to transact with the primary issuer agent 122 for a digital cryptographically verifiable credential pertaining to the holder (the "primary verifiable credential") based on the one or more trust credentials obtained by the primary issuer agent 122 from the digital trust issuer service 170, which primary verifiable credential is useable to facilitate transacting by the holder agent 142 with the primary verifier agent 152 for use of a service. The holder agent 142 requests the primary verifiable credential from the primary issuer agent 122 (step 1316). The holder agent 142 and the primary issuer agent 122 exchange information in which a request by the holder agent 142 for the one or more trust credentials is transmitted, which exchange includes a transmission of the trust credential from the primary issuer agent 122 to the holder agent 142 responsive to the request (step 1318). One or more assessment-based credentials of the holder, as described herein for example with respect to step 1216 of the process flow and system 1200, can be requested by the primary issuer agent 122 and provided to the primary issuer agent 122 from the holder agent 142 responsive to the request of step 1318. The holder agent 142 cryptographically verifies the one or more trust credentials of the issuer, for example by using a public key rendered accessible by the digital trust issuer service 170, and the holder agent 142 validates the one or more trust credentials of the issuer by determining whether the one or more assessments in the one or more trust credentials meet requirements of the holder (step 1320).

The primary issuer agent 122 transmits the primary verifiable credential and a crypto commitment to the holder agent 142 (step 1322). The holder agent 142 chooses to receive the primary verifiable credential or chooses to use the primary verifiable credential based on whether the trust credential is verified by the holder agent 142 and meets the requirements of the holder agent 142. The crypto commitment is related to the primary verifiable credential and includes information for the primary verifier agent 152 to use to contact the primary issuer agent 122. The crypto commitment can be provided as a partial signature for the primary verifiable credential guaranteeing the primary verifiable credential is usable by the holder agent 42 and enabling the primary verifier agent 152 to verify the primary verifiable credential after a payment to the issuer or other requirement is completed via the primary verifier agent 152.

The holder agent 142 is enabled to transact with the primary verifier agent 152 for use of a network-enabled service using the primary verifiable credential (step 1324). During the transacting of step 1324, the holder agent 142 is enabled to transmit the primary verifiable credential to the primary verifier agent 152 as a verifiable presentation. The transacting for the service of step 1324 can occur for example as described herein with respect to the holder agent 142 and the primary verifier agent 152 in the process flow and system 1400. Alternatively, the transacting for the service of step 1324 can occur for example as described herein with respect to the holder agent 42 and the verifier agent 52 in any one of the process flows and systems 600, 700, 800, 900, 1000.

Determinations by the digital trust assessment service 172 can be performed periodically to update the one or more assessments of the issuer based on new or updated identifying information or monitored network activity of the issuer. In a step 1326, one or more new or updated assessments of the issuer are determined based on new or updated identifying information or monitored network activity of the issuer.

The digital trust assessment service 172 transmits a digital trust change report including the one or more new or updated assessments of the issuer to the digital trust issuer service 170 (step 1328). The digital trust issuer service 170 generates one or more new or updated trust credentials as one or more new or updated digitally signed credentials based on the one or more new or updated assessments of the issuer (step 1330). The digital trust issuer service 170 updates the digital trust credential ledger 176 based on the generated one or more new or updated trust credentials (step 1332). The digital trust issuer service 170 transmits a digital trust change report including the one or more new or updated trust credentials to the primary issuer agent 122 (step 1334). The digital trust issuer service 170 can further transmit one or more revocation updates including the one or more new or updated trust credentials of the issuer or a notification of the existence of the new or updated trust credentials of the issuer to a revocation ledger service 178 (step 1336). The revocation ledger service 178 transmits the one or more revocation updates including the one or more new or updated trust credentials of the issuer or a notification of the existence of the new or updated trust credentials of the issuer to the holder agent 142 (step 1338). Based on the one or more revocation updates, the holder agent 142 can discontinue use of the primary verifiable credential or deny receipt of additional primary verifiable credentials or require the one or more new or updated trust credentials from the primary issuer agent 122.

The identifying information received from the primary issuer agent 122 in step 1302 can include a particular digital cryptographically verifiable credential pertaining to the issuer (an "issuer identity credential"). The primary transaction agent 162 is further operable in step 1306 to cryptographically verify the issuer identity credential (e.g., by applying a public key pertaining to the issuer) and determine the one or the one or more assessments of the issuer based on the cryptographically verifying of the issuer identity credential.

The primary transaction agent 162 is further operable in step 1306 to determine a network location from which the primary issuer agent 122 operates in the computer network and determining one of the one or more assessments based on the network location from which the primary issuer agent 122 operates in the computer network.

The holder agent 142 is further operable in step 1320 to cryptographically verify the one or more trust credentials, determine that the one or more assessments of the issuer meet a requirement, and transmit the primary verifiable credential to the primary verifier agent 152 to transact for the network-enabled service in step 1324 for example responsive to the cryptographically verifying the one or more trust credentials and determining that the one or more assessments of the issuer meet the requirement.

Figure 11:
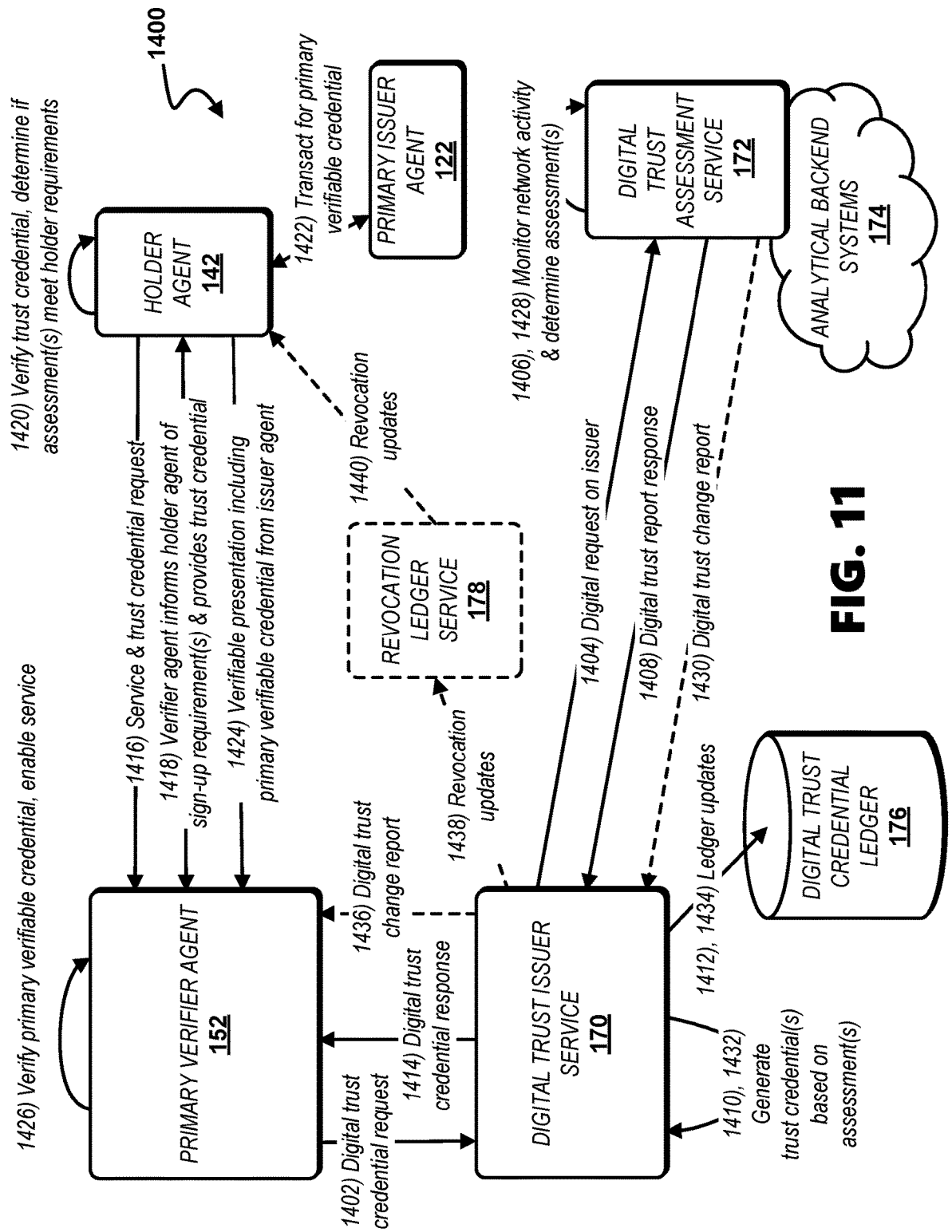

Referring to FIG. 11, an example scenario is depicted by a process flow and system 1400 incorporating the digital trust system 1100 in which a digital cryptographically verifiable credential ("trust credential") pertaining to an entity (a "verifier") is required by the holder agent 142, transacting on behalf of another entity (a "holder"), from the primary verifier agent 152. The process flow and system 1400 enables methods for transacting over a network by a plurality of agents including a first agent, second agent, third agent, and fourth agent. As described with respect to the process flow and system 1400, the first agent is depicted as a holder agent 142, the second agent is depicted as a primary transaction agent 162 performing functions of the digital trust issuer service 170, the digital trust assessment service 172, and the analytical backend systems 174, the third agent is depicted as a primary issuer agent 122, and the fourth agent is depicted as a primary verifier agent 152. The depictions of the plurality of agents with respect to the process flow and system 1400 are exemplary in nature, and the process flow and system 1400 is not limited by the particular naming of each agent.

The process flow and system 1400 is shown enabled in a network environment. The holder, via the holder agent 142 (i.e., the first agent) which transacts on behalf of the holder, wants to transact for a network-enabled service with a provider of the service by using a digital cryptographically verifiable credential (a "primary verifiable credential") received by an issuer via a primary issuer agent 122 (i.e., the third agent). The primary verifiable credential can be provided for example as locked or unlocked. The provider of the service operates as a verifier via the primary verifier agent 152 (i.e., the fourth agent).

The primary verifier agent 152 requests one or more digital cryptographically verifiable credentials ("trust credentials") from the digital trust issuer service 170, the request including identifying information of the verifier (step 1402). The one or more trust credentials can be provided for example as locked or unlocked. The digital trust issuer service 170 requests one or more assessments on the verifier from the digital trust assessment service 172 responsive to the request from the primary verifier agent 152, the request including the identifying information of the verifier (step 1404). The digital trust assessment service 172 monitors network activity (e.g., internet activity) and determines one or more assessments of the verifier based on the identifying information and the monitored network activity (step 1406). The monitored network activity can include for example signals from which a level of trust or quality of reputation of the verifier can be assessed ("trust signals"). The digital trust issuer service 170 and the digital trust assessment service 172 form components of the primary transaction agent 162 (i.e., the second agent). The digital trust assessment service 172 transmits a digital trust report response including the determined one or more assessments to the digital trust issuer service 170 (step 1408). The digital trust issuer service 170 generates one or more trust credentials as one or more digitally signed credentials based on the one or more assessments of the holder (step 1410). The digital trust issuer service 170 updates the digital trust credential ledger 176 based on the generated one or more trust credentials (step 1412). The digital trust issuer service 170 transmits a response to the primary verifier agent 152 including the one or more trust credentials of the verifier (step 1414).

The holder agent 142 requests a network-enabled service and the one or more trust credentials from the primary verifier agent 152 (step 1416). The primary verifier agent 152 transmits the one or more trust credentials to the holder agent 142 and informs the holder agent 142 of sign-up requirements for transacting for the network-enabled service, specifying to the holder agent 142 which one or more data points such as attributes (e.g., attributes of a verifiable credential) for the transaction are required in a request for data for the transaction (e.g., a presentation request) (step 1418). The one or more data points for example define terms for the transaction (e.g., a contract) analogous to contract terms. Data points can include for example one or more of a holder's first name, last name, date of birth, credit card number, social security number, or passport number. In the step 1418 the holder agent 142 can transmit a response to the primary verifier agent 152 (e.g., a response to a presentation request) including one or more requirements on the data requested by the primary verifier agent 152 for fulfilling one or more data points for the transaction (e.g., a contract) to be initiated. The one or more requirements provided by the holder agent 142 include for example one or more of price, a service level agreement ("SLA"), or policies for the data requested.

The holder agent 142 cryptographically verifies the one or more trust credentials of the verifier, for example by using a public key rendered accessible by the digital trust issuer service 170, and the holder agent 142 validates the one or more trust credentials by determining whether the one or more assessments in the one or more trust credentials meet requirements of the holder (step 1420). If the primary verifiable credential is not already possessed by the holder agent 142, the holder agent 142 transacts for the primary verifiable credential from the primary issuer agent 122 (step 1422), which transacting includes a request for the primary verifiable credential by the holder agent 142 and a response including the primary verifiable credential and a crypto commitment for example as described herein with respect to the steps 1316, 1318, 1320, 1322 of the process flow and system 1300.

The holder agent 142 sends a verifiable presentation to the primary verifier agent 152 (step 1424). The verifiable presentation includes the primary verifiable credential which includes the one or more data points requested by the primary verifier agent 152 and one or more proofs corresponding to the requested one or more data points. The one or more proofs can include locked or unlocked proofs. The holder agent 142 can further send further send its own trust credential for verification by the primary verifier agent 152 for example as described herein with respect to step 1224 of the process flow and system 1200.

The primary verifier agent 152 cryptographically verifies the primary verifiable credential (step 1426), for example by using another public key or an unlock signature rendered accessible by the primary issuer agent 122 or other network resource. The primary verifier agent 152 can initiate delivery of the network-enabled service if the verification of the primary verifiable credential is successful.

Determinations by the digital trust assessment service 172 can be performed periodically to update the one or more assessments of the verifier based on new or updated identifying information or monitored network activity of the verifier. In a step 1428, one or more new or updated assessments of the verifier are determined based on new or updated identifying information or monitored network activity of the verifier.

The digital trust assessment service 172 transmits a digital trust change report including the one or more new or updated assessments of the verifier to the digital trust issuer service 170 (step 1430). The digital trust issuer service 170 generates one or more new or updated trust credentials as one or more new or updated digitally signed credentials based on the one or more new or updated assessments of the verifier (step 1432). The digital trust issuer service 170 updates the digital trust credential ledger 176 based on the generated one or more new or updated trust credentials (step 1434). The digital trust issuer service 170 transmits a digital trust change report including the one or more new or updated trust credentials to the primary verifier agent 152 (step 1436). The digital trust issuer service 170 can further transmit one or more revocation updates including the one or more new or updated trust credentials of the verifier or a notification of the existence of the new or updated trust credentials of the verifier to a revocation ledger service 178 (step 1438). The revocation ledger service 178 transmits the one or more revocation updates including the one or more new or updated trust credentials of the verifier or a notification of the existence of the new or updated trust credentials of the verifier to the holder agent 142 (step 1440). Based on the one or more revocation updates, the holder agent 142 can deny use or receipt of the network-enabled service or require the one or more new or updated trust credentials from the primary verifier agent 152.

The digital trust system 1100 further enables a service provider implementing credential verification via a primary verifier agent 152 to request a digital trust credential from an entity (a "holder"), for example a consumer, via the holder agent 142. The holder via the holder agent 142 requests a digital trust credential pertaining to the holder from the digital trust issuer service 170. The digital trust credential includes one or more credential claims including assessments for each aspect of digital activity or action of the holder. To receive a digital trust credential from the digital trust issuer service 170, the holder agrees to specific terms required by the digital trust issuer service 170 that allows the digital trust issuer service 170 to provide the holder with a digital trust credential based on a tiered assessment level. A service provider via the primary verifier agent 152 verifies and validates a provided digital trust credential to accept or decline the holder's request to engage with a network-enabled service. A digital trust credential beneficially includes multiple credential claims including assessments established by the digital trust assessment service 172.

Figure 12:
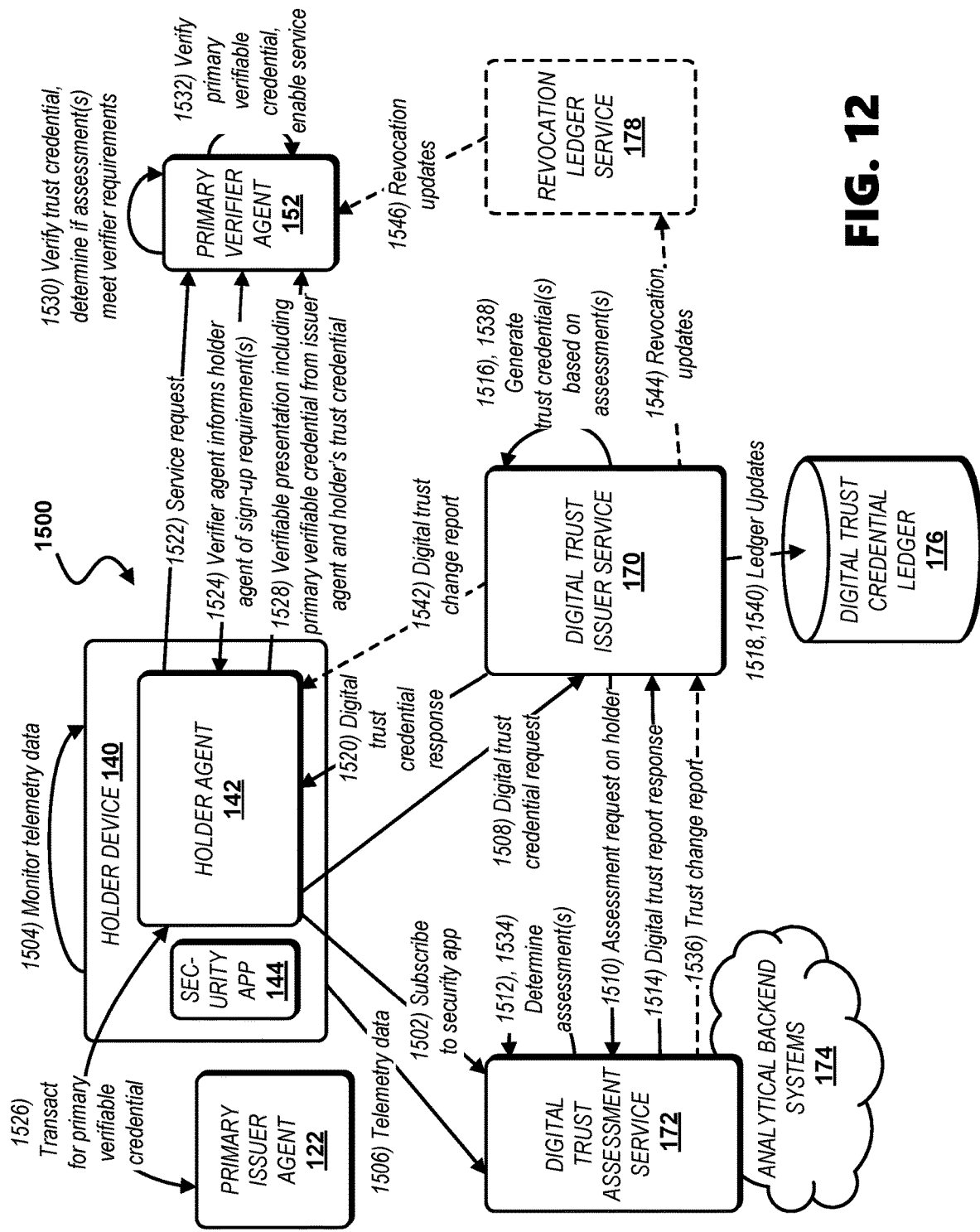

Referring to FIG. 12, an example scenario is depicted by a process flow and system 1500 incorporating the digital trust system 1100 in which a plurality of digitally cryptographically verifiable credentials are required by a primary verifier agent 152 from a holder agent 142. The primary verifier agent 152 operates and transacts on behalf of a provider of a network-enabled service. The primary verifier agent 152 uses a one or more digitally cryptographically verifiable credentials as presented by the holder agent 142 as part of credential verification and validation processes. The digital trust assessment service 172 provides a report to the digital trust issuer service 170 to support credential claims, including assessments, to be included in one or more digital cryptographically verifiable credentials ("trust credentials") to be used in credential issuance and credential verification processes. The digital trust assessment service 172 is integrated with analytical backend systems 174 to provide assessments and reports including the assessments. The digital trust issuer service 170 issues one or more digital trust credentials pertaining to the holder based on the assessment report received from the digital trust assessment service 172. A revocation ledger service 178 provides updates on when previously issued digital trust credentials are no longer valid or usable by the service provider via the primary verifier agent 152 and the holder via the holder agent 142.

The process flow and system 1500 enables methods for transacting over a network by a plurality of agents including a first agent, second agent, third agent, and fourth agent. As described with respect to the process flow and system 1500, the first agent is depicted as a holder agent 142, the second agent is depicted as a primary transaction agent 162 performing functions of the digital trust issuer service 170, the digital trust assessment service 172, and the analytical backend systems 174, the third agent is depicted as a primary issuer agent 122, and the fourth agent is depicted as a primary verifier agent 152. The depictions of the plurality of agents with respect to the process flow and system 1500 are exemplary in nature, and the process flow and system 1500 is not limited by the particular naming of each agent.

The process flow and system 1500 is shown enabled in a network environment. The holder, via the holder agent 142 (i.e., the first agent) which transacts on behalf of the holder, wants to transact for a network-enabled service with a provider of the service by using a digital cryptographically verifiable credential (a "primary verifiable credential") received by an issuer via a primary issuer agent 122 (i.e., the third agent) and one or more other cryptographically verifiable credentials (one or more "trust credentials") issued by the digital trust assessment service 172. The primary verifiable credential and the one or more trust credentials can be provided for example as locked or unlocked. The provider of the network-enabled service operates as a verifier via the primary verifier agent 152 (i.e., the fourth agent).

The holder agent 142 beneficially subscribes to a security application 144 executed on the holder device 140 to facilitate aggregation of data used in generating an assessment of the holder of the holder agent 142 (step 1502). The holder device 140 is configured to monitor the telemetry data via the security application 144 executed on the holder device 140 (step 1504). The telemetry data of the holder device 140 is transmitted by the holder device 140 to the digital trust assessment service 172, for example via the holder agent 142 or alternatively via the security application 144, and the digital trust assessment service 172 receives the telemetry data from the holder device 140 (step 1506). The digital trust assessment service 172 forms a component of the primary transaction agent 162 (i.e., the second agent). The telemetry data can include for example signals from which a level of trust or quality of reputation of the holder can be assessed ("trust signals"), for example device security settings, application settings, or user online behavior. Additional telemetry data can be received by the digital trust assessment service 172 from other computing devices operated by the holder or from other network accessible resources.

The holder agent 142 requests one or more digital cryptographically verifiable credentials ("trust credentials") from the digital trust issuer service 170 (step 1508). The digital trust issuer service 170 forms another component of the primary transaction agent 162 (i.e., the second agent). The digital trust issuer service 170 requests one or more assessments of the holder from the digital trust assessment service 172 responsive to the request from the holder agent 142 (step 1510). The digital trust assessment service 172 determines one or more assessments of the holder based on the telemetry data (step 1512) and transmits a digital trust report response including the determined one or more assessments to the digital trust issuer service 170 (step 1514). The one or more assessments can relate to a level of trust which can be implied to the holder. The digital trust issuer service 170 generates one or more trust credentials as one or more digitally signed credentials based on the one or more assessments of the holder in the digital trust report response (step 1516). The digital trust issuer service 170 updates a digital trust credential ledger 176 based on the generated one or more trust credentials (step 1518). The digital trust issuer service 170 transmits a response to the holder agent 142 including the one or more trust credentials (step 1520).

The holder agent 142 requests the service from the primary verifier agent 152 (step 1522). The primary verifier agent 152 informs the holder agent 142 of sign-up requirements for transacting for the network-enabled service, specifying to the holder agent 142 which one or more data points such as attributes (e.g., attributes of a verifiable credential) for the transaction are required in a request for data for the transaction (e.g., a presentation request) (step 1524). The one or more data points for example define terms for the transaction (e.g., a contract) analogous to contract terms. Data points can include for example one or more of a holder's first name, last name, date of birth, credit card number, social security number, or passport number. In the step 1524 the holder agent 142 can transmit a response to the primary verifier agent 152 (e.g., a response to a presentation request) including one or more requirements on the data requested by the primary verifier agent 152 for fulfilling one or more data points for the transaction (e.g., a contract) to be initiated. The one or more requirements provided by the holder agent 142 include for example one or more of price, a service level agreement ("SLA"), or policies for the data requested.

The holder agent 142 is enabled to transact with the primary issuer agent 122 for the primary verifiable credential based on the one or more trust credentials obtained by the holder agent 142 from the digital trust issuer service 170 (step 1526), which primary verifiable credential is useable to facilitate transacting by the holder agent 142 with the primary verifier agent 152 for use of a network-enabled service. The transacting for the primary verifiable credential of step 1526 can occur for example as described herein with respect to the holder agent 142 and the primary issuer agent 122 in the process flow and system 1200. Alternatively, the transacting for the primary verifiable credential of step 1526 can occur for example as described herein with respect to the credentials transacted for from the issuer agent 22 by the holder agent 42 in any one of the process flows and systems 600, 800.

The holder agent 142 sends a verifiable presentation to the primary verifier agent 152 (step 1528). The verifiable presentation includes the primary verifiable credential which includes the one or more data points requested by the primary verifier agent 152 and one or more proofs corresponding to the requested one or more data points. The one or more proofs can include locked or unlocked proofs. The verifiable presentation further includes the one or more trust credentials of the holder. The primary verifier agent 152 cryptographically verifies the one or more trust credentials, for example by using a public key rendered accessible by the digital trust issuer service 170, and the primary verifier agent 152 validates the one or more trust credentials by determining whether the one or more assessments in the one or more trust credentials meet requirements of the verifier (step 1530). The primary verifier agent 152 further cryptographically verifies the primary verifiable credential, for example by using another public key or an unlock signature rendered accessible by the primary issuer agent 122 or other network resource, and the primary verifier agent 152 enables the network-enabled service provided by the verifier (step 1532). In the step 1532, the primary verifier agent 152 initiates delivery of the network-enabled service if the verifications of the one or more trust credentials and the primary verifiable credential are successful and if it is determined that the one or more assessments in the one or more trust credentials meet the requirements of the primary verifier agent 152.

Determinations by the digital trust assessment service 172 can be performed periodically to update the one or more assessments of the holder based on new or updated telemetry data. In a step 1534, one or more new or updated assessments of the holder are determined based on new or updated telemetry data. The digital trust assessment service 172 transmits a digital trust change report including the one or more new or updated assessments of the holder to the digital trust issuer service 170 (step 1536). The digital trust issuer service 170 generates one or more new or updated trust credentials as one or more new or updated digitally signed credentials based on the one or more new or updated assessments of the holder (step 1538). The digital trust issuer service 170 updates the digital trust credential ledger 176 based on the generated one or more new or updated trust credentials (step 1540). The digital trust issuer service 170 transmits a digital trust change report including the one or more new or updated trust credentials to the holder agent 142 (step 1542). The digital trust issuer service 170 can further transmit one or more revocation updates including the one or more new or updated trust credentials of the holder or a notification of the existence of the new or updated trust credentials of the holder to a revocation ledger service 178 (step 1544). The revocation ledger service 178 transmits the one or more revocation updates including the one or more new or updated trust credentials of the holder or a notification of the existence of the new or updated trust credentials of the holder to the primary verifier agent 152 (step 1546). Based on the one or more revocation updates, the primary verifier agent 152 can withhold the network-enabled services or require the one or more new or updated trust credentials from the holder agent 142 in response to new service requests from the holder agent 142.

The digital trust issuer service 170 is enabled to provide trust credentials of various tiers to a holder agent 142, primary verifier agent 152, or a primary issuer agent 122. A trust credential includes one or more credential claims (e.g., data points, attributes) including one or more assessments depending on the requirements of the entity that receives and verifies the trust credential and the terms agreed to by the entity that the trust credential pertains to. For example, a trust credential can be added to a digital wallet 143 of a consumer via the holder agent 142, and service providers via the primary verifier agent 152 and issuers of other credentials ("primary verifiable credentials") via the primary issuer agent 122 can leverage the trust credential when evaluating their connection to the consumers. Credential tiers are beneficially imposed for trust credentials by the digital trust issuer service 170, for example based on subscription preferences of the entity requesting the trust credential and on which the trust credential is based. A top tier trust credential can include for example all credential claims including all assessments supported by the digital trust assessment service 172. A mid-tier credential can include for example a majority of credential claims including a majority of assessments supported by the digital trust assessment service 172 but less assessments than those supported by the top tier trust credential. A low tier trust credential can include for example a minimal number of credential claims including a minimal number of assessments supported by the digital trust assessment service 172 including less assessments than those supported by the top tier trust credential and less assessments than those supported by the mid-tier trust credential.

Described herein are exemplary assessments corresponding to credential claims of a trust credential pertaining to an entity implementing the holder agent 142 (hereinafter "holder assessments"), the entity (a "holder") for example including a consumer or other entity that transacts for network-enabled services. The holder assessments are generated by the digital trust assessment service 172 based on telemetry data monitored by a security application 144 executed on one or more holder devices 140 of the holder or based on other network-accessible data, for example internet-accessible data.

A first holder assessment indicates a tier level (e.g., top, mid, low) of the trust credential identifying what credential claims including assessments are included or absent in the trust credential. A second holder assessment indicates that an antivirus application, for example the security application 144 is installed and up to date on the holder device 140. The second holder assessment enables a computing system (e.g., verifier system 150 or issuer system 120) of a service or credential provider (a "provider") to determine whether a computing system (e.g., holder device 140) of a holder engaging with the provider computing system is protected by the latest antivirus technology and is likely or not infected or under the influence of malicious software or bots that manipulate or steal data. A third holder assessment indicates a primary geographic region of the consumer. The third assessment enables a provider's computing system to determine whether a holder resides in a specific geographic region supported by the provider's computing system and whether the holder's asserted geographic region is consistent with data feeds pertaining to the holder which are received by the provider's computing system. A fourth assessment indicates how frequently the holder has changed their geographic region connectivity over a particular time period, for example over the previous six months. The fourth assessment enables a provider's computing system to determine whether a holder's computing system is "bouncing around" the internet attempting to avoid tracking or to avoid detection of behaviors or activities inconsistent with normal use of the internet. Often malicious actors attempt to evade detection by connecting to network locations via a virtual private network ("VPN") to appear to originate from a different public internet protocol address ("IP") and a different geographic location. The first second, third, and fourth assessments can be derived for example based on a holder's use of the security application 144 on one or more holder devices 140.

A fifth holder assessment provides a multi-factor assessment as an aggregate score pertaining to cyber hygiene indicating how an entity (a "holder") manages their Operating System (OS) security, security and settings of their applications, their online activity, and other computing functions, wherein a higher score for example corresponds to a higher level of trust associated with the holder. The fifth holder assessment enables a provider's computing system (e.g., verifier system 150 or issuer system 120) or other entity's computing system (e.g., holder device 140) to determine whether the entity engaging with them has been assessed by the digital trust assessment service 172 as having for example an online security hygiene score that is considered good, acceptable, or poor. The fifth holder assessment is a multi-factor assessment across how an organization or person manages their OS security, their application security, their online behaviors or other activities or settings.

A sixth holder assessment provides a list of hygiene vector assessments incorporating individual cyber hygiene scores indicating how an entity (a "holder") manages their operating system (OS) security, security and settings of their applications, their online activity, and other computing functions. The hygiene vectors are detailed individual factors that contribute to an overall score but also help consumers or organizations consider more detailed aspects of security hygiene that may influence their network interactions. For example, a good OS score suggests that a user is more likely to install newer software that has more capabilities and is more secure than older versions that are likely vulnerable to attack. This information may not be readily discernable from an aggregate score.

A seventh holder assessment provides a consistency check to reflect how cyber hygiene has been applied across a plurality of devices of an entity, for example a plurality of holder devices 140 executing a plurality of holder agents 142 and security applications 144. For example, poor cyber hygiene consistency represents risk to both a consumer and to organizations that may interact with the consumer as it represents an attack vector that the consumer or organization can be compromised on.

The fifth, sixth, and seventh holder assessments are derivable for example by settings or options implemented by an entity on an operating system ("OS"), the security application 144, or the holder agent 142 on the holder device 140.

An eighth holder assessment indicates that the digital trust assessment service 172 has validated account information of an entity including email address, credit card, and an indication of whether the account is a family account or an individual account. The eighth holder assessment enables for example a provider's computing system (e.g., verifier system 150 or issuer system 120) to determine whether the digital trust assessment service 172 has verified a person or other entity doing business with the provider, for example for the purposes of email engagement and credit card charging.

A ninth holder assessment indicates how many data breaches exposing data of an entity (a "holder") have occurred over a particular time period (e.g., twelve months). The ninth holder assessment enables for example an organization's computing system (e.g., verifier system 150 or issuer system 120) to determine whether a holder's data is being used maliciously or is being used in attempt to mislead others. Zero breaches suggests a higher confidence in trustworthiness of the holder. Some breaches may be typical and expected, whereas a large number of breaches may suggest a need to apply caution when transacting with a holder.

A tenth holder assessment indicates whether data is consistent across different credentials held by a digital wallet 143 enabled by the holder agent 142 or otherwise enabled by the holder device 140 or a plurality of holder devices 140 operated by a holder. The tenth holder assessment enables for example a provider's computing system (e.g., verifier system 150 or issuer system 120) to determine whether multiple data feeds are providing consistent validation of a holder from different sources that the digital trust assessment service 172 has access to.

An eleventh holder assessment indicates whether an entity (a "holder") explicitly avoids tracking by websites. The eleventh holder assessment enables for example a provider's computing system (e.g., verifier system 150 or issuer system 120) or other computing system (e.g., holder device 140) to determine whether profiling pertaining to the holder received from another organization or data feeds pertaining to the holder should be avoided as potentially erroneous and misleading. Avoiding such potentially erroneous and misleading profiling or data feeds can result in more effective targeting and profiling of the holder.

A twelfth holder assessment provides a behavioral profile established in an anonymous and personal identifiable information-preserving manner that identifies a risk level of a holder's network behavior and whether the holder's use of credentials has exposed the holder to risk. The twelfth holder assessment enables for example a provider's computing system (e.g., verifier system 150 or issuer system 120) to determine how risky are a holder's behaviors on the internet and whether the holder's use of the holder's digital credentials has exposed the holder to risk.

The eighth, ninth, tenth, eleventh, and twelfth holder assessments can be derived for example based on an entity's use of the security application 144, the holder agent 142, or a credential wallet enabled by the holder agent 142 on the one or more holder devices 140.

A thirteenth holder assessment is provided as a plurality of assessments respectively providing an indication of whether the security application 144 via the digital trust assessment service 172 or other network-enabled system has validated account information for accounts of a holder on network-enabled services, for example validated the holder's account information on one or more of Amazon™, Facebook™, Google™, Instagram™, LinkedIn™, Reddit™, Skype™, Twitter™, or YouTube™ network-enabled platforms. The thirteenth holder assessment can be derived in response to determining whether permission has been provided by the holder to the security application 144 to access and validate or secure or clean up one or more particular accounts of the holder on one or more of the network-enabled platforms.

A fourteenth holder assessment indicates whether a national identity credential is available for a holder. A fifteenth holder assessment indicates whether a passport credential is available for the holder. A sixteenth holder assessment indicates whether a driver license credential is available for the holder. The fourteenth, fifteenth, and sixteenth assessments can be derived for example based on a holder's use of a credential wallet enabled by the holder agent 142 on the one or more holder devices 140. The fourteenth, fifteenth, and sixteenth assessments enable for example a provider's computing system (e.g., verifier system 150 or issuer system 120) to determine a risk of interacting with a holder based on the existence of one or more of a national identity credential, passport credential, or driver license credential.

Described further herein are exemplary assessments corresponding to credential claims of a trust credential pertaining to an entity implementing a primary issuer agent 122 or primary verifier agent 152 (hereinafter "provider assessments"), for example an organization or other entity operating as an issuer of credentials or a provider of network-enabled services performing verification functions collectively termed as "providers". The provider assessments are generated based on network-accessible data, for example internet-accessible data, and identifying information of the entity.

A first provider assessment indicates the tier level (e.g., top, mid, low) of the trust credential of a provider, the first provider assessment identifying what credential claims including assessments are included or absent in the trust credential. A second provider assessment indicates whether internet domains of the provider and corresponding ownership have been validated, for example validated by the digital trust assessment service 172. A third provider assessment indicates a level of privacy risk pertaining to the provider. A fourth provider assessment is indicative of a number of observed instances of malware, phishing campaigns, vulnerabilities, and other risk-related markers attributed to the provider. A fifth provider assessment indicates one or more geographic regions corresponding to the provider or a service offered by the provider. A sixth provider assessment indicates changes to a computing infrastructure (e.g., geographic location, IP address) of the provider over a particular time period (e.g., twelve months). A seventh provider assessment provides an indication of how well a provider's computing infrastructure is focused on their identity support and includes for comparison an indication of ideal mechanisms used to execute identity exchange in compliant, secure manners. An eighth provider assessment indicates whether an identity credential of the provider has been verified, for example by the digital trust assessment service 172.

Further to the description above and referring to FIGS. 8-12, the process flows and systems 1200, 1300, 1400, 1500 respectively enable a fourth, fifth, sixth, and seventh methods for transacting over a computer network by a plurality of agents including a first agent, second agent, third agent, and fourth agent. The fourth, fifth, sixth, and seventh methods individually or collectively set forth a first computing system and a second computing system, a first entity, second entity, third entity and fourth entity, and a first cryptographically verifiable credential and a second cryptographically verifiable credential. The fourth, fifth, sixth, and seventh methods are described with reference to the steps and elements of one or more of the digital trust system 1100 and the process flows and systems 1200, 1300, 1400, 1500. The first agent is depicted as a holder agent 142, the second agent is depicted as a primary transaction agent 162 performing functions of the digital trust issuer service 170, the digital trust assessment service 172, and the analytical backend systems 174, the third agent is depicted as a primary issuer agent 122, and the fourth agent is depicted as a primary verifier agent 152. The first computing system is depicted as a holder device 140 and the second computing system is depicted as a primary transaction agent service provider system 160. The first entity is depicted as a holder, the second entity is depicted as a transaction servicer, the third entity is depicted as an issuer, and the fourth entity is depicted as a verifier. The first cryptographically verifiable credential is depicted as a trust credential and the second cryptographically verifiable credential is depicted as a primary verifiable credential. The depictions of the agents, systems, devices, entities, and credentials with respect to the digital trust system 1100 and process flows and systems 1200, 1300, 1400, 1500 are exemplary in nature, and the digital trust system 1100 and process flows and systems 1200, 1300, 1400, 1500 are not limited by the particular naming of each agent, system, device, entity, and credential.

The fourth method for transacting over a computer network includes receiving from a holder device 140 (i.e., the first computing system) by a primary transaction agent 162 (i.e., the second agent) operating on a primary transaction agent service provider system 160 (i.e., the second computing system) telemetry data of the holder device 140 (step 1206). The primary transaction agent 162 determines one or more assessments of a holder (i.e., the first entity) based on the telemetry data (step 1212). The primary transaction agent 162 generates one or more trust credentials (i.e., one or more first cryptographically verifiable credentials) as one or more digitally signed credentials based on the one or more assessments of the holder by the primary transaction agent 162 (step 1216). The primary transaction agent 162 transmits the one or more trust credentials to a holder agent 142 (i.e., the first agent) operating on the holder device 140 on behalf of the holder (step 1220).

The fourth method further includes monitoring by the holder device 140 the telemetry data of the holder device 140 (step 1204) and transmitting by the holder device 140 the telemetry data of the holder device 140 to the primary transaction agent 162 (step 1206). The holder agent 142 receives the one or more trust credentials from the primary transaction agent 162 (step 1220). The holder agent 142 transmits the one or more trust credentials to a primary issuer agent 122 (i.e., the third agent) (step 1224). The holder agent 142 receives from the primary issuer agent 122 one or more primary verifiable credentials (i.e., one or more second cryptographically verifiable credentials) (step 1228). The holder agent 142 transmits the one or more primary verifiable credentials to a primary verifier agent 152 (i.e., the fourth agent) (step 1230) for cryptographic verification and for validation by the primary verifier agent 152 to enable a first service.

The fourth method further includes accessing by the primary verifier agent 152 via a network a public key corresponding to the one or more primary verifiable credentials, cryptographically verifying by the primary verifier agent 152 the one or more primary verifiable credentials based on the public key, and providing by the primary verifier agent 152 the first service responsive to the cryptographically verifying by primary verifier agent 152 the one or more primary verifiable credentials.

The fourth method further includes transmitting by the holder agent 142 the one or more trust credentials to a primary verifier agent 152 (step 1230) for cryptographic verification and for validation by the primary verifier agent 152 to enable the first service.

In the fourth method, monitoring the telemetry data (step 1204) can include determining by the holder device 140 one or more of a security application installed on the holder device 140, a frequency of change of network locations from which the holder device 140 operates in the computer network, one or more versions of one or more of an operating system installed on the holder device 140 or the security application installed on the holder device 140, or an instruction to disable tracking by a network browser on the holder device 140. Transmitting the telemetry data (step 1206) can include transmitting one or more of an indication of the security application installed on the holder device 140, an indication of the frequency of change of the network locations from which the holder device 140 operates in the computer network, an indication of the one or more versions of the one or more of the operating system or the security application, or an indication of the instruction to disable tracking by the network browser on the holder device 140.

In the fourth method, monitoring the telemetry data (step 1204) can include determining by the holder device 140 a security application installed on the holder device 140, a frequency of change of network locations from which the holder device 140 operates in the computer network, and one or more versions of one or more of an operating system installed on the holder device 140 or the security application installed on the holder device 140. Transmitting the telemetry data (step 1206) can include transmitting: an indication of the security application installed on the holder device 140, an indication of the frequency of change of the network locations from which the holder device 140 operates in the computer network, and an indication of the one or more versions of the one or more of the operating system or the security application.

The fifth method for transacting over a computer network includes receiving by a primary transaction agent 162 (i.e., the second agent) from a primary issuer agent 122 (i.e., the third agent) identifying information of an issuer (i.e., third entity) (step 1302) and determining by the primary transaction agent 162 one or more assessments of the issuer based on the identifying information (step 1306). The primary transaction agent 162 generates one or more trust credentials (i.e., one or more first cryptographically verifiable credentials) as one or more digitally signed credentials based on the one or more assessments of the issuer by the primary transaction agent 162, the one or more trust credentials including the one or more assessments (step 1310). The primary transaction agent 162 transmits the one or more trust credentials to the primary issuer agent 122 (step 1314). A holder agent 142 (i.e., the first agent) transmits to the primary issuer agent 122 one or more credential requests (steps 1316, 1318). The holder agent 142 receives from the primary issuer agent 122 the one or more trust credentials (step 1318). The holder agent 142 cryptographically verifies the one or more trust credentials (step 1320). The holder agent 142 determines that the one or more assessments of the issuer meets a requirement (step 1320). The holder agent 142 receives from the primary issuer agent 122 a primary verifiable credential (i.e., the second cryptographically verifiable credential) (step 1322). The holder agent 142 transmits the primary verifiable credential to a primary verifier agent 152 (i.e., the fourth agent) to transact for a service (step 1324).

The fifth method for transacting over a computer network further includes monitoring by the primary transaction agent 162 operating and transacting on behalf of a second entity network activity of the issuer and determining by the primary transaction agent 162 the one or more assessments of the issuer further based on the monitored network activity.

In the fifth method for transacting over a computer network the one or more of the receiving by the holder agent 142 from the primary issuer agent 122 the first cryptographically verifiable credential or the transmitting by the holder agent 142 the first cryptographically verifiable credential to the primary verifier agent 152 is responsive to the cryptographically verifying by the holder agent 142 the one or more trust credentials.

The sixth method for transacting over a computer network includes receiving by a primary transaction agent 162 (i.e., the second agent) from a primary verifier agent 152 (i.e., the fourth agent) identifying information of a verifier (i.e., the fourth entity) (step 1402) and determining by the primary transaction agent 162 one or more assessments of the verifier based on the identifying information (step 1406). The primary transaction agent 162 generates one or more trust credentials (i.e., one or more first cryptographically verifiable credentials) as one or more digitally signed credentials based on the one or more assessments of the verifier by the primary transaction agent 162, the one or more trust credentials including the one or more assessments (step 1410). The primary transaction agent 162 transmits the one or more trust credentials to the primary verifier agent 152 (step 1414). A holder agent 142 (i.e., the first agent) transmits to the primary verifier agent 152 one or more credential requests (step 1416). The holder agent 142 transmits to the verifier agent 152 a request for a service (step 1416). The holder agent 142 receives from the primary verifier agent 152 the one or more trust credentials (step 1418). The holder agent 142 receives from the primary verifier agent 152 a request for a primary verifiable credential (i.e., the second cryptographically verifiable credential) (step 1418). The holder agent 142 cryptographically verifies the one or more trust credentials (step 1420). The holder agent 142 determines that the one or more assessments meets a requirement (step 1420), and the holder agent 142 transmits the primary verifiable credential to the primary verifier agent 152 to transact for the service (step 1424).

The sixth method for transacting over a computer network further includes transmitting a request to a primary issuer agent 122 (i.e., the third agent) for the primary verifiable credential (step 1422) and receiving by the holder agent 142 from the primary issuer agent 122 the primary verifiable credential (step 1422).

The seventh method for transacting over a computer network includes monitoring by a holder device 140 (i.e., the first computing system) telemetry data of the holder device 140 (step 1504) and transmitting by the holder device 140 the telemetry data of the holder device 140 to a primary transaction agent 162 (i.e., the second agent) operating on a primary transaction agent service provider system 160 (i.e., the second computing system) (step 1506). The primary transaction agent 162 receives the telemetry data of the holder device 140 (step 1506). The primary transaction agent 162 determines one or more assessments of a holder (i.e., the first entity) based on the telemetry data (step 1512). The primary transaction agent 162 generates one or more trust credentials (i.e., one or more first cryptographically verifiable credentials) as one or more digitally signed credentials based on the one or more assessments of the holder by the primary transaction agent 162 (step 1516). The primary transaction agent 162 transmits the one or more trust credentials to a holder agent 142 (i.e., the first agent) operating on the holder device 140 on behalf of the holder (step 1520). The holder agent 142 receives the one or more trust credentials from the primary transaction agent 162 (step 1520). The holder agent 142 transmits to a primary verifier agent 152 (i.e., the fourth agent) a request for a service (step 1522). The holder agent 142 receives from the primary verifier agent 152 a request for a primary verifiable credential (i.e., the second cryptographically verifiable credential) (step 1524) and the holder agent 142 transmits the primary verifiable credential and the one or more trust credentials to the primary verifier agent 152 agent to transact for the service (step 1528).

The digital trust system 1100 and corresponding process flows and systems 1200, 1300, 1400, 1500 enable enhanced security and trustworthiness of SSI interactions across issuers, holders, and verifiers such that those three digital identity roles (i.e., issuer, holder, and verifier) can make more informed decisions when engaging in their primary function of exchange of digital cryptographically verifiable credentials. Advantages of the digital trust system 1100 and corresponding process flows and systems 1200, 1300, 1400, 1500 include integration of security assessments focused and combined with digital identity roles. Advantages also include the providing of a cryptographically verifiable credential form that defines security assessments focused on digital identity roles. Advantages further include automated management of the validity of cryptographically verifiable credentials and the trustworthiness of security assessments enabling continuous validation of assessments such that credentials are maintained accurately over time.

Referring to FIGS. 8 and 13, a wallet credential use profiling process flow and system 1600 leverages the elements of the digital trust system 1100 of FIG. 8 and further provides building blocks for wallet credential use profiling. The process flow and system 1600 enables methods for transacting over a network by a plurality of agents including a first agent, a second agent, third agents, fourth agents, a fifth agent, and a sixth agent. As described with respect to the process flow and system 1600, the first agent is depicted as a holder agent 142, the second agent is depicted as a primary transaction agent 162 performing functions of the digital trust issuer service 170, the digital trust assessment service 172, and the analytical backend systems 174. The third agents are depicted as a plurality of primary verifier agents 152 including a verifier agent A 152A, verifier agent B 152B, verifier agent C 152C, and verifier agent D 152D. The fourth agents are depicted as a plurality of other holder agents 142 and the fifth agent is depicted as a primary issuer agent 122. The sixth agent is depicted as another one of the plurality of primary verifier agents 152 including a verifier agent E 152E. The depictions of the plurality of agents with respect to the process flow and system 1600 are exemplary in nature, and the process flow and system 1600 is not limited by the particular naming of each agent.

A plurality of cryptographically verifiable credentials including credential A 145A, credential B 145B, credential C 145C, and credential D 145D held in the digital wallet 143 of the holder agent 142 are selectively used by the holder agent 142 when a holder of the credentials 145A, 145B, 145C, 145D engages with services that require or use cryptographically verifiable credentials for service verification or signup. Primary verifier agents 152 including verifier agents 152A, 152B, 152C, 152D each require one or more cryptographically verifiable credentials from the holder prior to approving a service delivery to the holder via the holder agent 142. The holder agent 142 transacts for different services with each of the verifier agents 152A, 152B, 152C, 152D selectively using the credentials 145A, 145B, 145C, 145D depending on the particular requirements of each of the verifier agents 152A, 152B, 152C, 152D (steps 1602A, 1602B, 1602C, 1602D). On the holder's side, the holder agent 142 generates a local credential use profile 148 based on the use of the credentials 145A, 145B, 145C, 145D in transactions for the services (step 1604). The local credential use profile 148 is timestamped based on the most recent change and periodically transmitted, or transmitted based on one or more threshold triggers, to the digital trust assessment service 172, for example to sync the local credential use profile 148 with the digital trust assessment service 172 (step 1606).

For each service engaged with by a holder via the holder agent 142, the credential use profile 148 includes a mapping of: a) a service/site domain for the service engaged by use of a verifiable credential, b) a list of credential types used on the site (not actual credentials to avoid disclosure of personally identifiable information), and c) a timestamp of the service/credential use exchange.

Upon successful transmission of the local credential use profile 148 (step 1606), the holder agent 142 can reset the local credential use profile 148 wherein subsequent transmissions in step 1606 include changes ("deltas") to the local credential use profile 148 occurring since a prior transmission. Alternatively, the holder agent 142 can revise or accumulate credential use over time to update the local credential use profile 148 wherein subsequent transmissions include a complete local credential use profile 148. In either case, a credential use profile 148 is captured at the local holder side via the holder agent 142 and is transmitted the digital trust assessment service 172, for example operating as a cloud-based resource.

The holder agent 142 transmits a request to the digital trust issuer service 170 for a digital behavior credential pertaining to the holder (step 1608). The digital trust issuer service 170 transmits to the digital trust assessment service 172 a request on the holder for a behavior assessment (step 1610). The digital trust assessment service 172 determines a behavior assessment responsive to the assessment request based on the received local credential use profile 148 (step 1612). Alternatively, the behavior assessment can be determined periodically in step 1612 without receiving a request from the digital trust issuer service 170.

Referring also to FIG. 14, systems and data flows of the digital trust assessment service 172 for determining the behavior assessment in step 1612 are shown. The digital trust assessment service 172 receives local credential use profiles 148 (step 1606), for example thousands of profiles, from a plurality of holder agents 142 operating on behalf of a plurality of users (i.e., holders) via a plurality of holder devices 140. The digital trust assessment service 172 aggregates the local credential use profiles 148 via an aggregation processor 1704. The local credential use profiles 148 are aggregated by the aggregation processor 1704 based on aggregation time windows 1702 indicating when each of the use profiles 148 were captured. The aggregation processor 1704 generates aggregated credential use profile time windows 1706 (e.g., thousands of aggregated credential use profile time windows) including aggregated local credential use profiles 148 corresponding to particular time windows.

The aggregated credential use profile time windows 1706 are processed by a percentile processor 1710. Site security reports 1708 based on monitoring and analyses of sites accessed by holder agents 142 using credentials are also processed by the percentile processor 1710. Monitoring and analyses of the sites can be performed by the digital trust assessment service via the analytical backend systems 174 The percentile processor 1710 cross-correlates risk associated with the accessed sites, as indicated by the local credential use profiles 148, and determines a ranking for each local credential use profile 148 based on the aggregated credential use profile time windows 1706 and the site security reports 1708. The local credential use profiles 148 can be ranked for example as among top percentile (e.g., top 25%) credential use profiles for security grouping 1712, bottom percentile (e.g., bottom 25%) credential use profiles for security grouping 1716, or normal percentile (e.g., between 25% and 75%) credential use profiles for security grouping 1714 based on the aggregated credential use profile time windows 1706 and the levels of risk detected on the sites where credentials were presented as indicated in the site security reports 1708.

A claim updater 1718 performs a match from a user's local credential use profile 148 to determine where their profile best fits among the credential use profile security groupings 1712, 1714, 1716 and generates or updates a wallet behavior profile claim 1720 of the user (i.e., holder) to indicate which of the credential use security grouping 1712, 1714, 1716 matches the user's local credential use profile 148.

The new or updated wallet behavior profile claim 1720 is transmitted by the claim updater 1718 to an issuer service updater 1722. The issuer service updater 1722 transmits the new or updated wallet behavior profile claim 1720 to the digital trust issuer service 170 in a digital behavior report response (step 1614). The digital trust issuer service 170 generates a new or updated digital behavior credential including the digital behavior report response (step 1616). The digital trust issuer service 170 updates the digital trust credential ledger with the new or updated digital behavior credential (step 1618).

The new or updated digital behavior credential is transmitted to the holder agent 142 (step 1620) in response to the request to the digital trust issuer service 170 for a digital behavior credential. The holder agent 142 is enabled to use the behavior credential to transact with a primary issuer agent 122 for another cryptographically verifiable credential (e.g., a verifiable credential "E") (step 1622). During the transacting, the primary issuer agent 122 verifies the behavior credential, for example using a public key corresponding to the digital trust issuer service 170, and validates the behavior credential to determine if the behavior assessment therein meets one or more requirements of the issuer on whose behalf the primary issuer agent 122 operates (step 1624).

The holder agent 142 is further enabled to use the new or updated behavior credential together with a cryptographically verifiable credential from an issuer (a "primary verifiable credential") to transact with another primary verifier agent 152 including for example the verifier agent E 152E for another service (step 1626). During the transacting, the verifier agent E 152E verifies the behavior credential, for example using a public key corresponding to the digital trust issuer service 170 and verifies the primary verifiable credential, for example using a public key corresponding to the issuer that issued the primary verifiable credential via the primary issuer agent 122 (step 1628). Further, the verifier agent E 152E validates the behavior credential to determine if the behavior assessment therein meets one or more requirements of the verifier on whose behalf the verifier agent E 152E operates (step 1628). Further, the verifier agent E 152E validates the primary verifiable credential to determine if one or more data points (e.g., attributes of a verifiable credential) therein meets one or more other requirements of the verifier on whose behalf the verifier agent E 152E operates, and if so the verifier agent E 152E approves a service delivery to the holder via the holder agent 142 (step 1628).

In a step 1630, the digital trust assessment service determines one or more new or updated assessments of the holder based on new or updated local credential use profiles 148 transmitted to the digital trust assessment service 172. The digital trust assessment service 172 transmits a behavior change report including the one or more new or updated assessments of the holder to the digital trust issuer service 170 (step 1632). The digital trust issuer service 170 generates one or more new or updated behavior credentials as one or more new or updated digitally signed credentials based on the one or more new or updated assessments of the holder (step 1634). The digital trust issuer service 170 updates the digital trust credential ledger 176 based on the generated one or more new or updated behavior credentials (step 1636). The digital trust issuer service 170 transmits a digital behavior change report including the one or more new or updated behavior credentials to the holder agent 142 (step 1638).

Further to the description above and referring to FIGS. 13 and 14, the process flow and system 1600 enables eighth, ninth, and tenth methods for transacting over a computer network by a plurality of agents including a first agent, a second agent, third agents, fourth agents, a fifth agent, and a sixth agent. The eighth, ninth, and tenth methods individually or collectively set forth a first computing system, a second computing system, third computing systems, fourth computing systems, a first entity, and second entities. The eighth, ninth, and tenth methods individually or collectively further set forth a first cryptographically verifiable credential, a second cryptographically verifiable credential, third cryptographically verifiable credentials, a fourth cryptographically verifiable credential, and a fifth cryptographically verifiable credential. The eighth, ninth, and tenth methods individually or collectively further set forth different first network-enabled services, a second network-network enabled service, a third network-enabled service, and a fourth network-enabled service.

The eighth, ninth, and tenth methods are described with reference to the steps and elements of the digital trust system 1100 and the process flow and system 1600. The first agent is depicted as a holder agent 142, the second agent is depicted as a primary transaction agent 162 performing functions of the digital trust issuer service 170, the digital trust assessment service 172, and the analytical backend systems 174, the third agents are depicted as a plurality of primary verifier agents 152 including verifier agents 152A, 152B, 152C, 152D, the fourth agents are depicted as a plurality of other holder agents 142, the fifth agent is depicted as a primary issuer agent 122, and the sixth agent is depicted as a primary verifier agent 152 depicted as verifier agent E 152E. The third network enabled-service is depicted as the digital trust issuer service 170 and the fourth network enabled-service is depicted as the digital trust assessment service 172. The first computing system is depicted as a holder device 140. The second computing system is depicted as a primary transaction agent service provider system 160. The third computing systems are depicted as verifier systems 150. The fourth computing systems are depicted as other holder devices 140. The first entity is depicted as a holder. The second entities are depicted as other holders. The first cryptographically verifiable credential is depicted as a primary verifiable credential, the second cryptographically verifiable credential is depicted as a behavior credential, the third cryptographically verifiable credentials are depicted as other primary verifiable credentials, the fourth cryptographically verifiable credential is depicted as yet another primary verifiable credential, the fifth cryptographically verifiable credential is depicted as another behavior credential. The depictions of the agents, systems, devices, entities, and credentials with respect to the digital trust system 1100 and process flow and system 1600 are exemplary in nature, and the digital trust system 1100 and process flow and system 1600 are not limited by the particular naming of each agent, system, device, entity, and credential.

The eighth method for transacting over a computer network is implemented via a holder agent 142 (i.e., the first agent) operating on a holder device 140 (i.e., the first computing system) and a primary transaction agent 162 (i.e., the second agent) operating on a primary transaction agent service provider system 160 (i.e., the second computing system). The holder agent 142 transacts on behalf of a holder (i.e., the first entity). The holder agent 142 transacts with a plurality of verifier agents (i.e., the third agents) at a plurality of first network locations at different times or simultaneously based on one or more primary verifiable credentials (i.e., at least the first cryptographically verifiable credential) for a plurality of first network-enabled services (step 1602) and transmits to the primary transaction agent 162 via a digital trust assessment service 172 one or more first indications indicating the transacting by the holder agent 142 at the plurality of first network locations based on the one or more primary verifiable credentials (step 1606). The holder agent 142 transacts with the primary transaction agent 162 for one or more behavior credentials (i.e., at least the second cryptographically verifiable credential) based on the one or more first indications indicating the transacting at the plurality of first network locations based on the one or more primary verifiable credentials (steps 1608, 1620). The holder agent 142 receives the one or more behavior credentials from the primary transaction agent 162 via the digital trust issuer service 170 (step 1620) and transacts based on the one or more behavior credentials at a second network location or a plurality of other network locations (step 1622 and step 1626).

The primary transaction agent 162 receives the one or more first indications indicating the transacting by the holder agent 142 at the plurality of first network locations based on the one or more primary verifiable credentials (step 1606) and determines via the digital trust assessment service 172 one or more assessments of the holder based on the one or more first indications indicating the transacting at the plurality of first network locations based on the one or more primary verifiable credentials (step 1612). The primary transaction agent 162 generates the one or more behavior credentials as one or more digitally signed credentials based on the one or more assessments of the holder (step 1616) and transmits the one or more behavior credentials to the holder agent (step 1620).

In the eighth method, the primary transaction agent 162, receives via the digital trust assessment service 172 a plurality of second indications indicating transacting by a plurality of other holder agents 142 (i.e., the fourth agents) on behalf of a plurality of other holders (i.e., the second entities) at the plurality of first network locations based on a plurality of other primary verifiable credentials (i.e., the third cryptographically verifiable credentials) (step 1606). The primary transaction agent 162 determines via the digital trust assessment service 172 a plurality of assessments of the plurality of other holders based on the plurality of second indications indicating the transacting by the plurality of other holder agents 142 (i.e., the fourth agents) on behalf of the plurality of other holders at the plurality of first network locations based on the plurality of third cryptographically verifiable credentials (step 1612) and generates the one or more behavior credentials as the one or more digitally signed credentials further based on the plurality of assessments of the plurality of other holders (step 1616).

The primary transaction agent 162 via the digital trust assessment service 172 compares the plurality of assessments of the plurality of other holders to the one or more assessments of the holder and generates the one or more behavior credentials as the one or more digitally signed credentials based on the comparison of the plurality of assessments of the plurality of other holders to the one or more assessments of the holder (step 1612).

The one or more behavior credentials includes the comparison of the plurality of assessments of the plurality of other holders to the one or more assessments of the holder, and the holder agent 142 shares to the holder the comparison of the plurality of assessments of the plurality of other holders to the one or more assessments of the holder.

The primary transaction agent 162 monitors computing activity of the plurality of first network locations, for example to generate site security reports 1708, and determines the one or more assessments of the holder further based on the computing activity of the plurality of first network locations, for example via the percentile processor 1710, and determines the plurality of assessments of the plurality of other entities further based on the computing activity of the plurality of first network locations, for example via the percentile processor 1710.

The plurality of primary verifier agents 152 operate on a plurality of verifier systems 150 (i.e., third computing systems) at the plurality of first network locations, and the plurality of other holder agents 142 operate on a plurality of other holder devices 140 (i.e., the fourth computing systems) to transact with the plurality of verifier agents 152 at the plurality of first network locations.

The one or more first indications further indicate times when the one or more primary verifiable credentials were applied at the plurality of first network locations, and the primary transaction agent 162 is further operable to determine the one or more assessments of the holder based on the one or more first indications further indicating the times when the one or more primary verifiable credentials were applied at the plurality of first network locations.

The one or more first indications further indicate a frequency of application of the one or more primary verifiable credentials at the plurality of first network locations, and the primary transaction agent 162 is further operable to determine the one or more assessments of the holder based on the frequency of application of the one or more primary verifiable credentials at the plurality of first network locations.

The holder agent 142 determines whether access to one or more of the plurality of first network-enabled services is provided responsive to the transacting with the plurality of primary verifier agents 152 at the plurality of first network locations based on the one or more primary verifiable credentials for the plurality of first network-enabled services, wherein the one or more first indications further indicate whether the access to the one or more of the plurality of first network-enabled services is provided responsive to the transacting with the plurality of primary verifier agents 152 at the plurality of first network locations based on the one or more primary verifiable credentials for the plurality of first network-enabled services. The primary transaction agent 162 is further operable to determine the one or more assessments of the holder further based on the indicating whether the access to the one or more of the plurality of first network-enabled services is provided responsive to the transacting with the plurality of primary verifier agents 152 at the plurality of first network locations based on the one or more primary verifiable credentials for the plurality of first network-enabled services.

The holder agent 142 can receive one or more other primary verifiable credentials (i.e., at least the fourth cryptographically verifiable credential) from a primary issuer agent 122 (i.e., the fifth agent) (step 1622) and transmit the one or more behavior credentials and the one or more other primary verifiable credentials to another primary verifier agent 152 (i.e., the sixth agent) (step 1626) for verification and validation (step 1628) by the another primary verifier agent 152 to enable a second network-enabled service.

The another primary verifier agent 152 accesses via the computer network a first public key corresponding to the one or more behavior credentials, accesses via the computer network a second public key corresponding to the one or more other primary verifiable credentials and cryptographically verifies the one or more behavior credentials based on the first public key corresponding to the one or more behavior credentials (step 1628) and cryptographically verifies the one or more other primary verifiable credentials based on the second public key corresponding to the one or more other primary verifiable credentials (step 1628). The another primary verifier agent 152 provides the second network-enabled service at least responsive to the cryptographically verifying the one or more behavior credentials and the one or more other primary verifiable credentials (steps 1626, 1628). The another primary verifier agent 152 determines that the one or more assessments of the holder meet a requirement and provides the second network-enabled service further responsive to the determining that the one or more assessments of the holder meets the requirement (steps 1626, 1628).

The holder agent 142 can transmit the one or more behavior credentials to a primary issuer agent 122 (i.e., the fifth agent) and transact with the primary issuer agent 122 based on the one or more behavior credentials for one or more other primary verifiable credentials (i.e., the third cryptographically verifiable credentials) (step 1622). The holder agent 142 receives the one or more other primary verifiable credentials from the issuer agent (step 1622) and transmits the one or more behavior credentials and the one or more other primary verifiable credentials to another primary verifier agent 152 (i.e., the sixth agent) (step 1626) for verification and validation by the another primary verifier agent 152 in a transaction to enable a second network-enabled service.

The primary transaction agent 162 includes a digital trust issuer service 170 (i.e., the third network-enabled service) and a digital trust assessment service 172 (i.e., the fourth network-enabled service). The digital trust issuer service 170 transmits a request for the one or more assessments of the holder (step 1610), receives the one or more assessments of the holder (step 1614), generates the one or more behavior credentials as the one or more digitally signed credentials based on the one or more assessments of the holder (step 1616), and transmits the one or more behavior credentials to the holder agent 142 (step 1620). The digital trust assessment service 172 receives the one or more first indications indicating the transacting by the holder agent 142 at the plurality of first network locations based on the one or more primary verifiable credentials (step 1606), receives from the digital trust issuer service 170 the request for the one or more assessments of the holder (step 1610), determines the one or more assessments of the holder based on the one or more indications indicating the transacting by the holder agent 142 at the plurality of first network locations based on the one or more primary verifiable credentials (step 1612), and transmits the one or more assessments of the holder to the digital trust issuer service 170 (step 1614).

The one or more assessment of the holder can include a plurality of assessments of the holder, and the primary transaction agent 162 can generate the one or more behavior credentials as a plurality of behavior credentials as a plurality of digitally signed credentials based on the plurality of assessments of the holder, each of the plurality of behavior credentials based on one or more of the plurality of assessments (step 1616).

The one or more primary verifiable credentials can include a plurality of primary verifiable credentials and the one or more first indications can further indicate which of the plurality of primary verifiable credentials were applied at which of the plurality of first network locations by the holder agent 142.

The holder agent 142 can generate a local credential use profile 148 of the holder based on the transacting by the holder agent 142 at the plurality of first network locations based on the one or more primary verifiable credentials, and the one or more first indications can include the local credential use profile 148.

The one or more behavior credentials include the one or more assessments of the holder, and the holder agent 142 can share the one or more assessments of the holder with the holder.

The holder agent 142 transmits the one or more primary verifiable credentials to the plurality of first network locations to transact with the plurality of primary verifier agents 152 at the plurality of first network locations based on the one or more primary verifiable credentials for the plurality of first network-enabled services (step 1602).

The holder agent 142 can generate a presentation based on the one or more primary verifiable credentials and transmit the presentation to the plurality of first network locations to transact with the plurality of verifier agents 152 at the plurality of first network locations based on the one or more primary verifiable credentials for the plurality of first network-enabled services (step 1602).

The holder agent 142 transacts periodically over time with the plurality of primary verifier agents 152 at the plurality of first network locations based on the one or more primary verifiable credentials for the plurality of first network-enabled services (step 1602) and transmits periodically over time to the primary transaction agent 162 via the digital trust assessment service 172 updates to the one or more first indications indicating updates to the transacting by the holder agent 142 at the plurality of first network locations based on the one or more primary verifiable credentials (step 1606). The holder agent 142 transacts periodically over time with the primary transaction agent 162 via the digital trust issuer service 170 for updates to the one or more behavior credentials based on the updates to the one or more first indications indicating the updates to the transacting at the plurality of first network locations based on the one or more primary verifiable credentials (steps 1608, 1638). The holder agent 142 receives periodically over time updates to the one or more behavior credentials from the primary transaction agent 162 via the digital trust issuer service 170 (step 1638) and transacts periodically over time based on the updates to the one or more behavior credentials at the second network location or a plurality of other network locations. The primary transaction agent 162 via the digital trust assessment service 172 receives periodically over time the updates to the one or more first indications indicating the updates to the transacting at the plurality of first network locations based on the one or more primary verifiable credentials (step 1606) and determines periodically over time updates to the one or more assessments of the holder based on the updates to the one or more first indications indicating the updates to the transacting at the plurality of first network locations based on the one or more primary verifiable credentials (step 1630). The primary transaction agent 162 via the digital trust issuer service 170 generates periodically over time the updates to the one or more behavior credentials as updates to the one or more digitally signed credentials based on the updates to the one or more assessments of the holder (step 1634) and transmits periodically over time the updates to the one or more behavior credentials to the holder agent 142 (step 1638).

The holder agent 142 can generate a use profile of the holder and periodically over time generate updates to the use profile of the holder based on the transacting by the holder agent 142 at the plurality of first network locations based on the one or more primary verifiable credentials, wherein the updates to the one or more first indications include updates to the use profile (step 1604). The updates to the one or more behavior credentials can include one or more other behavior credentials (i.e., at least the fifth cryptographically verifiable credential).

The ninth method for transacting over a computer network includes receiving from a holder agent 142 (i.e., the first agent) operating on a holder device 140 (i.e., the first computing system) on behalf of a holder (i.e., the first entity) by a primary transaction agent 162 (i.e., the second agent) operating on a primary transaction agent service provider system 160 (i.e., the second computing system) one or more first indications indicating transacting by the holder agent 142 at a plurality of first network locations based on one or more primary verifiable credentials (i.e., at least the 1st cryptographically verifiable credential) (step 1606) and determining by the primary transaction agent 162 via the digital trust assessment service 172 one or more assessments of the holder based on the one or more first indications indicating the transacting by the holder agent 142 at the plurality of first network locations based on the one or more primary verifiable credentials (step 1612).

The ninth method for transacting over a computer network further includes generating by the primary transaction agent 162 via the digital trust issuer service 170 one or more behavior credentials (i.e., at least the second cryptographically verifiable credential) as one or more digitally signed credentials based on the one or more assessments of the holder (step 1616) and transmitting by the primary transaction agent 162 the one or more behavior credentials to the holder agent 142 (step 1620). In the ninth method, the holder agent 142 transacts with a plurality of verifier agents 152 (i.e., the third agents) at the plurality of first network locations based on the one or more primary verifiable credentials for a plurality of first network-enabled services (step 1602). The holder agent 142 transmits to the primary transaction agent 162 the at least the first indication indicating the transacting by the holder agent 142 at the plurality of first network locations based on the one or more primary verifiable credentials (step 1606) and receives the one or more behavior credentials from the primary transaction agent 162 (step 1620). The holder agent 142 transacts using the one or more behavior credentials (steps 1622, 1626). Further in the ninth method, the holder agent 142 receives the one or more behavior credentials from the primary transaction agent 162 (step 1620). The holder agent 142 can receive one or more other primary verifiable credentials (i.e., at least the fourth cryptographically verifiable credential) from a primary issuer agent 122 (i.e., the fifth agent) (step 1622) and transmit the one or more behavior credentials and the one or more other primary verifiable credentials to another primary verifier agent 152 (i.e., the sixth agent) (step 1626) for verification and validation (step 1628) by the another primary verifier agent 152 to enable a second network-enabled service. The another primary verifier agent 152 cryptographically verifies the one or more behavior credentials (step 1628) and provides the second network-enabled service at least responsive to the cryptographically verifying the one or more behavior credentials (steps 1626, 1628). The another primary verifier agent 152 determines that the one or more assessments of the holder meet a requirement (step 1628) and provides the second network-enabled service further responsive to the determining that the one or more assessments of the holder meets the requirement (steps 1626, 1628).

The holder agent 142 can transmit the one or more behavior credentials to a primary issuer agent 122 (step 1622) and transact with the primary issuer agent 122 based on the one or more behavior credentials for one or more other primary verifiable credentials (step 1622). The holder agent 142 can receive the one or more other primary verifiable credentials from the primary issuer agent 122 (step 1622) and transmit the one or more behavior credentials and the one or more other primary verifiable credentials to another primary verifier agent 152 (step 1626) for verification and validation by the another primary verifier agent 152 to enable a second network-enabled service (steps 1626, 1628). In the ninth method, the primary transaction agent 162 can receive via the digital trust assessment service 172 a plurality of second indications indicating transacting by a plurality of other holder agents 142 (i.e., the fourth agents) on behalf of a plurality of other holders (i.e., the second entities) at the plurality of first network locations based on a plurality of other primary verifiable credentials (i.e., the third cryptographically verifiable credentials) (step 1606). The primary transaction agent 162 can determine a plurality of assessments of the plurality of other holders based on the plurality of second indications indicating the transacting by the plurality of other holder agents 142 on behalf of the plurality of other holders at the plurality of first network locations based on the plurality of other primary verifiable credentials (step 1612). The primary transaction agent 162 can generate via the digital trust issuer service 170 the one or more behavior credentials as the one or more digitally signed credentials further based on the plurality of assessments of the plurality of other holders (step 1616). The primary transaction agent 162 can compare the plurality of assessments of the plurality of other holders to the one or more assessments of the holder (e.g., via the percentile processor 1710) and generate the one or more behavior credentials as the one or more digitally signed credentials (step 1616) based on the comparison of the plurality of assessments of the plurality of other holders to the one or more assessments of the holder (step 1612).

In the ninth method, the primary transaction agent 162 can monitor computing activity of the plurality of first network locations, for example to generate the site security reports 1708, and determine the one or more assessments of the holder further based on the computing activity of the plurality of first network locations (e.g., via the percentile processor 1710). The primary transaction agent 162 can determine the plurality of assessments of the plurality of other entities further based on the computing activity of the plurality of first network locations (e.g., via the percentile processor 1710).

In the ninth method, the one or more first indications can further indicate times when the one or more primary verifiable credentials were applied at the plurality of first network locations, and the primary transaction agent 162 can determine the one or more assessments of the holder based on the one or more first indications further indicating the times when the one or more primary verifiable credentials were applied at the plurality of first network locations. Further, in the case in which one or more primary verifiable credentials include a plurality of primary verifiable credentials, the one or more first indications can further indicate which of the plurality of primary verifiable credentials were applied at which of the plurality of first network locations by the holder agent 142.

The tenth method for transacting over a computer network includes transacting on behalf of a holder (i.e., the first entity) at a plurality of first network locations based on one or more primary verifiable credentials (i.e., at least the first cryptographically verifiable credential) for a plurality of first network-enabled services (step 1602). One or more assessments of the holder are determined based on the transacting on behalf of the holder at the plurality of first network locations based on the one or more primary verifiable credentials (step 1612). One or more behavior credentials (i.e., at least the second cryptographically verifiable credential) are generated as one or more digitally signed credentials based on the one or more assessments of the holder (step 1616). The tenth method also includes transacting on behalf of the holder at one or more second network locations based on the one or more behavior credentials for a second network-enabled service (steps 1622, 1626). The tenth method further includes transmitting the one or more primary verifiable credentials to the plurality of first network locations to transact at the plurality of first network locations based on the one or more primary verifiable credentials for the plurality of first network-enabled services (step 1602).

As described herein, the process flow and system 1600 and corresponding eighth, ninth, and tenth methods and elements enable generation of behavior credentials including behavior claims including assessments of a user (e.g., a consumer) that can be referenced or used by issuers or verifiers whenever they are assessing the user for either issuing a new credential or providing a service to the user. Systems are enabled that can assess how users (e.g., consumers) use digital credentials when engaging with issuers and verifiers on the Internet and allows an assessment of risk based on those behaviors such that subsequent verification of a consumer for service engagement can benefit from the additional claim assessed by a service-providing entity on behalf of the user stating how well, or how poorly their engagement of credentials and services on the Internet has encountered risk.

Advantages enabled by the process flow and system 1600 and corresponding eighth, ninth, and tenth methods include providing an anonymized profile of the use of credentials by a user on the Internet, providing credential use cross-correlated with security risk when different credential types have been used, and providing enhanced risk insight both for a user (e.g., a consumer) as compared to others on the Internet without exposing the user's personal data, allowing verifiers to benefit by obtaining a greater assessment of risk of the user based on a behavior profile for the user.

The systems and methods described herein enable profiling credential type usage against network-accessible sites to cross-correlate indications that a site is malicious or that data has been stolen via the site or other indication that suggests the site should not be trusted. Different credential types can include for example digital employee identification cards, digital educational certificates, and digital birth certificates. For example, when credentials X, Y, Z are used by a user at a site and the site has a W, H, G security profile vector then the likelihood of the site causing problems for the user is calculated as a particular percentage where threats include for instance privacy loss and data breach based on the site's security profile vector.

Referring to FIG. 15, a method 1800 of cross-correlating credential type usage to facilitate secure navigation in a computer network is provided. In a step 1802, collect from a plurality of clients (e.g., holder agents 142) of a plurality of users sets of credential types ("credential type sets") used at network-accessible sites and indications of the sites that the credential type sets were used at by each client into time-based windows. The sites are configured for example to host primary verifier agents 152. For each credential type set, generate a random unique identifier ("unique ID") enabling for example reports to be determined on a remote backend system and transmitted back to the client. Alternatively, use a globally unique identifier ("GUID") of an installation of the client on a device (e.g., holder device 140). Credential type sets can be collected for example over a day, a week, or a month and transmitted for processing at a cloud network location (e.g., primary transaction agent 162) which aggregates data from the plurality of clients of the plurality of users.

In a step 1804, aggregate (e.g., by the primary transaction agent 162) the credential type sets across the plurality of users into corresponding time slots to determine a set record to enable an analysis of risk which considers the same credential type sets to site usage over the same time period. Keep track of the unique IDs for the credential sets. The set record includes a prevalence of use assessment for each credential type set indicating the number of instances that the credential type set was used at a site.

In a step 1806, for each site, monitor and determine security telemetry associated with the site including passive DNS risk, known data breaches from the site, known malware distributed from the site, and other security-related data points. Based on the security telemetry, determine a multi-factored site risk assessment for each site across privacy, malware, phishing, and other risk factors associated with the site.

In a step 1808, for each site assign the multi-factored site risk assessment from step 1806 and the prevalence of use assessment of step 1804 to each credential type set that was used on the site to determine a multi-factored score for each credential type set that was used on the site, which score provides an indication of risk of the site and the prevalence of use of the credential type set.

In a step 1810, define user group profiles, for example top 25 percentile, top 50 percentile, or other percentile user group profiles, for percentile buckets of risk based on the multi-factored scores determined in step 1808. This produces for example a list of sites associated to credential type sets that will result in a particular level of risk based on the multi-factored scores. Include in the user group profiles common security parameters of risk associated with each site (e.g., has a domain less than seven days old, has a particular vulnerability "X", is known to distribute malware in last twelve months).

In a step 1812, for each client (or group of clients associated with a particular user) that reported the credential type set report on which the percentile user group profiles were defined, re-analyze their sets of credential type sets and determine where their credential type sets fit in the user group profiles (e.g., top 25 percentile user group profile, top 50 percentile user group profile) to generate a credential use assessment of profile ("user credential use assessment") for a user.

In a step 1814, transmit the user credential use profile to the client and show the user the user credential use assessment via a user interface.

In a step 1816, monitor network use by a user notify the user via the client based on the navigating in the network by the user and the user credential use assessment of the user. For example, notify a user when the user navigates to sites that require same set of credentials or corresponds to the same group profile as their user credential use assessment.

FIG. 16 illustrates in abstract the function of an exemplary computer system 2000 on which the systems, methods and processes described herein can execute. For example, the issuer system 20, issuer system 120, holder device 40, holder device 140, verifier system 50, verifier system 150, issuer transaction agent service provider system 60, holder transaction agent service provider system 70, verifier transaction agent service provider system 80, and primary transaction agent service provider system 160 can each be embodied by a particular computer system 2000. The computer system 2000 may be provided in the form of a personal computer, laptop, handheld mobile communication device, mainframe, distributed computing system, or other suitable computer configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), light emitting diode (LED) display or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A digital system for transacting over a computer network comprising a first computing system comprising a first processor and a first computer readable medium comprising a first agent comprising first instructions executable by the first processor for operating on the first computing system, comprising a second computing system comprising a second processor and a second computer readable medium comprising a second agent comprising second instructions executable by the second processor for operating on the second computing system, and comprising a sixth computing system comprising a sixth processor and a sixth computer readable medium comprising a sixth agent comprising sixth instructions executable by the sixth processor for operating on the sixth computing system, the first agent operable to cause the first computing system to:
   transact on behalf of a first entity;
   transact with a plurality of third agents at a plurality of first network locations based on at least a first cryptographically verifiable credential for a plurality of first network-enabled services;
   transmit to the second agent at least a first indication indicating the transacting by the first agent at the plurality of first network locations based on the at least the first cryptographically verifiable credential;
   transact with the second agent for at least a second cryptographically verifiable credential based on the at least the first indication indicating the transacting at the plurality of first network locations based on the at least the first cryptographically verifiable credential;
   receive the at least the second cryptographically verifiable credential from the second agent;
   receive at least a fourth cryptographically verifiable credential from a fifth agent;
   transact based on the at least the second cryptographically verifiable credential at at least a second network location, the transacting at the at least the second network location comprising transmitting the at least the second cryptographically verifiable credential and the at least the fourth cryptographically verifiable credential to the sixth agent via the sixth computing system; and
   the second agent operable to cause the second computing system to:
   receive the at least the first indication indicating the transacting by the first agent at the plurality of first network locations based on the at least the first cryptographically verifiable credential;
   determine at least one assessment of the first entity based on the at least the first indication indicating the transacting at the plurality of first network locations based on the at least the first cryptographically verifiable credential;
   generate the at least the second cryptographically verifiable credential as at least one digitally signed credential based on the at least one assessment of the first entity; and
   transmit the at least the second cryptographically verifiable credential to the first agent;

the sixth agent operable to cause the sixth computing system to:
cryptographically verify the at least the second cryptographically verifiable credential; and
provide a second network-enabled service at least responsive to the cryptographically verifying the at least the second cryptographically verifiable credential.

2. The digital system for transacting of claim 1, the second agent further operable to cause the second computing system to:
receive a plurality of second indications indicating transacting by a plurality of fourth agents on behalf of a plurality of second entities at the plurality of first network locations based on a plurality of third cryptographically verifiable credentials;
determine a plurality of assessments of the plurality of second entities based on the plurality of second indications indicating the transacting by the plurality of fourth agents on behalf of the plurality of second entities at the plurality of first network locations based on the plurality of third cryptographically verifiable credentials; and
generate the at least the second cryptographically verifiable credential as the at least one digitally signed credential further based on the plurality of assessments of the plurality of second entities.

3. The digital system for transacting of claim 2, the second agent further operable to cause the second computing system to:
compare the plurality of assessments of the plurality of second entities to the at least one assessment of the first entity; and
generate the at least the second cryptographically verifiable credential as the at least one digitally signed credential based on the comparison of the plurality of assessments of the plurality of second entities to the at least one assessment of the first entity.

4. The digital system for transacting of claim 2, wherein the at least the second cryptographically verifiable credential comprises the comparison of the plurality of assessments of the plurality of second entities to the at least one assessment of the first entity, and wherein the first agent is further operable to share to the first entity the comparison of the plurality of assessments of the plurality of second entities to the at least one assessment of the first entity.

5. The digital system for transacting of claim 2, the second agent further operable to cause the second computing system to:
monitor computing activity of the plurality of first network locations;
determine the at least one assessment of the first entity further based on the computing activity of the plurality of first network locations; and
determine the plurality of assessments of the plurality of second entities further based on the computing activity of the plurality of first network locations.

6. The digital system for transacting of claim 2, wherein:
the plurality of third agents operate on a plurality of third computing systems at the plurality of first network locations; and
the plurality of fourth agents operate on a plurality of fourth computing systems to transact with the plurality of third agents at the plurality of first network locations.

7. The digital system for transacting of claim 1, the second agent further operable to cause the second computing system to:
monitor computing activity of the plurality of first network locations; and
determine the at least one assessment of the first entity further based on the computing activity of the plurality of first network locations.

8. The digital system for transacting of claim 1, wherein the at least the first indication further indicates times when the at least the first cryptographically verifiable credential was applied at the plurality of first network locations, and the second agent is further operable to determine the at least one assessment of the first entity based on the at least the first indication further indicating the times when the at least the first cryptographically verifiable credential was applied at the plurality of first network locations.

9. The digital system for transacting of claim 1, wherein the at least the first indication further indicates a frequency of application of the at least the first cryptographically verifiable credential at the plurality of first network locations, and the second agent is further operable to determine the at least one assessment of the first entity based on the frequency of application of the at least the first cryptographically verifiable credential at the plurality of first network locations.

10. The digital system for transacting of claim 1, wherein the first agent is further operable to cause the first computing system to:
determine whether access to one or more of the plurality of first network-enabled services is provided responsive to the transacting with the plurality of third agents at the plurality of first network locations based on the at least the first cryptographically verifiable credential for the plurality of first network-enabled services, wherein the at least the first indication further indicates whether the access to the one or more of the plurality of first network-enabled services is provided responsive to the transacting with the plurality of third agents at the plurality of first network locations based on the at least the first cryptographically verifiable credential for the plurality of first network-enabled services; and
the second agent is further operable to cause the second computing system to:
determine the at least one assessment of the first entity further based on the indicating whether the access to the one or more of the plurality of first network-enabled services is provided responsive to the transacting with the plurality of third agents at the plurality of first network locations based on the at least the first cryptographically verifiable credential for the plurality of first network-enabled services.

11. The digital system for transacting of claim 1, the sixth agent further operable to cause the sixth computing system to:
validate the at least the second cryptographically verifiable credential;
cryptographically verify the fourth cryptographically verifiable credential and validate the fourth cryptographically verifiable credential; and
provide the second network-enabled service further responsive to the validating the at least the second cryptographically verifiable credential, the cryptographically verifying the fourth cryptographically verifiable credential, and the validating the fourth cryptographically verifiable credential.

12. The digital system for transacting of claim 1, wherein the sixth agent is further operable to cause the sixth computing system to:

access via the computer network a first public key corresponding to the at least the second cryptographically verifiable credential;

access via the computer network a second public key corresponding to the at least the fourth cryptographically verifiable credential;

cryptographically verify the at least the second cryptographically verifiable credential based on the first public key corresponding to the at least the second cryptographically verifiable credential; and cryptographically verify the at least the fourth cryptographically verifiable credential based on the second public key corresponding to the at least the fourth cryptographically verifiable credential.

13. The digital system for transacting of claim 12, the sixth agent further operable to cause the sixth computing system to:

determine that the at least one assessment of the first entity meets a requirement; and provide the second network-enabled service further responsive to the determining that the at least one assessment of the first entity meets the requirement.

14. The digital system for transacting of claim 1, the sixth agent further operable to cause the sixth computing system to:

determine that the at least one assessment of the first entity meets a requirement; and provide the second network-enabled service further responsive to the determining that the at least one assessment of the first entity meets the requirement.

15. The digital system for transacting of claim 1, wherein the fifth agent operates on a fifth computing system.

16. The digital system for transacting of claim 1, the first agent further operable to cause the first computing system to:

transmit the at least the second cryptographically verifiable credential to the fifth agent; and transact with the fifth agent based on the at least the second cryptographically verifiable credential for the at least the fourth cryptographically verifiable credential.

17. The digital system for transacting of claim 16, the sixth agent further operable to cause the sixth computing system to:

validate the second cryptographically verifiable credential;

cryptographically verify the fourth cryptographically verifiable credential and validate the fourth cryptographically verifiable credential; and provide the second network-enabled service further responsive to the validating the second cryptographically verifiable credential, the cryptographically verifying the fourth cryptographically verifiable credential, and the validating the fourth cryptographically verifiable credential.

18. The digital system for transacting of claim 1, the second agent comprising:

a third network-enabled service operable to:

transmit a request for the at least one assessment of the first entity;

receive the at least one assessment of the first entity;

generate the at least the second cryptographically verifiable credential as the at least one digitally signed credential based on the at least one assessment of the first entity; and transmit the at least the second cryptographically verifiable credential to the first agent; and a fourth network-enabled service operable to:

receive the at least the first indication indicating the transacting by the first agent at the plurality of first network locations based on the at least the first cryptographically verifiable credential;

receive from the third network-enabled service the request for the at least one assessment of the first entity;

determine the at least one assessment of the first entity based on the at least the first indication indicating the transacting by the first agent at the plurality of first network locations based on the at least the first cryptographically verifiable credential; and transmit the at least one assessment of the first entity to the third network-enabled service.

19. The digital system for transacting of claim 1, wherein the at least one assessment of the first entity comprises a plurality of assessments of the first entity, the second agent further operable to cause the second computing system to generate the at least the second cryptographically verifiable credential based on the plurality of assessments of the first entity.

20. The digital system for transacting of claim 1, wherein:

the at least one assessment of the first entity comprises a plurality of assessments of the first entity; and the second agent is further operable to cause the second computing system to:

generate the at least the second cryptographically verifiable credential as a plurality of second cryptographically verifiable credentials as a plurality of digitally signed credentials based on the plurality of assessments of the first entity, each of the plurality of second cryptographically verifiable credentials based on one or more of the plurality of assessments.

21. The digital system for transacting of claim 1, wherein:

the at least the first cryptographically verifiable credential comprises a plurality of first cryptographically verifiable credentials; and the at least the first indication further indicates which of the plurality of first cryptographically verifiable credentials were applied at which of the plurality of first network locations by the first agent.

22. The digital system for transacting of claim 1, wherein the first agent is further operable to cause the first computing system to generate a use profile of the first entity based on the transacting by the first agent at the plurality of first network locations based on the at least the first cryptographically verifiable credential, and the at least the first indication comprises the use profile.

23. The digital system for transacting of claim 1, wherein the at least the second cryptographically verifiable credential comprises the at least one assessment of the first entity, and wherein the first agent is further operable to cause the first computing system to share the at least one assessment of the first entity with the first entity.

24. The digital system for transacting of claim 1, wherein the first agent is further operable to cause the first computing system to transmit the at least the first cryptographically verifiable credential to the plurality of first network locations to transact with the plurality of third agents at the plurality of first network locations based on the at least the first cryptographically verifiable credential for the plurality of first network-enabled services.

25. The digital system for transacting of claim 1, wherein the first agent is further operable to cause the first computing system to:

generate a presentation based on the at least the first cryptographically verifiable credential; and transmit the presentation to the plurality of first network locations to transact with the plurality of third agents at the plurality of first network locations based on the at least the first cryptographically verifiable credential for the plurality of first network-enabled services.

26. The digital system for transacting of claim 1, wherein the first agent is further operable to cause the first computing system to:

transact periodically over time with the plurality of third agents at the plurality of first network locations based on the at least the first cryptographically verifiable credential for the plurality of first network-enabled services;

transmit periodically over time to the second agent updates to the at least the first indication indicating updates to the transacting by the first agent at the plurality of first network locations based on the at least the first cryptographically verifiable credential;

transact periodically over time with the second agent for updates to the at least the second cryptographically verifiable credential based on the updates to the at least the first indication indicating the updates to the transacting at the plurality of first network locations based on the at least the first cryptographically verifiable credential;

receive periodically over time updates to the at least the second cryptographically verifiable credential from the second agent; and transact periodically over time based on the updates to the at least the second cryptographically verifiable credential at the at least the second network location; and the second agent further operable to cause the second computing system to:

receive periodically over time the updates to the at least the first indication indicating the updates to the transacting at the plurality of first network locations based on the at least the first cryptographically verifiable credential;

determine periodically over time updates to the at least one assessment of the first entity based on the updates to the at least the first indication indicating the updates to the transacting at the plurality of first network locations based on the at least the first cryptographically verifiable credential;

generate periodically over time the updates to the at least the second cryptographically verifiable credential as updates to the at least one digitally signed credential based on the updates to the at least one assessment of the first entity; and transmit periodically over time the updates to the at least the second cryptographically verifiable credential to the first agent.

27. The digital system for transacting of claim 26, wherein the first agent is further operable to generate a use profile of the first entity and to periodically over time generate updates to the use profile of the first entity based on the transacting by the first agent at the plurality of first network locations based on the at least the first cryptographically verifiable credential, wherein the updates to the at least the first indication comprise updates to the use profile.

28. The digital system for transacting of claim 26, wherein the updates to the at least the second cryptographically verifiable credential comprise at least a fifth cryptographically verifiable credential.

29. A method for transacting over a computer network, the method comprising:

transacting by a first agent operating on a first computing system on behalf of a first entity with a plurality of third agents at a plurality of first network locations based on at least a first cryptographically verifiable credential for a plurality of first network-enabled services;

transmitting by the first agent to a second agent operating on a second computing system at least a first indication indicating the transacting by the first agent at the plurality of first network locations based on the at least the first cryptographically verifiable credential;

receiving from the first agent by the second agent at least the first indication indicating the transacting by the first agent at the plurality of first network locations based on the at least the first cryptographically verifiable credential;

determining by the second agent at least one assessment of the first entity based on the at least the first indication indicating the transacting by the first agent at the plurality of first network locations based on the at least the first cryptographically verifiable credential;

generating by the second agent at least a second cryptographically verifiable credential as at least one digitally signed credential based on the at least one assessment of the first entity;

transmitting by the second agent the at least the second cryptographically verifiable credential to the first agent;

receiving by the first agent the at least the second cryptographically verifiable credential from the second agent;

receiving by the first agent at least a third cryptographically verifiable credential from a fifth agent;

transmitting by the first agent the at least the second cryptographically verifiable credential and the at least the third cryptographically verifiable credential to a sixth agent;

cryptographically verifying by the sixth agent the at least the second cryptographically verifiable credential; and providing by the sixth agent a second network-enabled service at least responsive to the cryptographically verifying the at least the second cryptographically verifiable credential.

30. The method of claim 29, further comprising:

transmitting by the first agent the at least the second cryptographically verifiable credential and the at least the third cryptographically verifiable credential to the sixth agent for verification and validation by the sixth agent to enable the second network-enabled service.

31. The method of claim 29, further comprising:

determining by the sixth agent that the at least one assessment of the first entity meets a requirement; and providing by the sixth agent the second network-enabled service further responsive to the determining that the at least one assessment of the first entity meets the requirement.

32. The method of claim 29, further comprising:

transmitting by the first agent the at least the second cryptographically verifiable credential to the fifth agent; and transacting by the first agent with the fifth agent based on the at least the second cryptographically verifiable credential for the at least the third cryptographically verifiable credential;

transmitting by the first agent the at least the second cryptographically verifiable credential and the at least the third cryptographically verifiable credential to the sixth agent for verification and validation by the sixth agent to enable the second network-enabled service;

validating by the sixth agent the second cryptographically verifiable credential;

cryptographically verifying by the sixth agent the third cryptographically verifiable credential and validating by the sixth agent the third cryptographically verifiable credential; and providing by the sixth agent the second network-enabled service further responsive to the validating the second cryptographically verifiable credential, the cryptographically verifying the third cryptographically verifiable credential, and the validating the third cryptographically verifiable credential.

33. The method of claim 29, further comprising:

receiving by the second agent a plurality of second indications indicating transacting by a plurality of fourth agents on behalf of a plurality of second entities at the plurality of first network locations based on a plurality of fourth cryptographically verifiable credentials;

determining by the second agent a plurality of assessments of the plurality of second entities based on the plurality of second indications indicating the transacting by the plurality of fourth agents on behalf of the plurality of second entities at the plurality of first network locations based on the plurality of fourth cryptographically verifiable credentials; and generating by the second agent the at least the second cryptographically verifiable credential as the at least one digitally signed credential further based on the plurality of assessments of the plurality of second entities.

34. The method of claim 33, further comprising:

comparing by the second agent the plurality of assessments of the plurality of second entities to the at least one assessment of the first entity; and generating by the second agent the at least the second cryptographically verifiable credential as the at least one digitally signed credential based on the comparison of the plurality of assessments of the plurality of second entities to the at least one assessment of the first entity.

35. The method of claim 33, further comprising:

monitoring by the second agent computing activity of the plurality of first network locations;

determining by the second agent the at least one assessment of the first entity further based on the computing activity of the plurality of first network locations; and determining by the second agent the plurality of assessments of the plurality of second entities further based on the computing activity of the plurality of first network locations.

36. The method of claim 29, further comprising:

monitoring by the second agent computing activity of the plurality of first network locations; and determining by the second agent the at least one assessment of the first entity further based on the computing activity of the plurality of first network locations.

37. The method of claim 29, wherein the at least the first indication further indicates times when the at least the first cryptographically verifiable credential was applied at the plurality of first network locations, and the second agent is further operable to determine the at least one assessment of the first entity based on the at least the first indication further indicating the times when the at least the first cryptographically verifiable credential was applied at the plurality of first network locations.

38. The method of claim 29, wherein:

the at least the first cryptographically verifiable credential comprises a plurality of first cryptographically verifiable credentials; and the at least the first indication further indicates which of the plurality of first cryptographically verifiable credentials were applied at which of the plurality of first network locations by the first agent.

39. A method for transacting over a computer network, the method comprising:

transacting by a first agent on behalf of a first entity at a plurality of first network locations based on at least a first cryptographically verifiable credential for a plurality of first network-enabled services;

receiving by a second agent from the first agent an indication indicating the transacting on behalf of the first agent at the plurality of first network locations based on the at least the first cryptographically verifiable credential;

determining by the second agent at least one assessment of the first entity based on the transacting on behalf of the first entity at the plurality of first network locations based on the at least the first cryptographically verifiable credential;

generating by the second agent at least a second cryptographically verifiable credential as at least one digitally signed credential based on the at least one assessment of the first entity;

receiving by the first agent the at least the second cryptographically verifiable credential from the first agent;

transacting by the first agent on behalf of the first entity at at least a second network location based on the at least the second cryptographically verifiable credential for a second network-enabled service, the transacting at the at least the second network location comprising transmitting by the first agent the at least the second cryptographically verifiable credential and to a sixth agent;

cryptographically verifying by the sixth agent the at least the second cryptographically verifiable credential; and providing by the sixth agent the second network-enabled service at least responsive to the cryptographically verifying the at least the second cryptographically verifiable credential.

40. The method of claim 39, further comprising transmitting by the first agent the at least the first cryptographically verifiable credential to the plurality of first network locations to transact at the plurality of first network locations based on the at least the first cryptographically verifiable credential for the plurality of first network-enabled services.

41. The digital system for transacting of claim 1, the sixth agent further operable to cause the sixth computing system to:

cryptographically verify the fourth cryptographically verifiable credential; and provide the second network-enabled service further responsive to the cryptographically verifying the fourth cryptographically verifiable credential.

42. The method of claim 29, further comprising:

cryptographically verifying by the sixth agent the third cryptographically verifiable credential; and providing by the sixth agent the second network-enabled service further responsive to the cryptographically verifying the third cryptographically verifiable credential.

* * * * *